United States Patent [19]

Koza et al.

[11] Patent Number: 5,390,282
[45] Date of Patent: Feb. 14, 1995

[54] PROCESS FOR PROBLEM SOLVING USING SPONTANEOUSLY EMERGENT SELF-REPLICATING AND SELF-IMPROVING ENTITIES

[75] Inventors: John R. Koza, 25372 La Rena La., Los Altos Hills, Calif. 94022; James P. Rice, Redwood City, Calif.

[73] Assignee: John R. Koza, Los Altos, Calif.

[21] Appl. No.: 899,627

[22] Filed: Jun. 16, 1992

[51] Int. Cl.$^6$ ............................................ G06F 15/18
[52] U.S. Cl. ............................................ 395/13
[58] Field of Search ........................................ 395/13

[56] References Cited

U.S. PATENT DOCUMENTS 4,697,242  9/1987  Holland et al. ........................ 395/13

OTHER PUBLICATIONS de Groot, Marc, "Primordial Soup", San Francisco, California, Jan. 1992.
Towards the Evolution of Symbols; Proc. of the 2nd Int. Conf. on Genetic Algorithms; Dolan et al; Jul. 28–31, 1987; pp. 123–131.
Symbolic Schemata in Connectionist Memories: Role Binding and the Evolution of Structure; UCLA-AL-8-7-11; Dolan et al; pp. 1–23.
Cognitive Systems Based on Adaptive Algorithms; Cognitive Systems; Holland et al; 1978; pp. 313–329.
On Using Genetic Algorithms to Search Program Spaces; Proc. of the 2nd Int. Conf. on Genetic Algorithms; De Jong; Jul. 28–31, 1987; pp. 210–216.
Tree Structured Rules in Genetic Algorithms; Proc. of the 2nd Int. Conf. on Genetic Algorithms; Bickel et al; Jul. 28–31, 1987; pp. 77–81.
An Adaptive Crossover Distribution Mechanism for Genetic Algorithms; Proc. of the 2nd Int. Conf. on Genetic Algorithms; Schaffer et al; Jul. 28–31, 1987; pp. 36–40.
The Argot Strategy: Adaptive Representation Genetic Optimizer Technique; Proc. of the 2nd Int. Conf. on Genetic Algorithms; Sheafer; Jul. 28–31, 1987; pp. 50–58.
Using the Genetic Algorithm to Generate LISP Source Code to Solve the Prisoner's Dilemma; Proc. of the 2nd Int. Conf. on Genetic Algorithms; Fujiki et al; Jul. 28–31, 1987; pp. 236–240.
A Darwinian Approach to Artificial Neural Systems; Proc. of Systems, Man, and Cybernetics Conference; Knisley; 1987; pp. 572–577.

*Primary Examiner*—Robert W. Downs
*Attorney, Agent, or Firm*—Blakely, Sokoloff, Taylor & Zafman

[57] ABSTRACT

An apparatus and process for solving problems using self-replicating and self-improving entities. The present invention includes an apparatus and process for solving a problem using a population of entities, wherein each of the entities is an arrangement of actions and material which are capable of including an incorporation action and are capable of including an emission action. The present invention also includes a process and apparatus for activating each of the entities by presenting each of the entities with at least one combination of environmental material. If an entity has an incorporation action then that entity searches the population for a part of one of the entities and then incorporates the portion of the one entity associated with the part into itself. If the entity includes an emission action then the entity searches the population for a part and then the entity produces at least one emission, such that if the entity responds effectively to a combination of environmental material then the emission enters the population and if the entity fails to respond effectively then the emission fails to enter the population. The activation continues until one of the entities responds effectively to a specified number of combinations of material, such that a solution to the problem is generated.

29 Claims, 22 Drawing Sheets

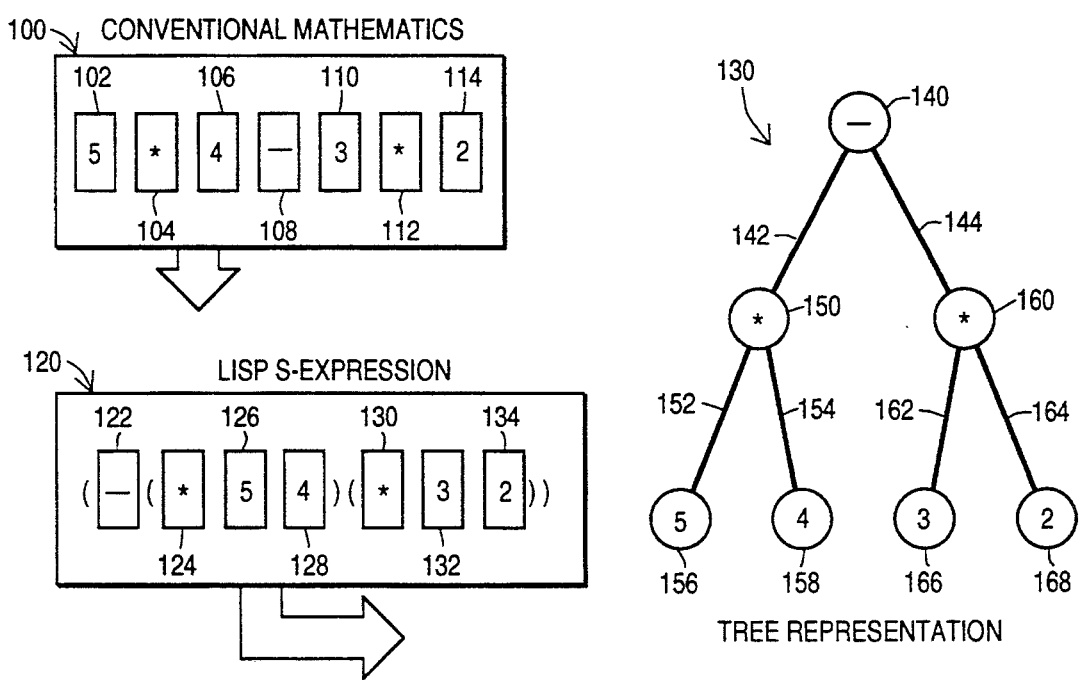
FIG_1

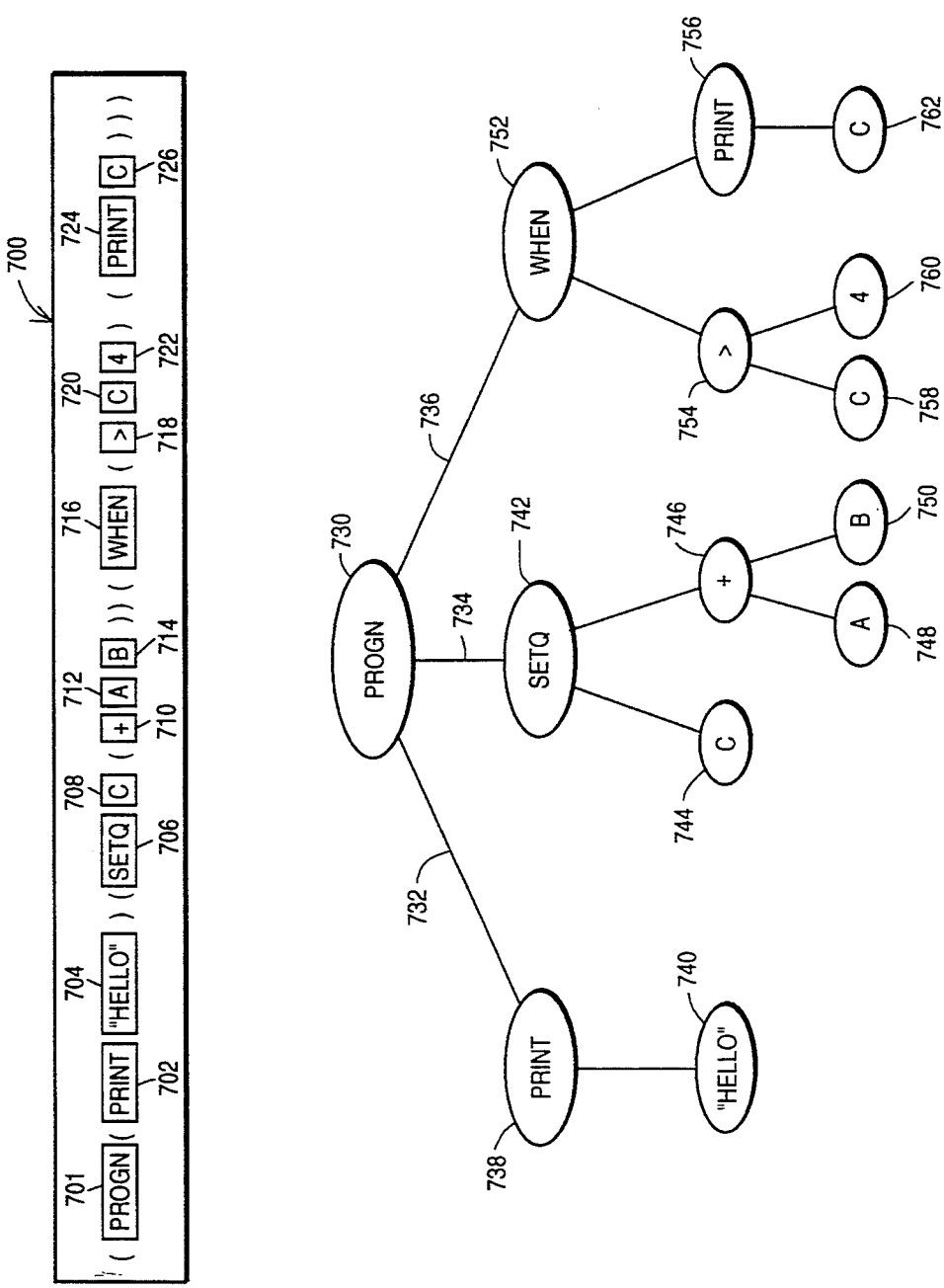
FIG_2

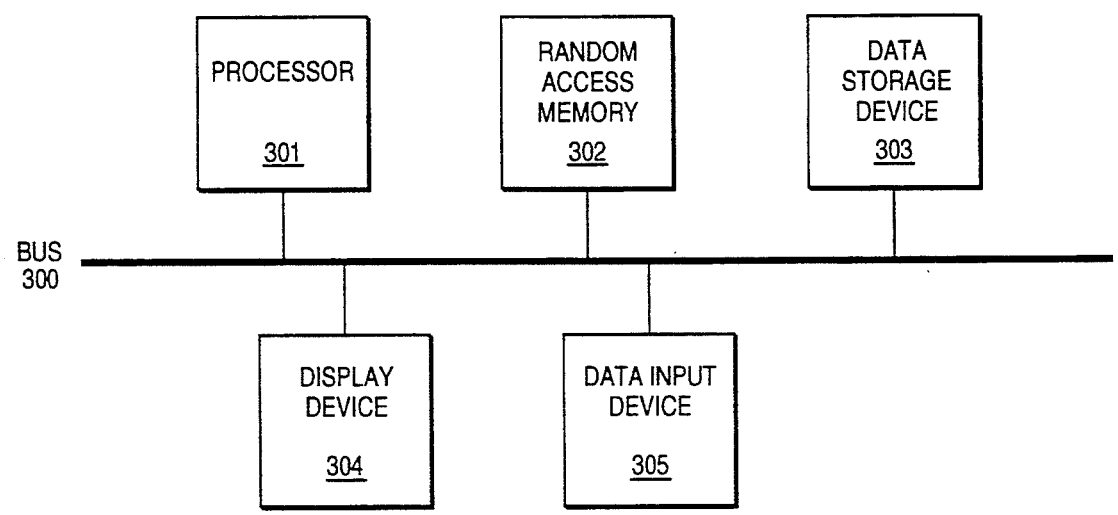
FIG_3

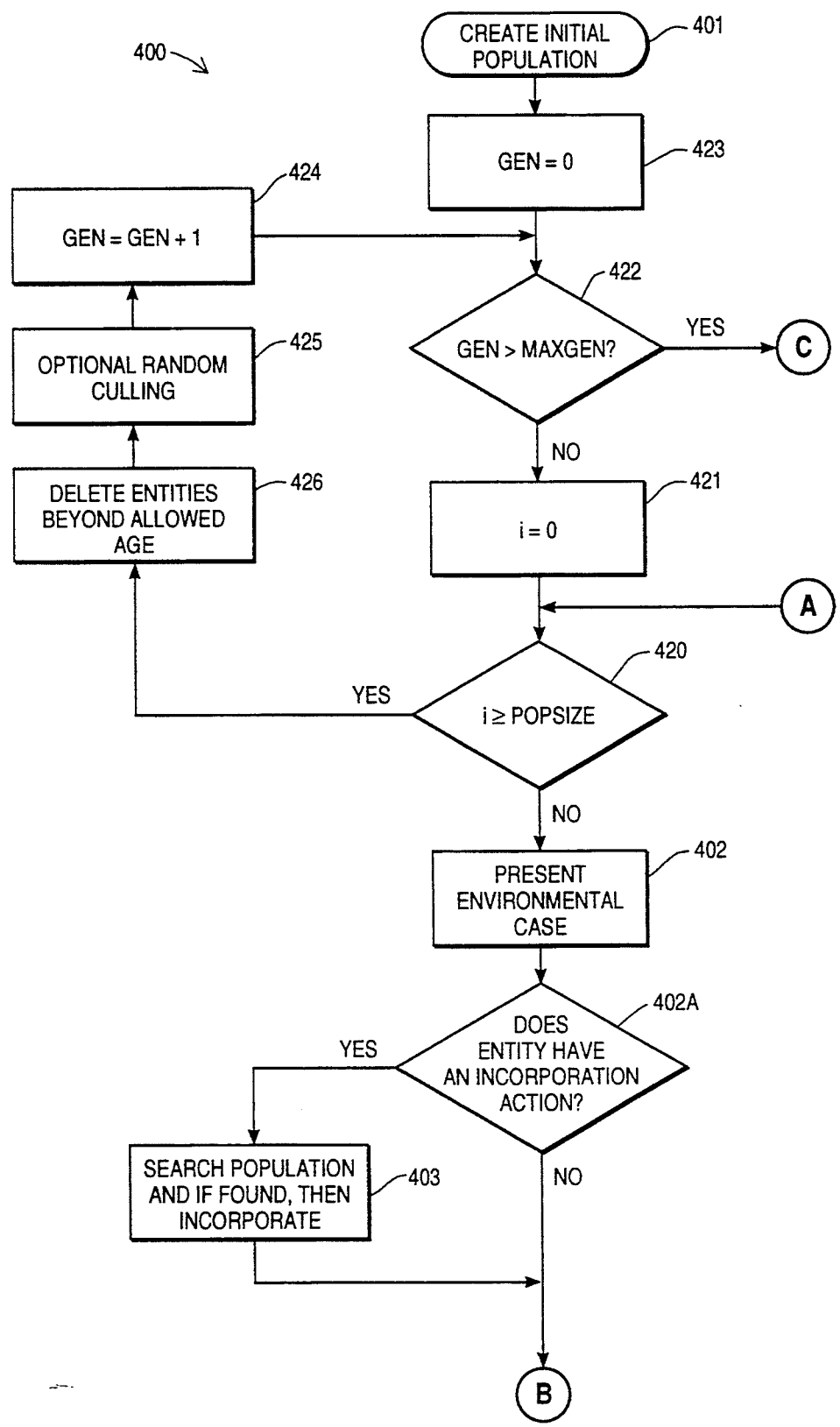
FIG_4A

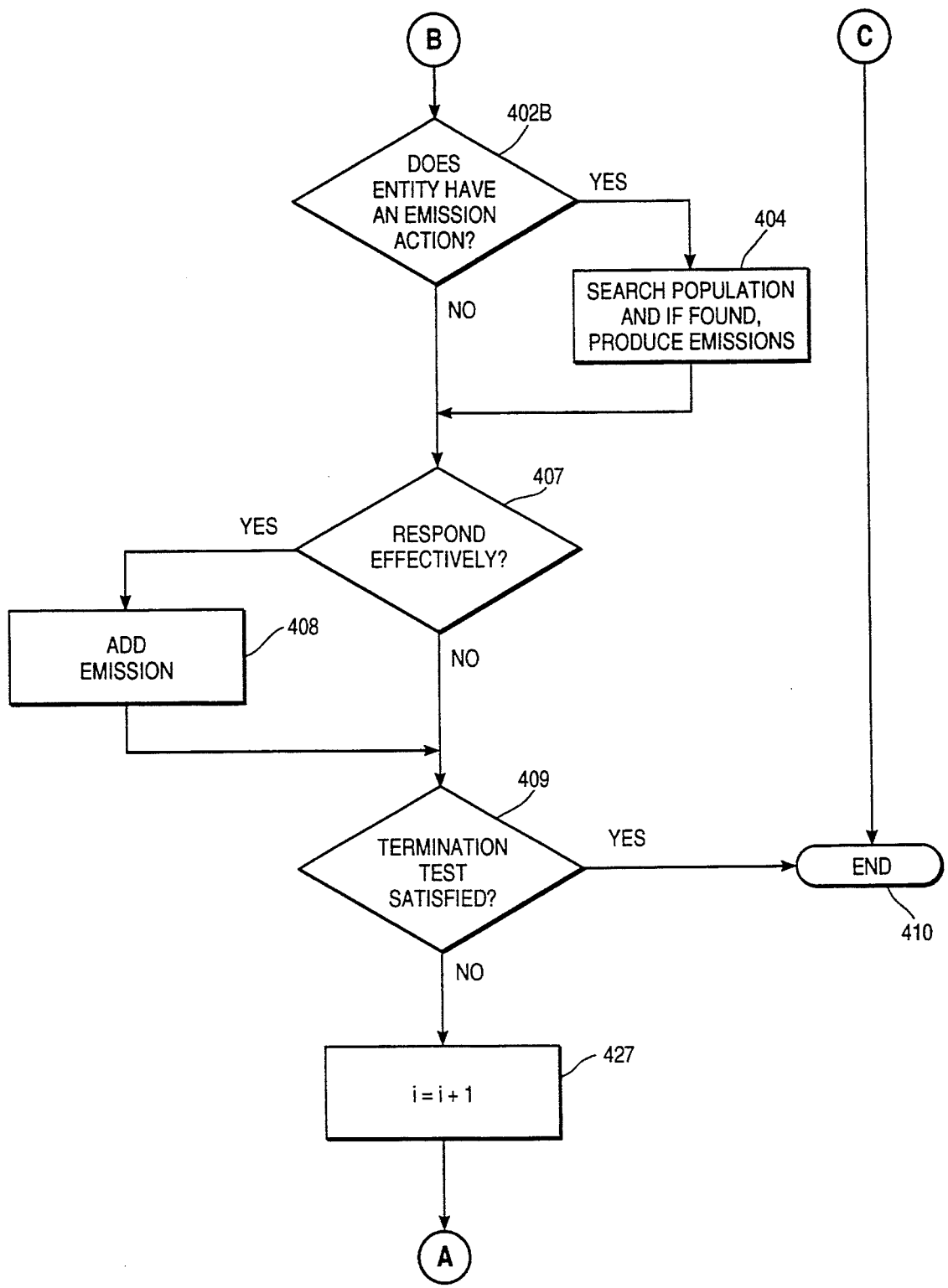
FIG_4B

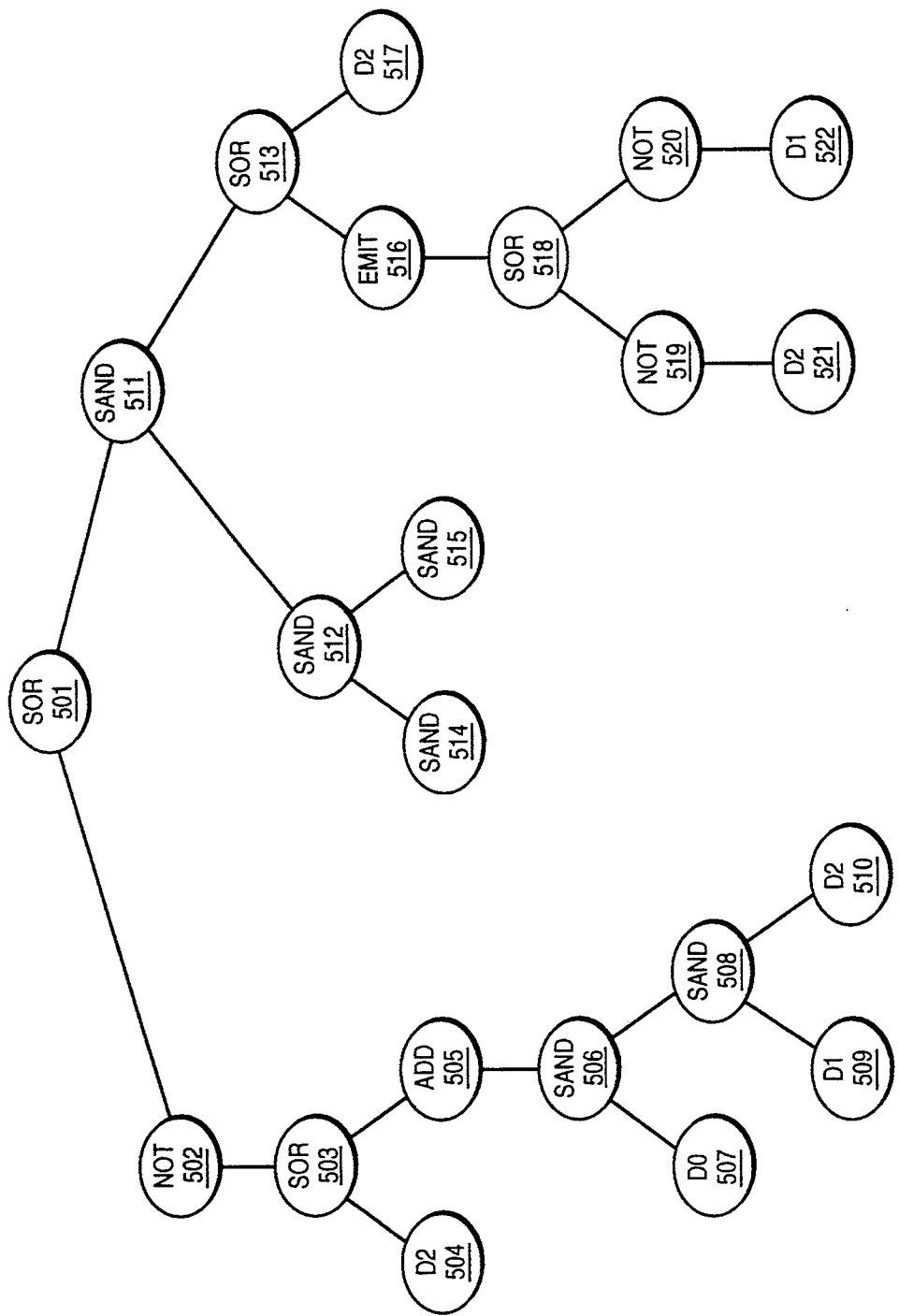
FIG_5

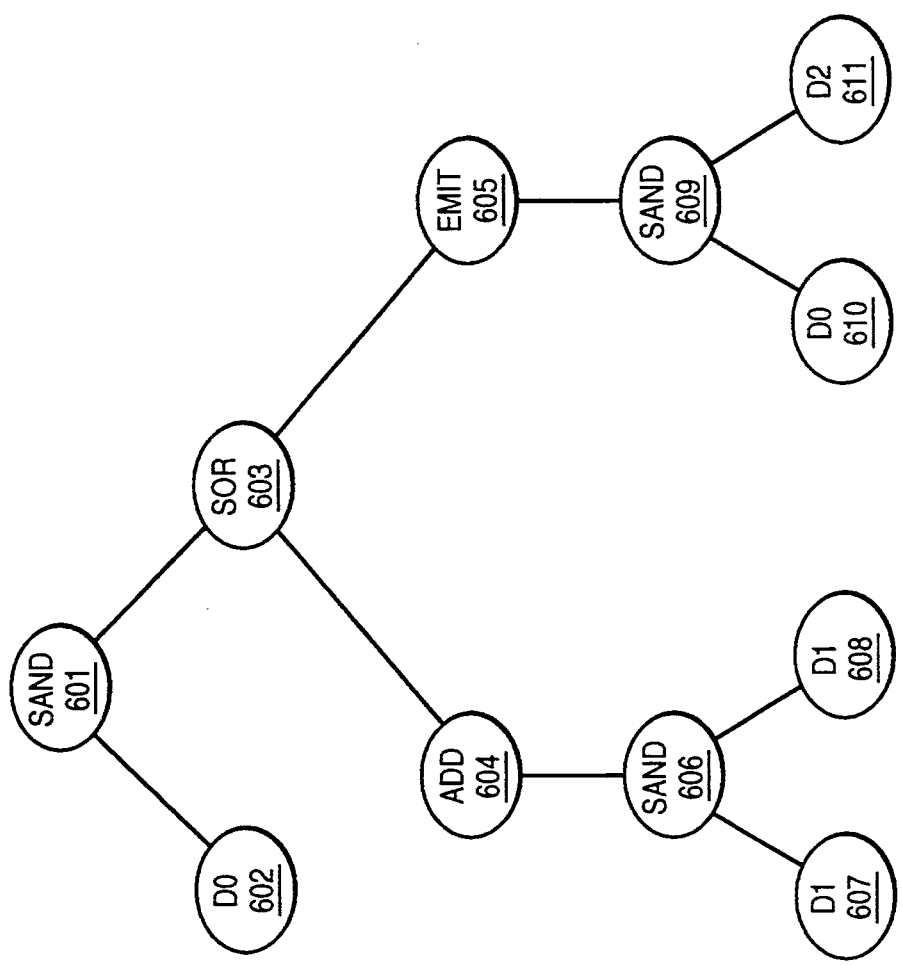
FIG_6

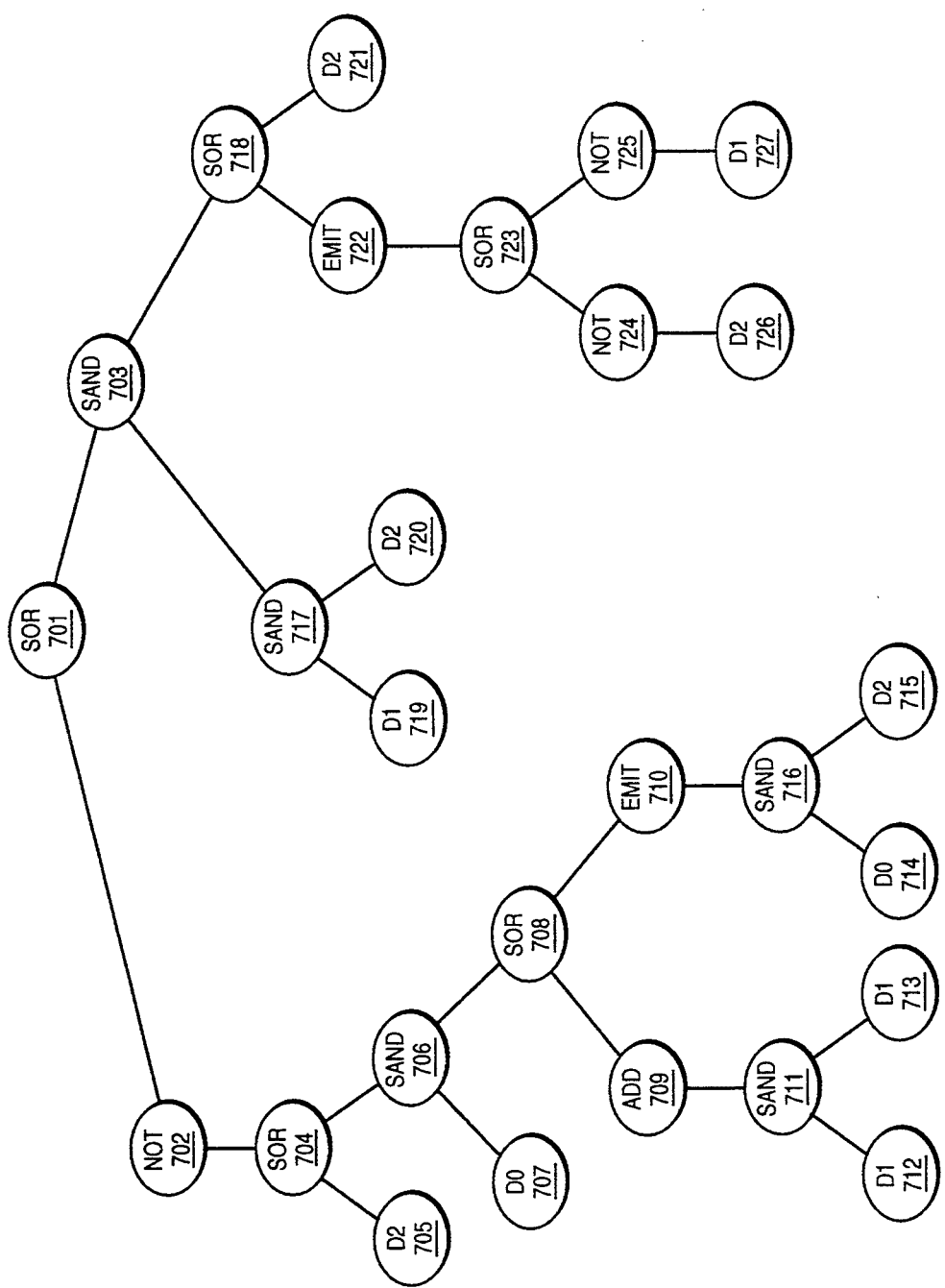
FIG._7

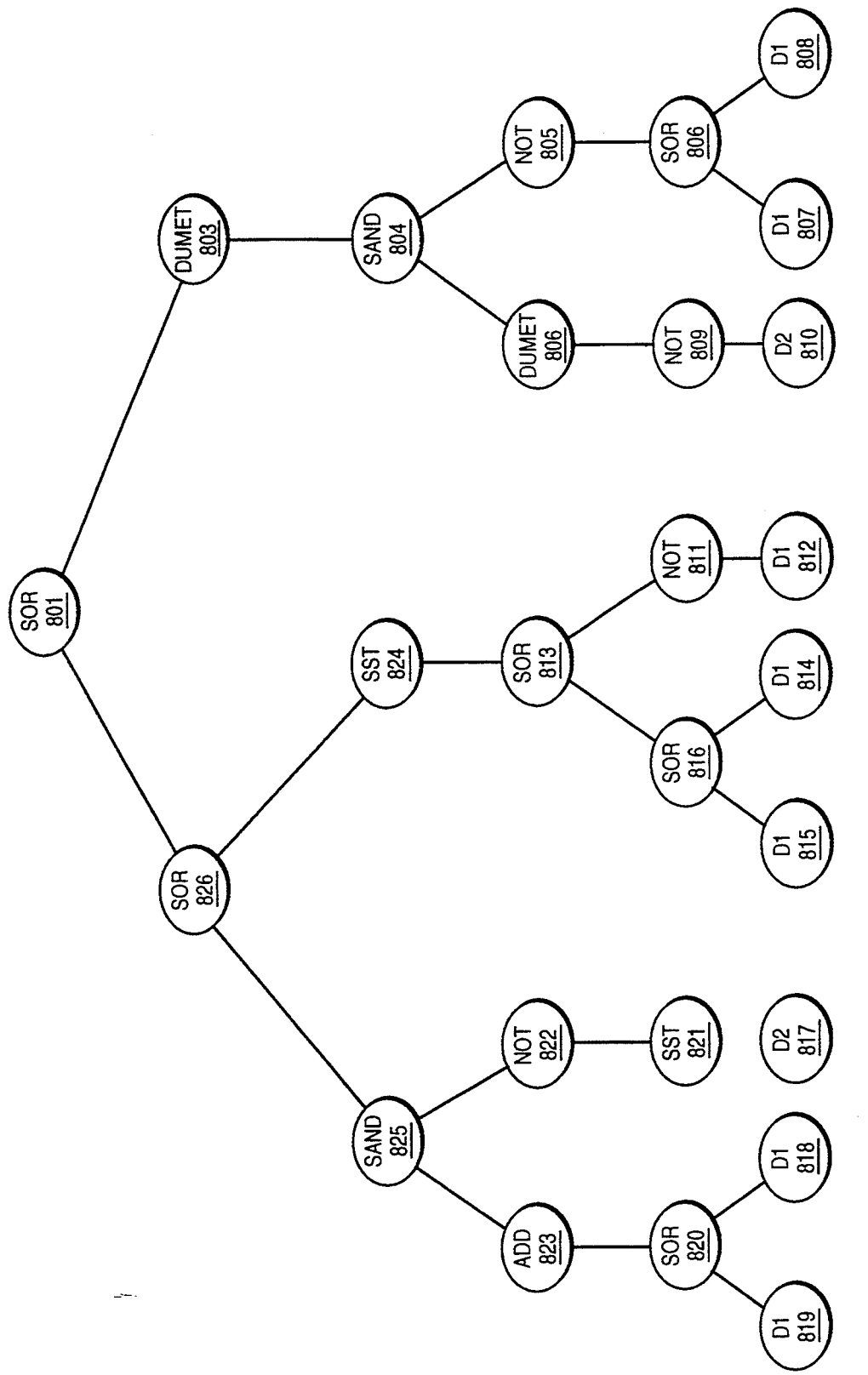
FIG_X

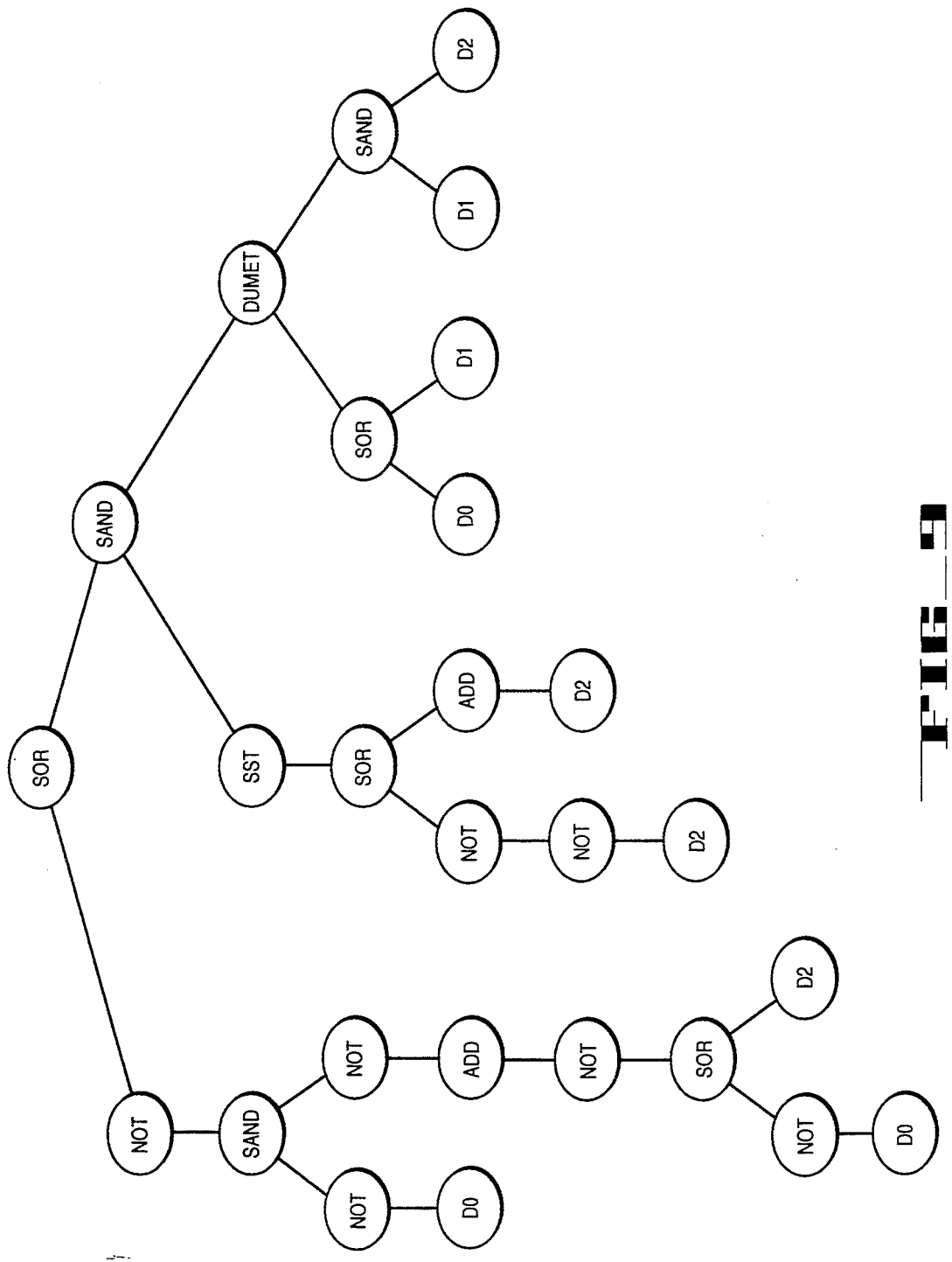
FIG_9

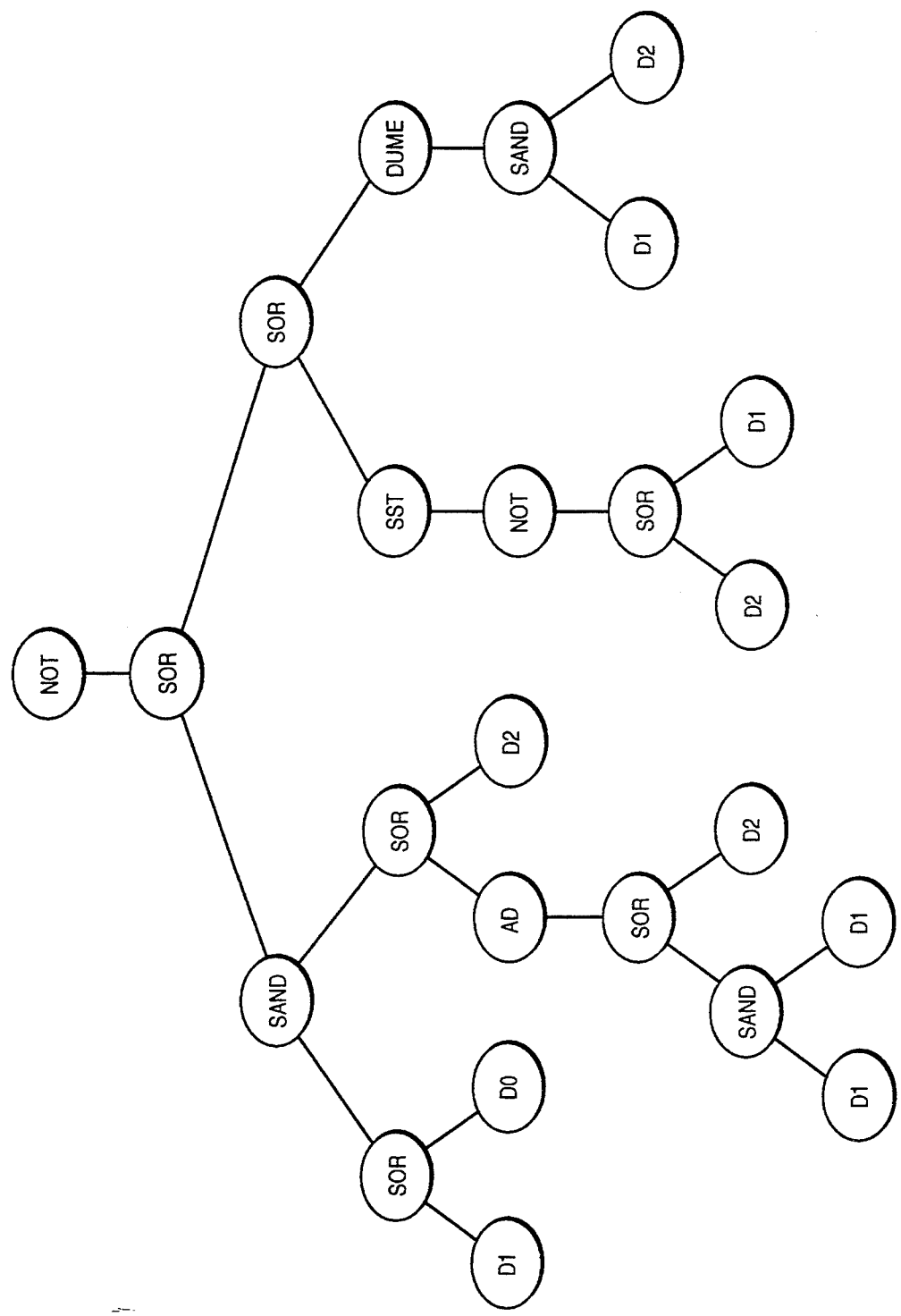
FIG_10

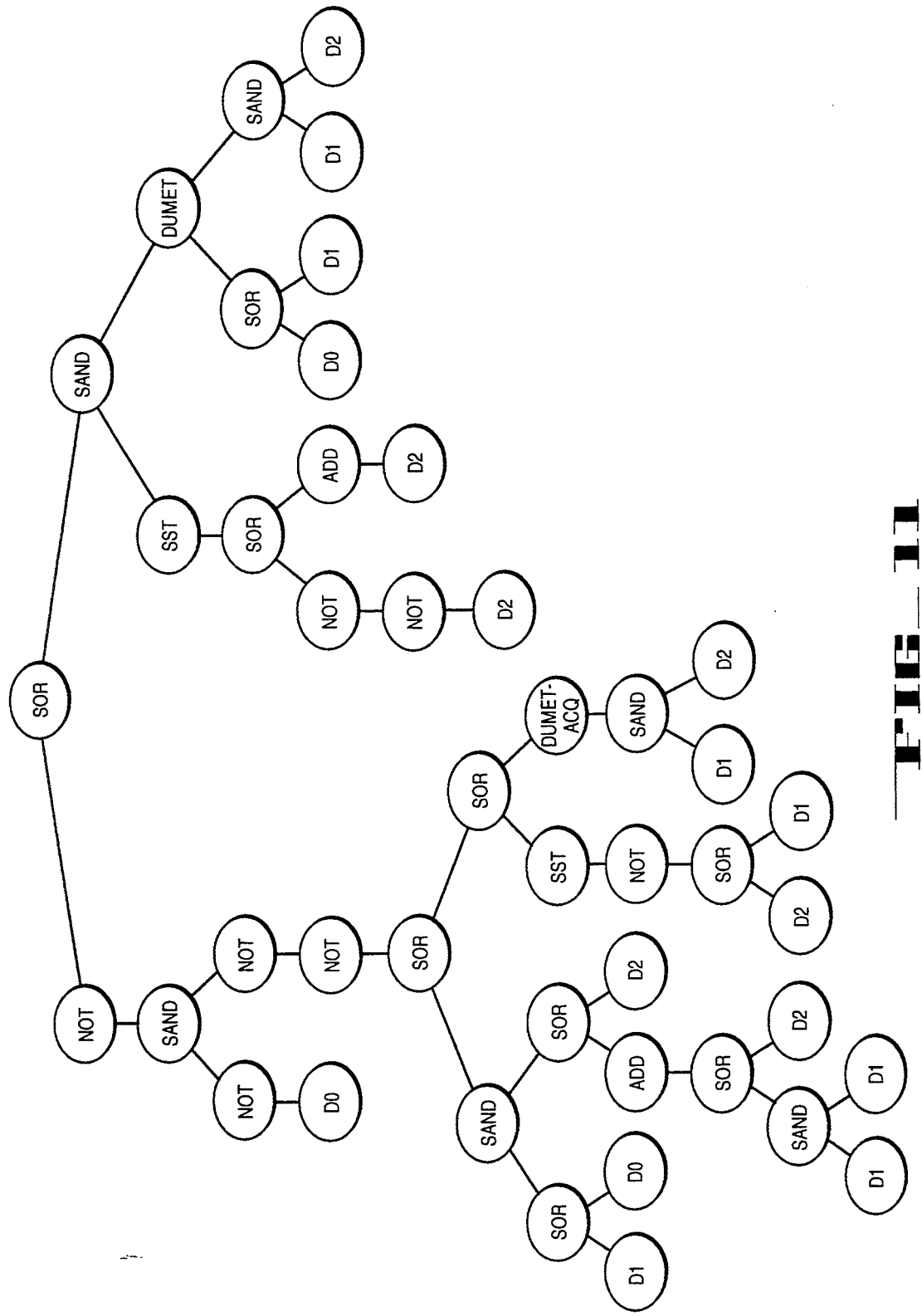
FIG_11

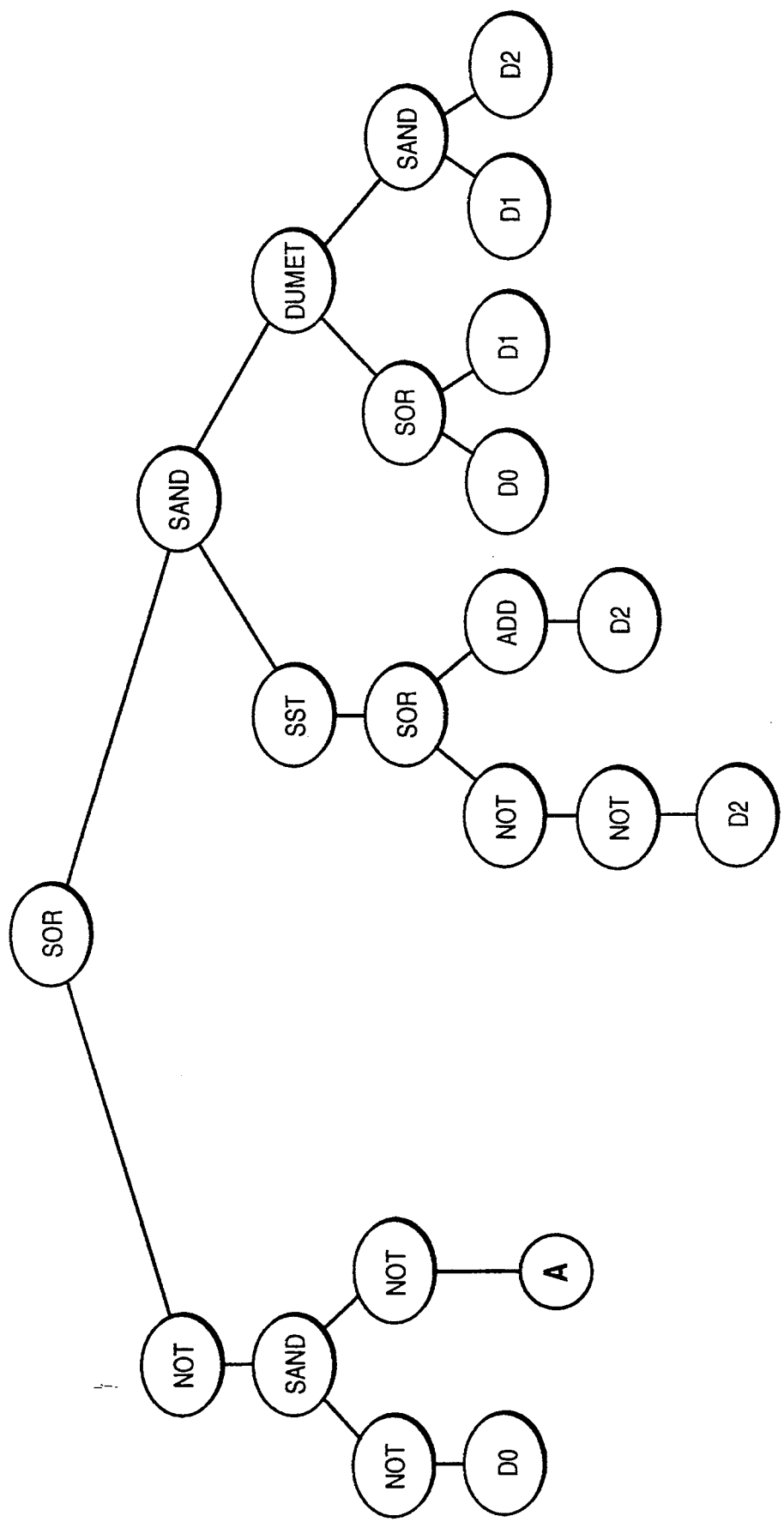
FIG_12A

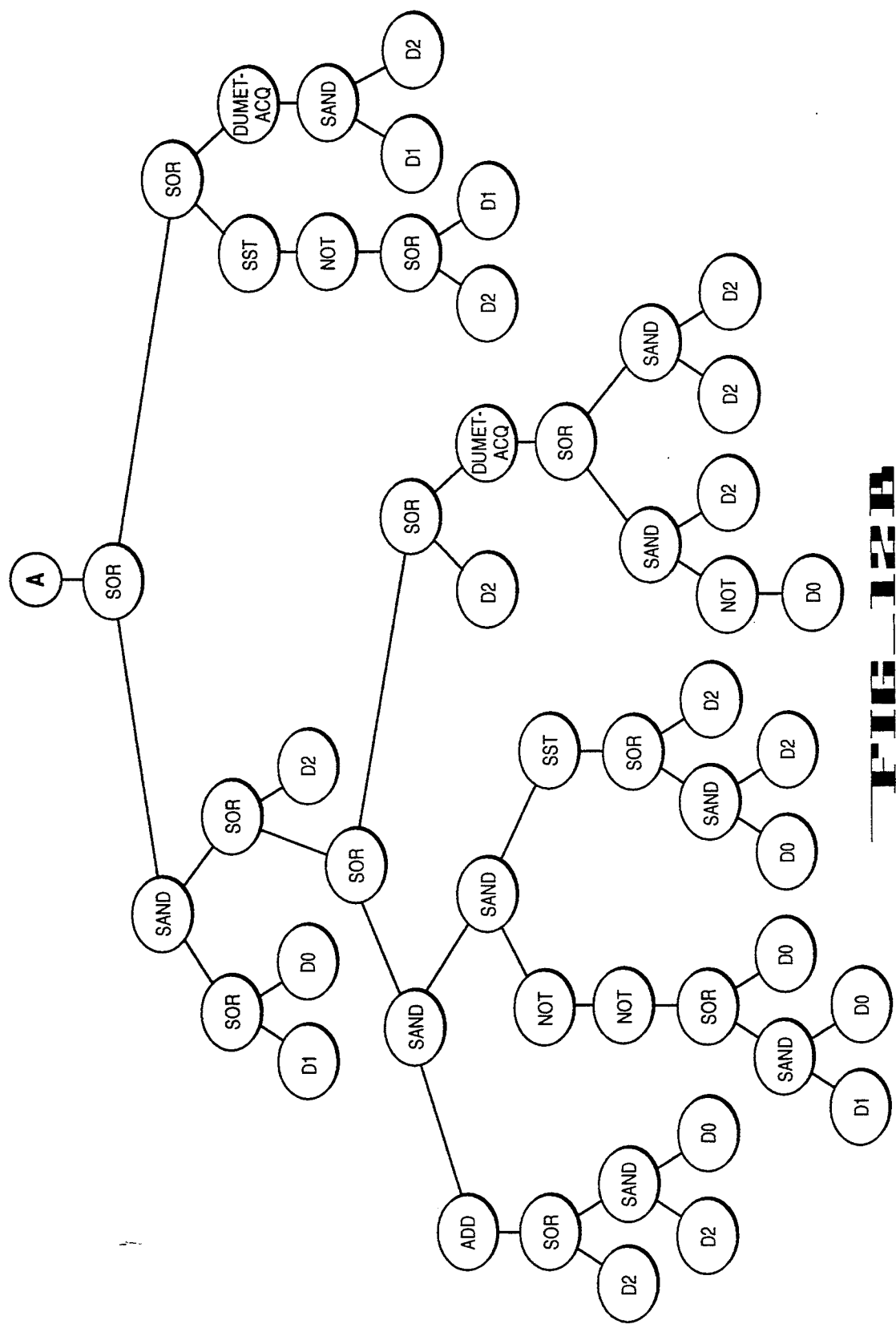
FIG_12B

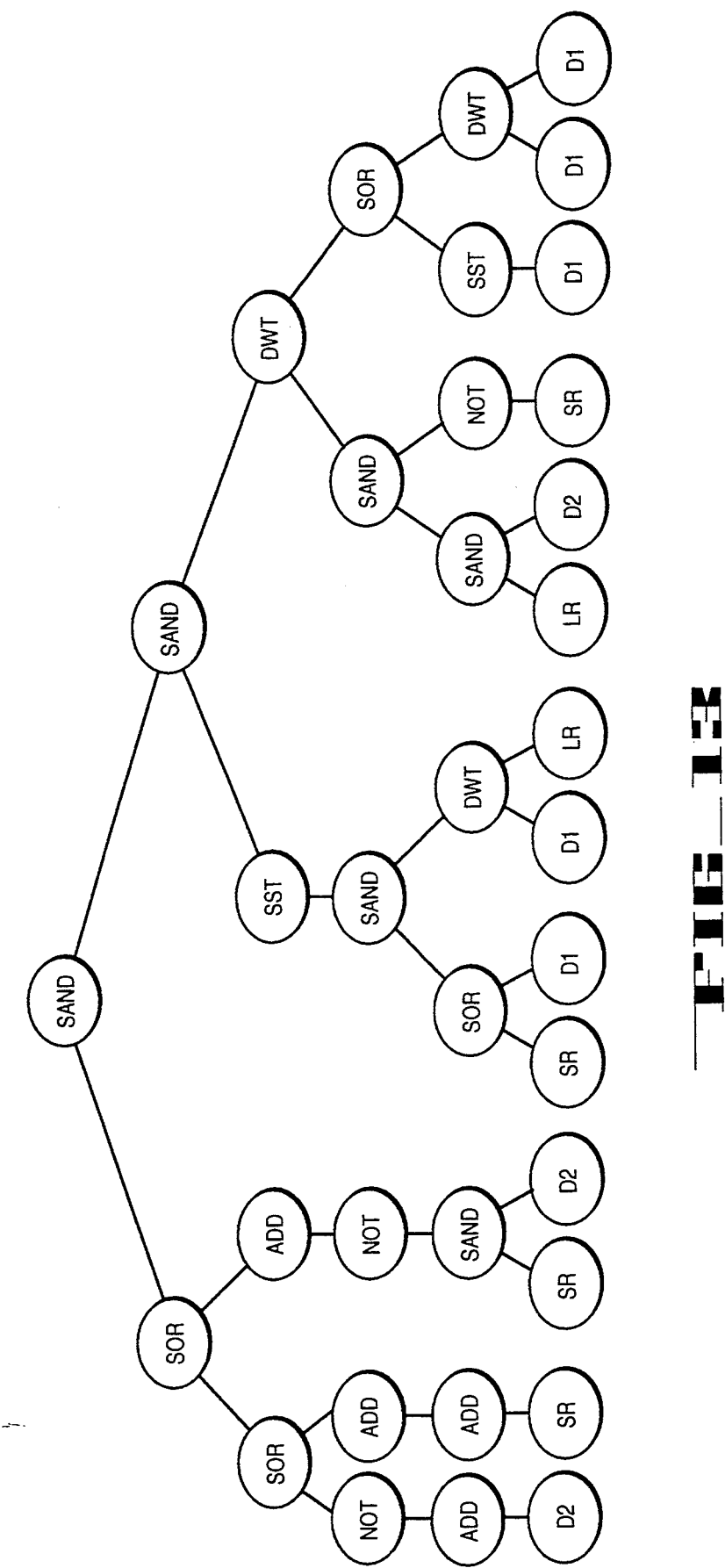
FIG_13

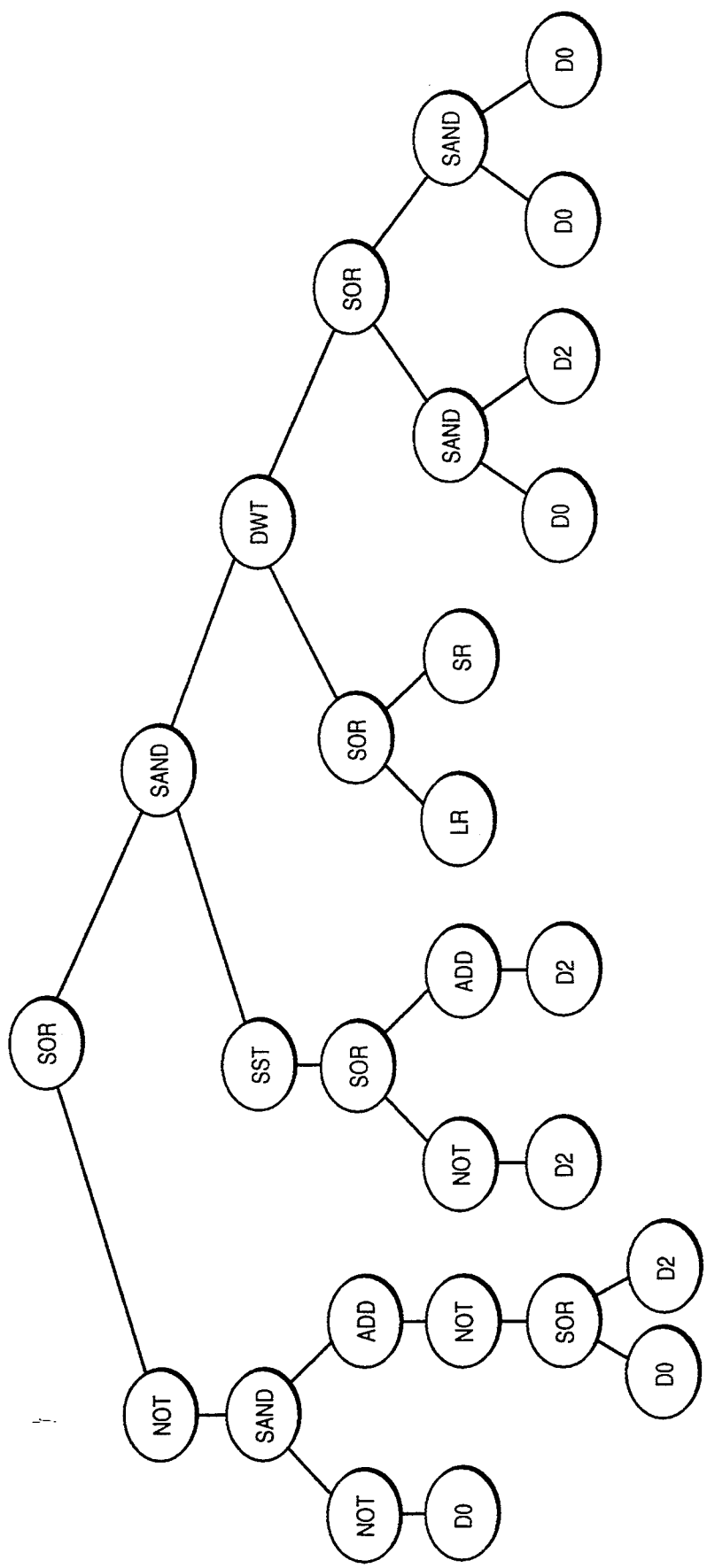
FIG_14

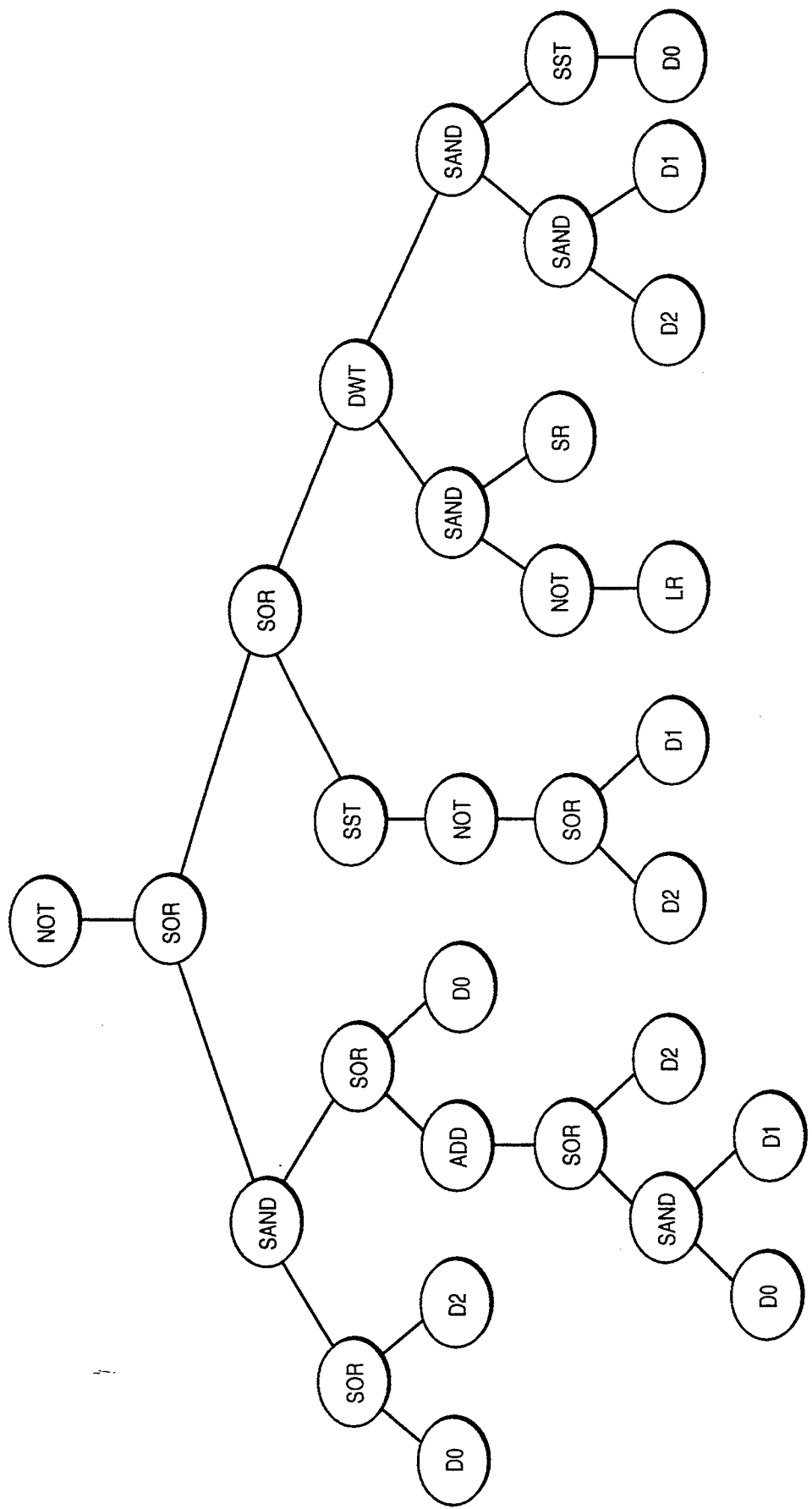
FIG_15

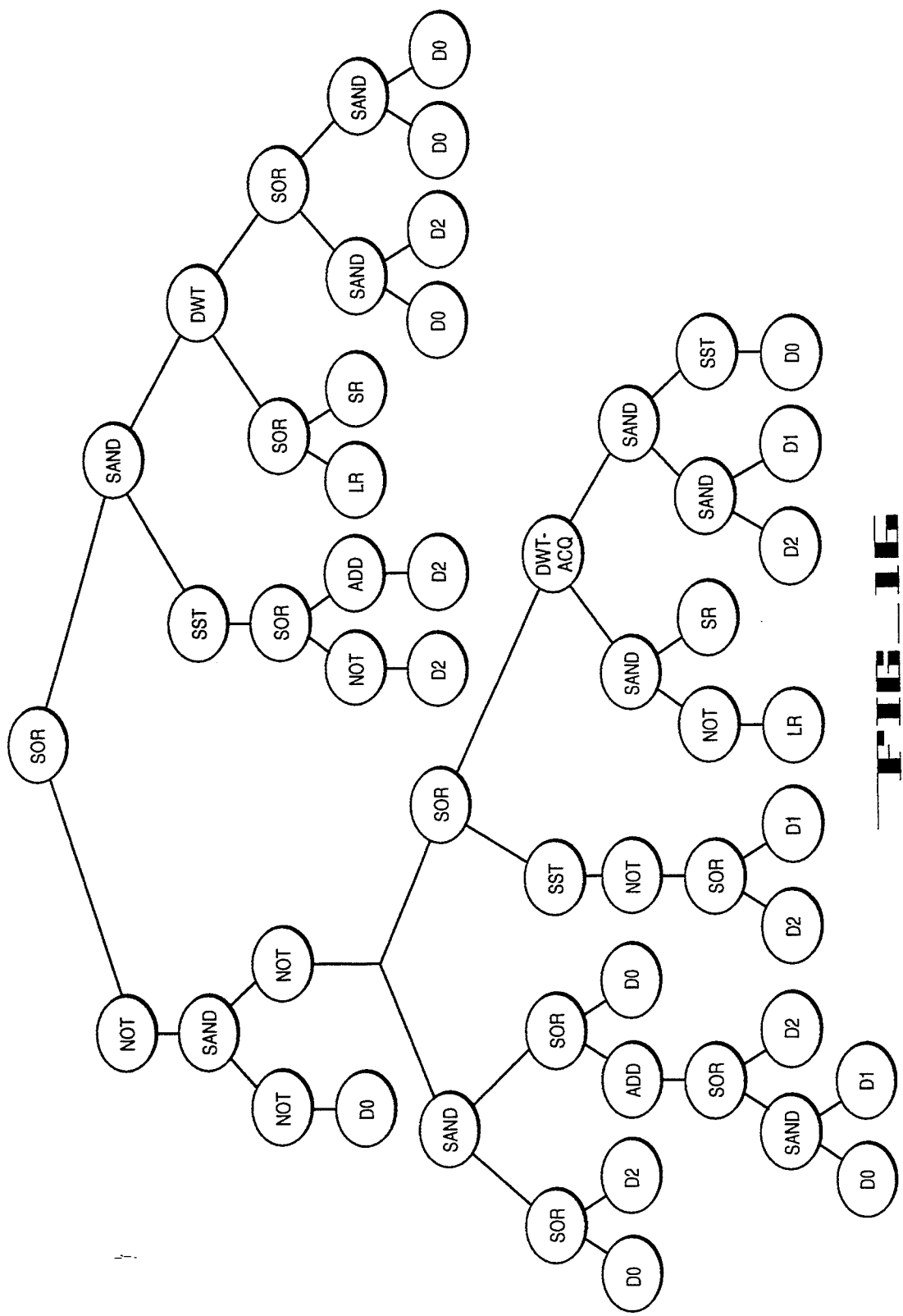
FIG_16

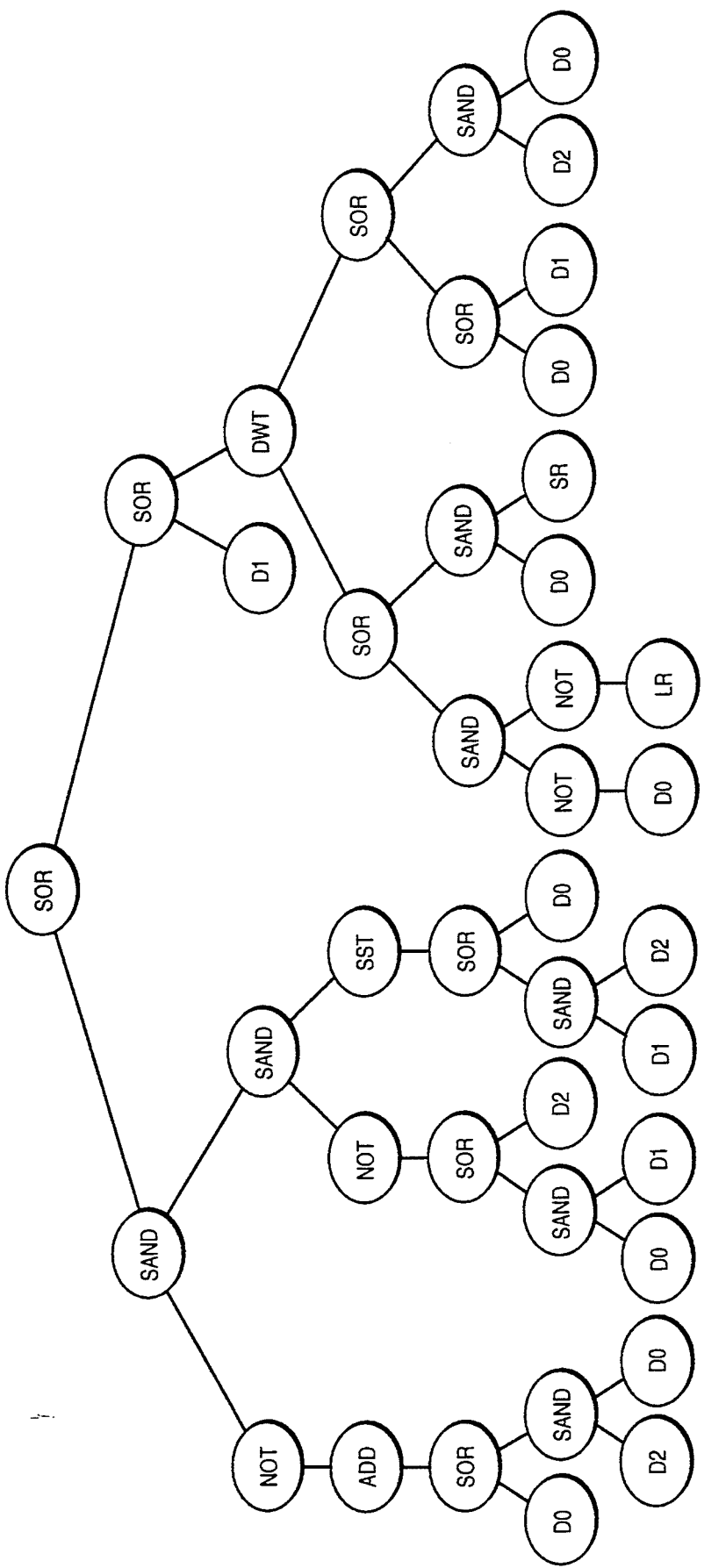
FIG_17

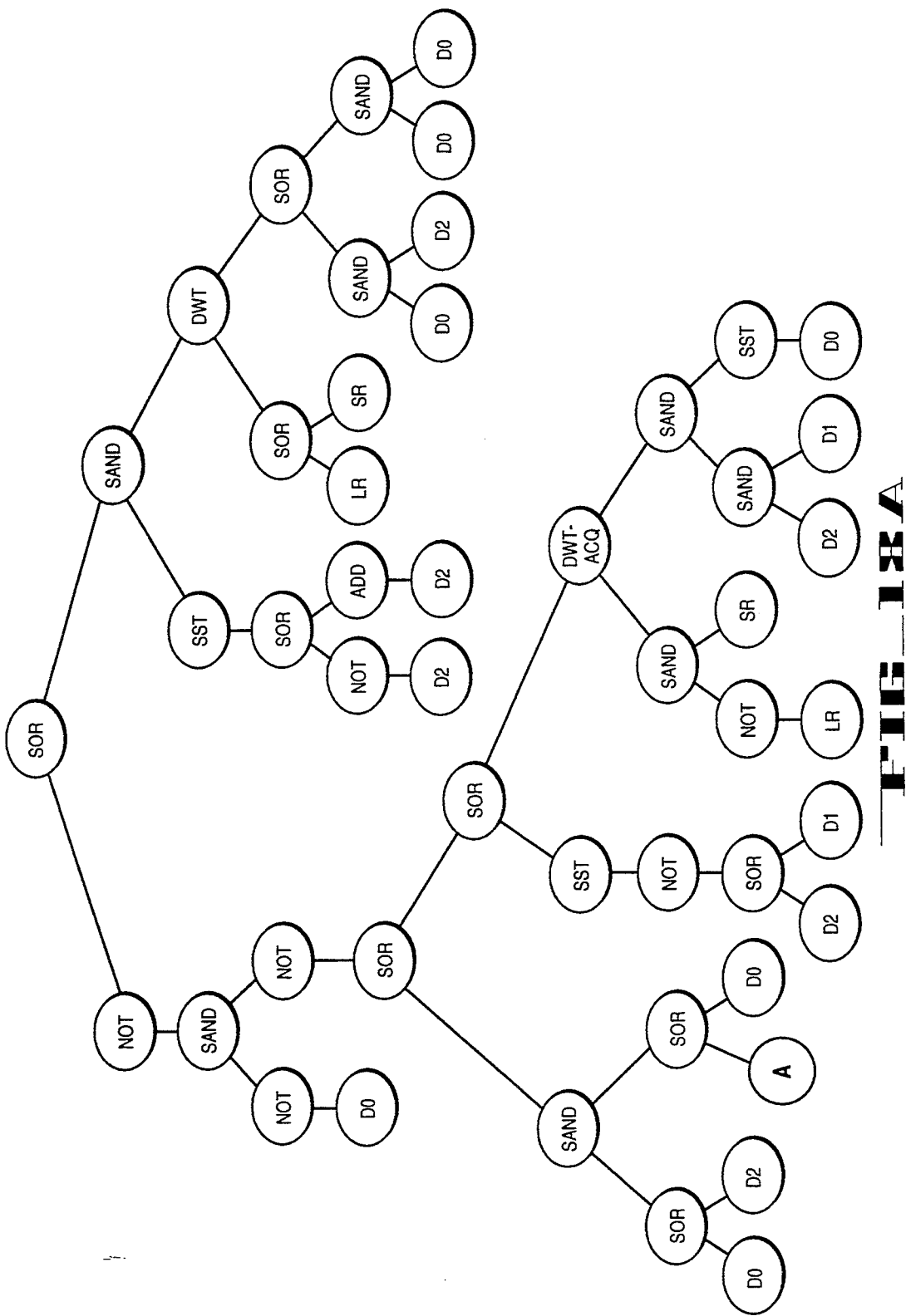
FIG_18A

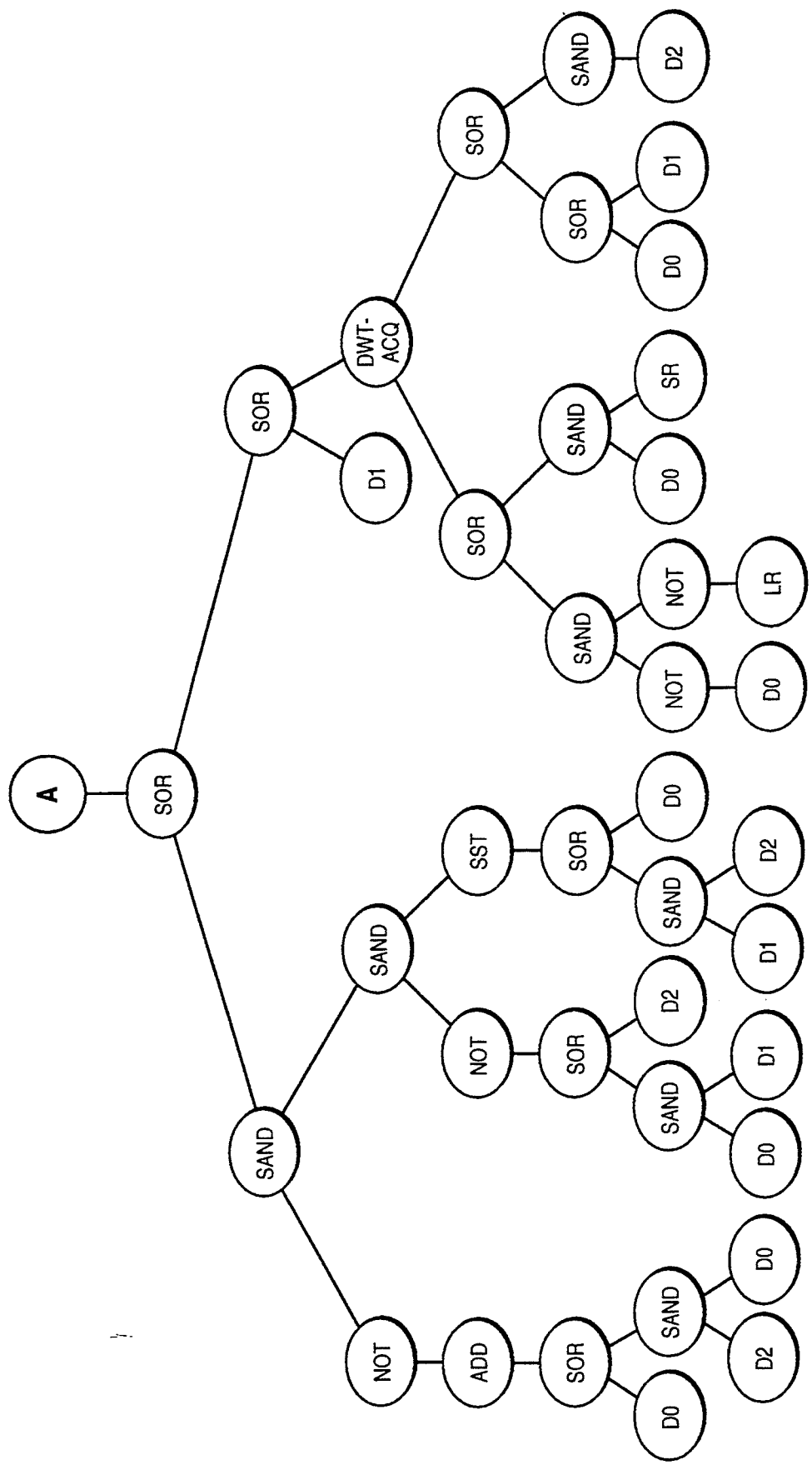
FIG_18B

PROCESS FOR PROBLEM SOLVING USING SPONTANEOUSLY EMERGENT SELF-REPLICATING AND SELF-IMPROVING ENTITIES

FIELD OF THE INVENTION

The field of the invention is evolutionary processes; more particularly, the present invention relates to evolutionary processes useful for problem solving by generating self-replicating and self-improving computer programs.

BACKGROUND OF THE INVENTION

The Natural Selection Process in Nature

The natural selection process provides a powerful tool for problem solving. This is shown by nature and its various examples of biological entities that survive and evolve in various environments. In nature, complex combinations of traits give particular biological populations the ability to adapt, survive, and reproduce in their environments. Equally impressive is the complex, relatively rapid, and robust adaptation and relatively good interim performance that occurs amongst a population of individuals in nature in response to changes in the environment. Nature's methods for adapting biological populations to their environment and nature's method of adapting these populations to successive changes in their environments (including survival and reproduction of the fittest) provides a useful model. This model can be used to develop methods to solve a wide variety of complex problems which are generally thought to require "intelligence" to solve.

In nature, a gene is the basic functional unit by which hereditary information is passed from parents to offspring. Genes appear at particular places (called gene "loci") along molecules of deoxyribonucleic acid (DNA). DNA is a long thread-like biological molecule that has the ability to carry hereditary information and the ability to serve as a model for the production of replicas of itself. All known life forms on this planet (including bacteria, fungi, plants, animals, and humans) are based on the DNA molecule.

The so-called "genetic code" involving the DNA molecule consists of long strings (sequences) of 4 possible gene values that can appear at the various gene loci along the DNA molecule. For DNA, the 4 possible gene values refer to 4 "bases" named adenine, guanine, cytosine, and thymine (usually abbreviated as A, G, C, and T, respectively). Thus, the "genetic code" in DNA consists of a long strings such as CTCGACGGT.

A chromosome consists of numerous gene loci with a specific gene value (called an "allele") at each gene locus. The chromosome set for a human being consists of 23 pairs of chromosomes. The chromosomes together provide the information and the instructions necessary to construct and to describe one individual human being and contain about 3,000,000,000 genes. These 3,000,000,000 genes constitute the so-called "genome" for one particular human being. Complete genomes of the approximately 5,000,000,000 living human beings together constitute the entire pool of genetic information for the human species. It is known that certain gene values occurring at certain places in certain chromosomes control certain traits of the individual, including traits such as eye color, susceptibility to particular diseases, etc.

When living cells reproduce, the genetic code in DNA is read. Subsequences consisting of 3 DNA bases are used to specify one of 20 amino acids. Large biological protein molecules are, in turn, made up of anywhere from 50 to 500 or more such amino acids. Thus, this genetic code is used to specify and control the building of new living cells from amino acids.

The organisms consisting of the living cells created in this manner spend their lives attempting to deal with their environment. Some organisms do better than others in grappling with (or opposing) their environment. In particular, some organisms survive to the age of reproduction and therefore pass on their genetic make-up (chromosome string) to their offspring. In nature, the process of Darwinian natural selection causes organisms with traits that facilitate survival to the age of reproduction to pass on all or part of their genetic make-up to offspring. Over a period of time and many generations, the population as a whole evolves so that the chromosome strings in the individuals in the surviving population perpetuate traits that contribute to survival of the organism in its environment.

Prior Art Genetic Algorithms

Genetic algorithms are highly parallel algorithms that transform populations of individual mathematical objects (typically fixed-length binary character strings) into new populations using operations patterned after (1) natural genetic operations such as sexual recombination (crossover) and (2) fitness proportionate reproduction (Darwinian survival of the fittest). Genetic algorithms begin with an initial population of individuals (typically randomly generated) and then iteratively (1) evaluate the individuals in the population for fitness with respect to the problem environment and (2) perform genetic operations on various individuals in the population to produce a new population. John Holland of the University of Michigan presented the pioneering formulation of genetic algorithms for fixed-length binary character strings in Adaptation in *Artificial and Natural Systems,* by Professor John H. Holland, 1975. Holland established, among other things, that the genetic algorithm is a mathematically near optimal (mini-max) approach to adaptation in that it maximizes expected overall average payoff when the adaptive process is viewed as a multi-armed slot machine problem requiring an optimal allocation of future trials given currently available information. Recent work in genetic algorithms and genetic classifier systems can be surveyed in Grefenstette (1985), Grefenstette (1987), Goldberg (1989), Davis (1987), and Schaffer (1989).

In *Adaptation in Artificial and Natural Systems,* Holland summarizes his research in genetic algorithms and presents an overall mathematical theory of adaptation for both natural and artificial systems. A key part of this book described a "genetic algorithm" patterned after nature's methods for biological adaptation.

Empirical studies by various researchers have demonstrated the capabilities of such genetic algorithms in many diverse areas, including function optimization (De Jong 1980), operation of a gas pipeline (Goldberg 1983), and many others reviewed in Goldberg (1989).

In the chapter entitled "An Overview" contained in the 1987 collection *Genetic Algorithms and Simulated Annealing,* Lawrence Davis and Martha Steenstrup stated, "In all of Holland's work, and in the work of many of his students, chromosomes are bit strings—lists of 0's and 1's." In addition, they continue, "Some researchers have explored the use of other representations, often in connection with industrial algorithms. Examples of other representations include ordered lists (for bin-packing), embedded lists (for factory scheduling problems), variable-element lists (for semiconductor layout), and the representations used by Glover and Grefenstette in this volume."

Some researchers have attempted to solve search and optimization problems using schemes patterned after evolution that employed mutation-plus-save-the-best strategies. Examples are Box (1957), Hicklin (1986), and the 1966 book by Fogel, Owens, and Walsh entitled *Artificial Intelligence Through Simulated Evolution*. The few results obtained from these efforts were highly specific to particular application domains and largely reflect the cleverness of implementation rather than its usefulness as a general technique for achieving adaptive increases in fitness in populations. It is important to note that mutation is not the primary means by which biological populations in nature improve their fitness and it is not the primary means used in the present invention.

Since Holland's 1975 book, Holland and various colleagues have developed a novel application of conventional genetic algorithms called a "genetic classifier system". A classifier system is a group of rules. Each rule consists of a condition part and an action part (i.e. an IF-THEN rule). Both the condition part and action part of each rule are like the individuals in the conventional genetic algorithm in that they are a strings of O's and 1's of fixed length. In a classifier system, messages (consisting of binary strings) are received from the environment and invoke those rules whose conditional part ("IF" part) match the message (binary string) coming in. This invokation triggers the action part ("THEN" part) of the rule. The action part of a rule sends out a new message (binary string).

Classifier Systems are described in the 1978 article "Cognitive Systems based on Adaptive Algorithms" (by Holland and Judith S. Reitman) published in Pattern-Directed Inference Systems, edited by D. A. Waterman and Frederick Hayes-Roth; and David E. Goldberg's 1983 dissertation entitled *Computer-Aided Gas Pipeline Operations Using Genetic Algorithms and Rule Learning*. In classifier systems, credit is assigned to chains of individual rules that are invoked using a credit allocation scheme known as the "bucket brigade". The Holland process is a combination of a classifier system and a "bucket brigade algorithm". A 1987 paper by Cory Fujiki and John Dickinson in *Genetic Algorithms and Their Applications: Proceedings of the Second International Conference on Genetic Algorithms*, (John J. Grefenstette, 1987) describes a computer program written in LISP for solving the Prisoner's Dilemma using binary strings of fixed length and IF-THEN classifier rules. In addition, Smith (1980, 1983) has placed IF-THEN rules in genetic strings in lieu of individual characters.

Genetic algorithms can be divided into two types: linear and non-linear. The process of non-linear genetic algorithms is also called genetic programming. Conventional genetic algorithms are "linear" if they manipulate strings (sequences) of characters over a fixed alphabet (typically strings of binary digits 0 and 1). This is in contrast to the "non-linear" situation in which the objects being manipulated are hierarchical expressions consisting of a hierarchical arrangement of functions and terminals.

The reasons for limiting the conventional genetic algorithm to binary strings of fixed length appear in the literature. First, in his 1983 dissertation entitled *Computer-Aided Gas Pipeline Operation Using Genetic Algorithms and Rule Learning*, David E. Goldberg argues that any binary string of the common fixed length always has an interpretation (via a well-defined representation scheme) to the problem being solved. This might be called the property of being "well defined" and it is a desirable property.

Secondly, if each individual in the population consists of a binary string of fixed length, then the crossover operation will always produce another binary string of fixed length when applied to any two individuals in the population. This might be called a "closure" property and it is also a desirable property. Of course, binary strings of fixed length are not the only way of achieving these desirable properties of closure and being well-defined.

In *Adaptation in Natural and Artificial Systems* (1975, page 71), Holland argues in favor of strings consisting only of 0's and 1's (i.e. binary strings) in the conventional genetic algorithm on the basis that the number of strings in the search space that are searched automatically using what he calls the "implicit parallelism" of the conventional genetic algorithm is highest when the strings consist only of two possibilities. This point is true; however, it should not be the controlling consideration. The field of computer science is replete with other situations where it is highly unrealistic to assume that the size or shape of a problem is known in advance to the solver so that he can use this information to rigidly pre-specify the size and shape of his search in advance.

There is no simple or convenient way to uniquely associate a binary string whose length is predetermined in advance with an arbitrary mathematical expression composed of specified mathematical operations (functions) and terminals. A binary string of length n can only represent $2^n$ different things (no matter what the representation scheme). No matter how large an n is pre-selected in advance, there are always additional mathematical expressions.

Before continuing, it should be emphasized that it is not necessary to represent things of infinite size. Rather, what should be avoided is arbitrarily pre-setting a limit on the size and shape of the things being represented (even though any particular thing will itself be finite in size). In most problems, the size and shape of the solution are not necessarily known in advance. The process of solving the problem should be free to develop proposed solutions without any pre-set limit on the size and shape of the solution.

Even if an arbitrary maximum length specified in advance were acceptable, the method for associating each arbitrary mathematical expression (for example: $A*B+C-D*E*F$) with a binary string would necessarily obscure the underlying mathematical operations involved.

Many problems are best approached by developing hierarchies in which solutions to sub-problems are manipulated and assembled hierarchically into solutions to the original main problem. In fact, many mathematical problems are solved by first "decomposing" a larger problem into smaller sub-problems. Then, an attempt is made to solve each of the sub-problems. And, finally, the solutions to the sub-problems are assembled into a solution to the original problem. The problem of solving large numbers of equations with many variables and solving polynomial equations of high order are examples of problems where decomposition can be used. In some cases, there is a symmetry between this process of assembly and the solution to the individual sub-problems. That is, in this assembly process, the solutions to the sub-problems may be manipulated as if they themselves were merely the elements of a sub-problem.

Even when no symmetry is involved, a "hierarchy" develops when a problem is solved by decomposition. At the lowest level of the hierarchy, the sub-problem is solved. The hierarchy consists of combining the solutions of the sub-problem into the solution to the larger problem. Something similar is commonplace in computer programming in general. For example, sub-routines (or sub-procedures) are typically called by a main program. The main program is at the top of the hierarchy, typically organized to provide an overview of the solution to the whole problem. Each of the sub-routines called by the main program are found at one level lower on the hierarchy. If one of the sub-routines itself happens to call upon another sub-routine, that second sub-routine is one level lower on the hierarchy than the sub-routine which called it. Complex social organizations (such as corporations and military organizations), are similarly organized into hierarchies. The ability to decompose problems into hierarchies of sub-problems is generally important for solving problems.

Background on Genetic Programming Paradigm

Representation is a key issue in genetic algorithm work because genetic algorithms directly manipulate the coded representation of the problem and because the representation scheme can severely limit the window by which the system observes its world. Fixed length character strings present difficulties for some problems—particularly problems in artificial intelligence where the desired solution is hierarchical and where the size and shape of the solution is unknown in advance. The need for more powerful representations has been recognized for some time (De Jong 1985, De Jong 1987, De Jong 1988).

The structure of the individual mathematical objects that are manipulated by the genetic algorithm can be more complex than the fixed length character strings. Smith (1980, 1983) departed from the early fixed-length character strings by introducing variable length strings, including strings whose elements were if-then rules (rather than single characters). Holland's introduction of the classifier system (1986) continued the trend towards increasing the complexity of the structures undergoing adaptation. The classifier system is a cognitive architecture into which the genetic algorithm is embedded so as to allow adaptive modification of a population of string-based if-then rules (whose condition and action parts are fixed length binary strings).

In addition, we have recently shown that entire computer programs can be genetically bred to solve problems in a variety of different areas of artificial intelligence, machine learning, and symbolic processing (Koza 1989, 1990). In this recently developed "genetic programming" paradigm, the individuals in the population are compositions of terminals and functions appropriate to the particular problem domain. The set of terminals used typically includes inputs appropriate to the problem domain and various constants. The set of functions used typically includes arithmetic operations, mathematical functions, conditional logical operations, and domain-specific functions. Each function in the function set must be well defined for any element in the range of every other function in the set which may appear as an argument to that function.

In solving problems with genetically bred computer programs using a population composed of terminals and functions appropriate to the particular problem domain, a search space is developed for solving the problem in conjunction with the computer programs. This search space is the hyperspace of all possible compositions of functions that can be recursively composed of the available functions and terminals. The symbolic expressions (S-expressions) of the LISP programming language are an especially convenient way to create and manipulate the compositions of functions and terminals described above. These S-expressions in LISP correspond directly to the "parse tree" that is internally created by most compilers.

The basic genetic operations for the genetic programming paradigm are reproduction and crossover (recombination). Fitness-based reproduction is the basic engine of Darwinian reproduction and survival of the fittest and operates for the genetic programming paradigm in the same way as it does for conventional genetic algorithms. The most common form of fitness-based reproduction is fitness-proportionate reproduction. The crossover operation for the genetic programming paradigm is a sexual operation that operates on two parental programs (i.e. LISP S-expressions) and produces two offspring S-expressions using parts of each parent. In particular, the crossover operation creates new offspring S-expressions by exchanging sub-trees (i.e. sub-lists) between the two parents. Because entire subtrees are swapped, this genetic crossover (recombination) operation produces syntactically and semantically valid LISP S-expressions as offspring regardless of which allowable point is selected in either parent.

The calculation of the fitness measure is an explicit calculation and the individuals in the population are passive. The genetic algorithm measures the fitness of each individual via some explicit calculation and then applies genetic operations to the passive individuals in the population on the basis of that computed fitness. In contrast, in nature, fitness is implicit and the individuals are active. Each individual has the capacity for reproduction (either alone or in conjunction with a mate). Individuals act independently without centralized control or direction. If the individual is successful in grappling with its environment, it may survive to the age of reproduction and reproduce. In other words, the individuals in the population have the ability to reproduce themselves and their fitness is represented by the fact that they reproduce.

In nature, the evolutionary process occurs when four conditions exist: (1) An entity must have the ability to reproduce itself; (2) There must be a population of such self-reproducing entities; (3) There must be some variety among the population; (4) There must be some difference in ability to survive in the environment associated with the variety.

In a population of entities, the presence of some variability that is associated with some difference in the survival rate is almost inevitable. As Charles Darwin observed in *On the Origin of Species by Means of Natural Selection* (1859), "I think it would be a most extraordinary fact if no variation ever had occurred useful to each being's own welfare . . . But if variations useful to any organic being do occur, assuredly individuals thus characterized will have the best chance of being preserved in the struggle for life; and from the strong principle of inheritance they will tend to produce offspring similarly characterized. This principle of preservation, I have called, for the sake of brevity, Natural Selection." Thus, the first of the above four conditions (the ability to self-replicate) is, in practice, the crucial one for starting the evolutionary process. It is important to note that evolution is not purposive in the sense that it seeks to reach some predefined goal (Buss 1987). Instead, the survival and reproduction of individuals in their environment produce, over time, changes in the population.

Prior Art of Artificial Life and Carbon-based Life Forms

In nature, carbon-based life forms exploit energy available from the environment (primarily the sun) to organize available matter from the environment in order to survive, reproduce, and evolve. This exploitative and organizational process operates within the constraints of the rules of physical interaction governing the matter involved, notably the rules of physical interaction of atoms of carbon, hydrogen, oxygen, nitrogen, and other elements found in organic molecules.

The field of artificial life contemplates alternatives to the single carbon-based example of life on earth. One such alternative involves computational structures (such as programs within the digital environment of a computer) that exploit computer time to organize memory in order to survive, reproduce, and improve themselves (Langton 1989; Langton et al. 1991; Langton 1991a, 1991b). In analogy to nature, the computer time corresponds to the energy available from the environment and the computer memory corresponds to matter available from the environment. This exploitative and organizational process operates within the constraints of the transition rules by which the primitive computational operations change the state of the computer memory.

In lectures at the University of Illinois in 1949, John von Neumann demonstrated the possibility of self-replicability of a computational structure by describing a large self-reproducing automaton consisting of about 40,000 identical 29-state automata in a two-dimensional cellular arrangement (Burks 1966, 1970, 1987). The next state of each 29-state automaton was a function of its own current state and the states of its four immediately adjacent neighbors in the cellular space (i.e., the neighbors which lie north, south, east and west of the automaton).

Von Neumann's 40,000-cell 29-state self-reproducing automaton has the functionality of a universal Turing machine and had a virtual input tape composed of cells in the cellular space. This computation-universal automaton is a fortjori construction-universal in the sense that it could read its input tape, interpret the data on the tape, and construct the configuration described by the tape in an unoccupied part of the cellular space using a constructing arm (composed of cells in the cellular space). Von Neumann's automaton is also capable of rereading the tape, making an uninterpreted copy of the tape, attaching the copy to the configuration just constructed, signaling the completion of the construction process to the configuration just constructed, and retracting the constructing arm. By placing a description of the constructing automaton itself on the tape of a universal Turing machine, a self-reproducing automaton is created.

Von Neumann's self-reproducing automaton treats the information on the tape to the Turing machine in two distinct ways (Langton 1983, 1986). First, the information on the tape is read and actively interpreted as instructions to be executed in order to construct the desired configuration in an unoccupied part of the cellular space. Second, the information on the tape is read a second time merely as passive data which is to be copied, in an uninterpreted way, to the tape of the new configuration. The discovery by Watson and Crick of the self-replicating mechanism of deoxyribonucleic acid (DNA) in 1953 provides an analogy in nature for von Neumann's dual treatment of the information on the tape (Schuster 1985; Bagley and Farmen 1991).

Subsequently, Codd (1968), Langton (1983), Ray (1990, 1991a, 1991b), and others have designed other self-reproducing automata or computer programs. Codd simplifies von Neumann's design by designing a computationally universal, self-reproducing automaton consisting of about 2,000 identical eight-state automata in a cellular space. The next state of each of Codd's eight-state automata is, like Von Neumann's automata, a function of its own current state and the states of its four neighbors.

Langton, in observing that the capability of computational universality found in von Neumann's and Codd's self-reproducing automata is not known to be present in any self-replicating molecules or in the biological structure of any living entity, designed a 100-cell eight-state self-reproducing cellular automaton. In Langton's automaton, the coded description endlessly circulates temporally in a manner reminiscent of the delay-line storage devices used in early computers.

Ray (1990, 1991a, 1991b) wrote an 80 line self-reproducing computer program in a hypothetical assembly language (Tierra) for a hypothetical virtual machine. His hand-written ancestral program evolved via random mutation and exhibited an impressive variety of biological phenomena, which included parasitism, defenses against parasitism, biological arms races, hyper-parasitism, and social parasitism.

Ray's program uses the technique described by Laing (1977) of letting the program serve as its own description. As Ray's program executes, certain assembly-code instruction have the capability of searching memory backward and forward from its own location for the first occurrence of a sequence of four consecutive NOP (No-Operation) instructions having specified sequence of bits in their data fields (this bit pattern being called a template). In writing his self-reproducing program, Ray put a certain identifying template at the beginning of his program and another identifying temperate at its end. Ray's program is capable of performing a self-examination to locate these two templates. His program is then able to calculate its own size by subtracting the memory addresses of the two templates discovered by this self-examining search. Ray then wrote a loop in which each instruction between the now-located beginning and now-located end of his program was first loaded (copied) from memory into a register of his virtual machine and then stored (copied) from the register into an unoccupied area of memory. Thus, Ray's program is able to make an exact copy of itself. A special assembly-code instruction MAL ("Memory Allocation") causes the operating system to allocate an unoccupied area of memory to an offspring and to designate that new area as being an independent new entity. Ray's program uses data in the same dual way used by DNA and the designs of von Neumann, Codd, and Langton in that it actively executes it 80 assembly-code instructions as instructions and it passively copies its 80 instructions as data. However, in contrast to DNA and the designs of von Neumann, Codd, and Langton, Ray's program does not use a separate coded description of the entity to be reproduced; instead, it uses the program itself as its own description.

An important design feature of Ray's Tierra system is that no numerical memory address (either absolute or relative) appears as part of an assembly code instruction. Ray achieves this in two ways. First, he avoided numerical memory addresses entirely as the operands of his assembly-code instructions. He did this by designing his virtual machine with only four registers and one small stack (capable of storing up to ten items). Both the operation code of each assembly-code instruction and its associated operand (if any) is compressed into only five bits. Some of Ray's operation codes occupy three bits while others occupy four bits. For the operations whose operation code occupies three bits, the remaining two bits designate a particular one of four registers to be used in conjunction with the operation. For the operations whose operation code occupies four bits, the remaining bit is a data bit.

Second, Ray's biologically-motivated scheme for template matching eliminates the need to refer to a location in memory via a numerical memory address. Specifically, a template consists of four (or some other specified number) of consecutive NOP instructions, each with a one-bit data field. A searching template is deemed to have found a match in memory if it finds four consecutive NOP instructions whose data bits are complementary to the data bits of the searching template. The search is limited to a specified small bounded area of memory. Thus, it is possible to transfer control (i.e., jump) to a particular location in memory without ever referring to a specific numerical address by searching memory for the nearest occurrence of a matching (i.e., complementary) template. Similarly, a particular location in memory (such as the beginning and end of the program) may be located without ever referring to its specific numerical memory address in the operand of an assembly-code instruction.

All four of the above self-reproducing entities exploit the ability of their computer milieu to create, at one critical moment, a copy of a desired elemental part of the whole entity. This is accomplished by freely changing the state of some elemental part of the computer memory to a specified desired new state. This ability corresponds to the availability in nature of sufficient free matter and free energy to create a desired elementary part (usually a complementary version of that which is being copied). This key step highlights the fact that life, natural or artificial, is an information-organizing capability.

All three of the above self-reproducing automata take advantage of the particular state transition function that is simultaneously and uniformly applied to all the cells of the cellular space. Similarly, Ray's self-reproducing program takes advantage of the particular state transitions that are permitted by his set of assembly-code instructions. In nature, molecular self-replication takes advantage of the particular physical laws governing the interaction of atoms and the organic molecules involved. If the state transition functions employed by a particular artificial self-reproducing entity are too powerful, the issue of self-reproduction becomes trivial. The designs of von Neumann, Codd, Langton, and Ray avoid triviality because the copying is directed by instructions residing primarily in the entity itself (rather than its milieu), because one elemental part is copied at a time, and because the state transition functions have a generic character. However, none of the above entities exhibits evolutionary self-improving behavior or the ability to learn.

Holland's ECHO system (1990, 1992) for exploring evolution in a miniature world of coevolving creatures uses a template-matching scheme similar to Ray's. In ECHO, a search template (usually consisting of a part of a binary string) is deemed to match a site (also consisting of a part of a binary string) if the bits match (starting from, say, the left) for the number of positions they have in common. Skipper (1991) presents a model of evolution incorporating several of the above features.

Self-reproducing computer programs have been written in FORTRAN, C, LISP, PASCAL, and many other languages (Bratley and Millo 1972; Burger, Brill, and Machi 1980). In 1960, one of the present inventors, Dr. John Koza, created a self-reproducing assembly language program that knew its beginning and end, using their addresses in memory, and would make a copy of itself onto punched cards upon exiting the computer system. A block of code representing the loader would precede the assembly language program on the deck of punched cards. The loader would load the deck of cards representing the assembly language program into the computer system, thereby causing the program to be executed. Upon having to exit the system, before the goal or function of the program was complete, the program would make a copy of itself onto punched cards, which could be reloaded at another time to continue computation towards the goal. Thus, the program, in conjunction with the self-contained loader, was self-activating. The authors of computer viruses and worms have written self-reproducing programs that operate within various computers (Dewdney 1985, 1989; Spafford 1991). Programs entered into a the Core Wars tournaments typically have self-replicating features (Dewdney 1984, 1987). All of the above self-reproducing programs have the crucial common feature of creating a copy of a given instruction at one critical point in their operation. In each instance, they create the copy by exploiting the ability of the milieu in which they are operating to change (in the manner permitted by the rules of interaction of the milieu) the state of some part of the computer memory to a specified desired new state (which is, in each instance, a copy of something). That is, there is an assumption that there is sufficient free energy and free matter available in the milieu to create a copy of a specified thing.

In von Neumann's and Codd's self-reproducing cellular automata, the copy is created by interpreting the coded description on the tape as instructions which cause the construction, piece by piece, of the new machine in an unoccupied part of the cellular space. The copying actually occurs at the moment when the state of some previously quiescent 29-state automaton immediately adjacent to the tip of the constructing arm in the cellular space is changed to the desired new state. This crucial state transition can occur because the rules of the milieu permit it and because there is sufficient free energy and free matter available in the milieu to permit the creation of a copy of the desired thing. The copying is done without depleting or affecting the original coded description in any way. The making of the copy of the description occurs at a time different from the construction of the offspring.

In Langton's self-reproducing cellular automaton, the coded description circulates endlessly in a channel of automata. The channel is much like a race-track in that, for most points along the channel, there is only one automaton that is poised to receive whatever was emitted by its immediately adjacent predecessor in the channel. However, at one particular point in the channel, there are two automata that are poised to receive whatever is emitted by the immediately adjacent predecessor. At this fan-out point in the channel, one copy of the coded description goes off toward an unoccupied part of the cellular space while another copy of the original description continues circulating around the original channel. The copying actually occurs at the moment when the state of the two previously quiescent eight-state automata immediately adjacent to automaton at the fan-out point is changed to the specified new state. This crucial state transition can occur because the rules of the milieu permit it and because there is sufficient free energy and free matter available in the milieu to create a copy of a specified thing (i.e., the copying is done without depleting or affecting the original coded description).

In Ray's self-reproducing program, certain instructions inside an iterative loop make a copy of what the program finds from a self-examination. The program serves as its own description. Inside the iterative loop, each assembly-code instruction constituting the program is copied, one by one, from memory into a register and then immediately stored from that register into an unoccupied area of memory. The LOAD REGISTER and STORE instructions are what create the copy. In Ray's program, the copying occurs in two steps. First, copying occurs when the state of the previously quiescent register is changed into the specified new state (i.e., the one assembly-code instruction which the LOAD REGISTER instruction deposits into the register). Second, copying occurs when the state of the previously quiescent memory location (i.e., the location into which the STORE instruction deposits the contents of the register). These crucial state transitions can occur because the rules of the milieu permit them and because there is sufficient free energy and free matter available in the milieu to create a copy of a specified thing (i.e., copying is done without depleting or affecting that which is copied). Fontana (1991) and Rasmussen, Knudsen, and Feldberg (1991) have addressed similar issues.

Limitation in the Prior Art Self-Replication Schemes

Von Neumann recognized that a certain "minimum number of parts" was a necessary precondition for self-reproduction. He observed that a machine tool that stamps out parts is an example of "an organization which synthesizes something [that is] necessarily more complicated . . . than the organization it synthesizes" (Burks 1987). Unlike the machine tool, living organisms can produce things as complicated as themselves (via reproduction) and can produce things more complicated than themselves (via evolution). Von Neumann concluded "there is a minimum number of parts below which complication is degenerative, in the sense that if one automaton makes another, the second is less complex than the first, but above which it is possible for an automaton to construct other automata of equal or higher complexity" (Burks 1987).

The probability of generating von Neumann's particular 40,000-cell 29-state self-reproducing automaton via blind random search is one in $29^{40,000} \approx 10^{58,496}$. This rough calculation ignores all symmetries and equivalences in functionality and takes no account of the complexity of the milieu itself. Similarly, the probability of finding Codd's 2,000-cell eight-state automaton is one in $8^{2,1000} \approx 10^{1,806}$ while Langton's 100-cell eight-state automaton is one in $8^{100} \approx 10^{91}$. Ray's program consists of 80 five-bit assembly-code instructions, so the probability of randomly generating this program is one in $32^{80} \approx 10^{120}$. Even one chance in $10^{91}$ (the best of the above probabilities)is far too remote to achieve spontaneous emergence of any of the above four self-reproducing entities.

As von Neumann recognized, once spontaneous emergence of a self-reproducing entity occurs in a particular milieu, self-reproducing entities cannot only reproduce, but multiply. He noted, "living organisms are very complicated aggregations of elementary parts, and by any reasonable theory of probability or thermodynamics, highly improbable . . . [however] if by any peculiar accident there should ever be one of them, from there on the rules of probability do not apply, and there will be many of them, at least if the milieu is reasonable" Von Neumann further noted, "produc[ing] other organisms like themselves . . . is [the] normal function [of living organisms]. [T]hey wouldn't exist if they didn't do this, and it's plausible that this is the reason why they abound in the world" (Burks 1987).

Darwin recognized that once a diverse population of self-replicating structures has been created, the structures (and their variants) that are fitter in grappling with the problems posed by the environment tend to survive and reproduce at a higher rate. This natural selection results in the evolution of structures that are improvements over previous structures.

However, the size, complexity, and intricacy of the self-producing entities of von Neumann, Codd, Langton and Ray indicate that the organizational complexity required for self-replicability is very high, and, therefore, the possibility of spontaneous emergence of self-replicability is very low. Likewise, the possibility of sexual reproduction and evolutionary self-improving behavior is low.

As will be shown, the present invention discloses a process that produces spontaneously emerging self-replicating computer programs. Moreover, the emergence comes about in a reasonable amount of time. Furthermore, the present invention generates the self-replicating computer programs using a blind random generative process. Moreover, the present invention generates spontaneously emergent self-replicating programs which exhibit evolutionary self-improving behavior and learning ability.

References Cited

U.S. PATENTS

U.S. Pat. No. 4,935,877, "Non-Linear Genetic Algorithms for Solving Problems", issued Jun. 19, 1990, filed May 20, 1988, Koza.

U.S. Pat. No. 4,697,242, "Adaptive Computing System Capable of Learning and Discovery", issued Sep. 29, 1987, filed Jun. 11, 1984, Holland et al.

U.S. Pat. No. 4,881,178, "Method of Controlling a Classifier System", issued Nov. 14, 1989, filed May 7, 1987, Holland et al.

OTHER PUBLICATIONS

Bagley, Richard J. and Farmer, J. Doyne. 1991. Spontaneous emergence of a metabolism. In Langton, Christopher, et al. (editors). *Artificial Life II,* Addison-Wesley.

Berlekamp, E. R., Conway, J. H., Guy, R. K., *Winning Ways.* (Academic Press, London, 1985), Vol. 2. pp. 817–850.

Box, G. E. P., "Evolutionary Operation: A Method for Increasing Industrial Productivity", *Journal of the Royal Statistical Society,* 6(2), 81–101.

Bratley, Paul, and Millo, Jean. 1972. Computer recreations: Self-reproducing programs. *Software Practice and Experience.* 2:397–400.

Burger, John, Brill, David, and Machi, Filip. 1980. Self-reproducing programs. Byte. 5 (August) 72–74.

Burks, Arthur W. 1966. Theory of Self-Reproducing Automata. University of Illinois Press.

Burks, Arthur W. 1970. *Essays on Cellular Automata.* University of Illinois Press.

Burks, Arthur W. 1987. Von Neumann's self-reproducing automata. In Aspray, William and Burks, Arthur (editors). *Papers of John von Neumann On Computing and Computer Theory.* MIT Press.

Buss, Leo W. 1987. *The Evolution of Individuality.* Princeton University Press.

Codd, Edgar. F. 1968. Cellular Automata. Academic Press.

Davis, Lawrence (Editor)—*Genetic Algorithms and Simulated Annealing,* Pitman, London 1987.

De Jong, Kenneth A. Genetic algorithms: A 10 year perspective. *Proceedings of an International Conference on Genetic Algorithms and Their Applications.* Hillsdale, N.J.: Lawrence Erlbaum Associates 1985.

De Jong, Kenneth A. "On Using Genetic Algorithms to Search Program Spaces", *Genetic Algorithms and Their Applications: Proceedings of the Second International Conference on. Genetic Algorithms.* Hillsdale, N.J.: Lawrence Erlbaum Associates 1987.

De Jong, Kenneth A. Learning with genetic algorithms: an overview. *Machine Learning.* 3(2), 121–138, 1988.

Dewdney, A. K. 1985 A core war bestiary of viruses, worms and other threats to computer memories. *Scientific American.* 252 (March) 14–23.

Dewdney, A. K. 1987. A program called MICE nibbles its way to victory at the first core war tournament. *Scientific American,* 256 (January) 14–20/

Dewdney, A. K. 1989. Of worms, viruses, and Core War. *Scientific American,* 260 (March) 110–113.

Farmer, J. D. and Belin, A. d'A. Artificial life: The coming evolution In *Artificial Life II, S.F.I. Studies in the Sciences of Complexity.* C. Langton, C. Taylor, J. D. Farmer, S. Rasmussen, Eds. (Addision-Wesley, Redwood City, Calif. 1991), Vol. X, pp. 815–838.

Fogel, L. J., Owens, A. J. and Walsh, M. J.—*Artificial Intelligence through Simulated Evolution,* New York: John Wiley 1966.

Fontaria, Walter. 1991. Algorithmic Chemistry. In Langton, Christopher, et al. (editors). *Artificial Life II.* Addison-Wesley.

Fujiki, Cory—*An Evaluation of HOlland's Genetic Operators Applied to a Program Generator,* Master of Science Thesis, Department of Computer Science, University of Idaho, 1986.

Goldberg, David E.—*Computer-Aided Gas Pipeline Operation Using Genetic Algorithms and Rule Learning,* (Doctoral Dissertation, University of Michigan, 1983) Dissertation Abstracts International 44(10), 3174B (University Microfilms No. 8402282).

Goldberg, David E., *Genetic Algorithms in Search, Optimization, and Machine Learning.* Reading, Mass.: Addision-Wesley 1989.

Grefenstette, John J. (Editor)—Proceedings of an International Conference on Genetic Algorithms and Their Applications, Pittsburgh, Pa. 1985.

Grefenstette, John J. (Editor)—*Genetic Algorithms and Their Applications: Proceedings of the Second International Conference on Genetic Algorithms.* Lawrence Erlbaum Associates, Hillsdale, N.J. 1987.

Hicklin, Joseph F.—*Application of the Genetic Algorithm to Automatic Program Generation,* Master of Science Thesis Department of Computer Science, University of Idaho, 1986.

Holland, John H.—Adaptation in Natural and Artificial Systems. The University of Michigan Press, Ann Arbor, 1975.

Holland, J. H. 1976. Studies of the spontaneous emergence of self-replicating systems using cellular automata an formal grammars. In Lindenmayer, Aristid, and Rozenberg, G. (editors). *Automata, Languages, Development.* North Holland.

Holland, John H. 1990. ECHO: Explorations of evolution in a miniature world. Paper presented at Second Workshop on Artificial Life, Santa Fe, New Mexico.

Holland, John H. Escaping brittleness: The possibilities of general-purpose learning algorithms applied to parallel rule-based systems. In Michalski, Ryszard S., Carbonell, Jaime G. and Mitchell, Tom M. *Machine Learning: An Artificial Intelligence Approach. Volume II,* P. 593–623. Los altos, Calif.: Morgan Kaufman 1986.

Holland, J.H. "ECHO: Explorations of Evolution in a Miniature World." In *Proceedings Of the Second Conference on Artificial Life.* edited by C. G. Langton, and J.D. Farmer, J. Doyne, Redwood City, Calif.: Addison-Wesley. 1990. In Press.

Holland, J. H., & Reitman, J. S. (1978), Cognitive systems based on adaptive algorithms, In D. A. Waterman & F. Hayes-Roth (Eds.), *Pattern DireCted Inference Systems* (pp. 313–329), New York: Academic Press.

Holland, J. H., *Adaption in Natural and Artificial Systems,* second edition (MIT Press, Cambridge, Mass. 1992).

Koza, John R., *Genetic Programming: A Paradigm for Genetically Breeding Populations of Computer Programs to Solve Problems,* Stanford University, Dept. of Computer Science, Report No. STAN-CS-90-1314, June 1990. 1990.

Koza, John R., Hierarchical genetic algorithms operating on populations of computer programs, *Proceedings of the 11th International Joint Conference on Artificial Intelligence (IJCAI).* San Mateo, Calif.: Morgan Kaufman 1989.

Laing, Richard. Automaton Models of Reproduction by Self-Inspection. *J. Theoretical Biology,* 66, 437 (1977).

Langton, Christopher G. 1983. Self-reproduction in cellular automata. In Farmer, Doyne, Toffoli, Tommaso, and Wolfram, Stephen (editors). *Cellular Automata: Proceedings of an Interdisciplinary Workshop, Los Alamos.* North Holland.

Langton, Christopher G. 1986. Studying artificial life with cellular automata. In Farmer, Doyne, Lapedes, Alan, Packard, Norman, and Wendroff, Burton (editors). *Evolution, Games and Learning.* North-Holland Langton, C. G., Taylor, C., Farmer, J. D., Rasmussen, S., Eds. *Artificial Life II. SFI Studies in the Sciences*

*of Complexity.* (Addison-Wesley, Redwood City, Calif., 1991), Vol. X.

Langston, Christopher G. (editor). 1989 *Artificial Life, Santa Fe InstitUte Studies in the Sciences of Complexity,* volume VI. Addison-Wesley.

Langston, Christopher G., et al. (editors). *ArtifiCial Life II.* Addision-Wesley 1991.

Langston, Christopher G. (editor). 1991a. *Artificial Life II Video Proceedings.* Addison-Wesley 1991.

Langston, Christopher G. 1991 b. Self-reproducing loops and virtual ants. In Langston, Christopher G. (editor). 1991a. *Artificial Life II Video Proceedings.* Addison-Wesley.

Rasmussen, Steen, Knudsen, Carsten, and Feldberg, Rasmus. Dynamics of programmable matter. In Langton, Christopher, et al. (editors). *Artificial Life II.* Addison-Wesley.

Ray, Thomas S. 1990. Evolution and optimization of digital organisms. In Brown, H. (editor). *Proceedings of the 1990 IBM Supercomputing Competition: Large Scale Computing Analysis and Modeling Conference.* MIT Press Ray, Thomas S. 1991a. An approach to the synthesis of life. In Langston, Christopher, et al. (editors). *Artificial Life II.* Addison-Wesley.

Ray, Thomas S. 1991b. Is it alive or is it GA? In Belew, Rik and Booker, Lashon (editors). *Proceedings of the Fourth International Conference on Genetic Algorithms.* Morgan Kaufman.

Ray, Thomas S. 1991c. Population dynamics of digital organisms. In C. G. Langton (editors). *Artificial Life II Video Proceedings.* 1991a. Addison-Wesley.

Schaffer, J. D. (editor), *Proceedings of the 3rd International Conference of Genetic Algorithms.* San Mateo, Calif.: Morgan Kaufman Publishers Inc. 1989.

Schuster, P. 1985. Evolution of self-replicating molecules—a comparison of various models for selection. In Demongeot, J., Goles, E., Tchuente, M. (editors) *Dynamical Systems and Cellular Automata.* Academic Press. Skipper, Jakob. 1992. The complete zoo evolution in a box. In Varela, Francisco J., and Bourgine, Paul (editors). *Toward a Practice of Autonomous Systems: Proceedings of the first European Conference on Artificial Life.* MIT Press.

Spafford, Eugene H. 1991. Computer viruses—a form of artificial life? In Langton, Christopher, et al. (editors). *Artificial Life II.* Addison-Wesley.

Smith., Steven F., *A Learning System Based on Genetic Adaptive Algorithms.* PhD dissertation, Pittsburgh: University of Pittsburgh, 1980.

Smith, Steven F., Flexible learning of problem solving heuristics through adaptive search, *Proceeding of the 8th International Conference on Artificial Intelligence.* Karlsruhe, Germany: Morgan Kaufman 1983.

SUMMARY OF THE INVENTION

An apparatus and process for solving problems using self-replicating and self-improving entities is described. The present invention includes an apparatus and process for solving a problem using a population of entities, wherein each of the entities is an arrangement of actions and material which are capable of including an incorporation action and are capable of including an emission action. The present invention also includes a process and apparatus for activating each of the entities by presenting each of the entities with at least one combination of environmental material. If an entity has an incorporation action then that entity searches the population for a part of one of the entities and then incorporates the portion of the one entity associated with that part into itself. If the entity includes an emission action then the entity searches the population for a part and then the entity produces at least one emission, such that if the entity responds effectively to a combination of environmental material then the emission enters the population and if the entity fails to respond effectively then the emission fails to enter the population. The activation continues until one of the entities responds effectively to a specified number of combinations of material, such that a solution to the problem is generated.

BRIEF DESCRIPTION OF THE DRAWINGS

The present invention will be understood more fully from the detailed description given below and from the accompanying drawings of the preferred embodiment of the invention, which, however, should not be taken to limit the invention to the specific embodiment but are for explanation and understanding only.

FIG. 1 is a tree diagram representation of a LISP S-expression (program).

FIG. 2 is a tree diagram representation of a LISP S-expression (program).

FIG. 3 illustrates a typical computer configuration.

FIGS. 4A and 4B are flow chart diagrams of the present invention.

FIG. 5 illustrates an example of an S-expression created in one embodiment of the present invention.

FIG. 6 illustrates another example of an S-expression created in one embodiment of the present invention.

FIG. 7 illustrates the result of the execution of an ADD function using the present invention.

FIG. 8 illustrates an example of an S-expression created using the present invention.

FIG. 9 illustrates an example of a 27-point S-expression created using the present invention.

FIG. 10 illustrates an example of a 24-point S-expression created using the present invention.

FIG. 11 illustrates an example of a 45-point S-expression created using the present invention.

FIGS. 12A and 12B illustrate an example of a 72-point S-expression created using the present invention.

FIG. 13 illustrates an example of a 36-point self-replicating S-expression created using the present invention.

FIG. 14 illustrates an example of a 28-point S-expression created using the present invention.

FIG. 15 illustrates an example of a 31-point S-expression created using the present invention.

FIG. 16 illustrates an example of a 54-point S-expression created using the present invention, FIG. 17 illustrates an example of a 41-point S-expression created using the present invention.

FIGS. 18A and 18B illustrate an example of an 89-point S-expression created using the present invention.

Notation and Nomenclature

Figure 19:
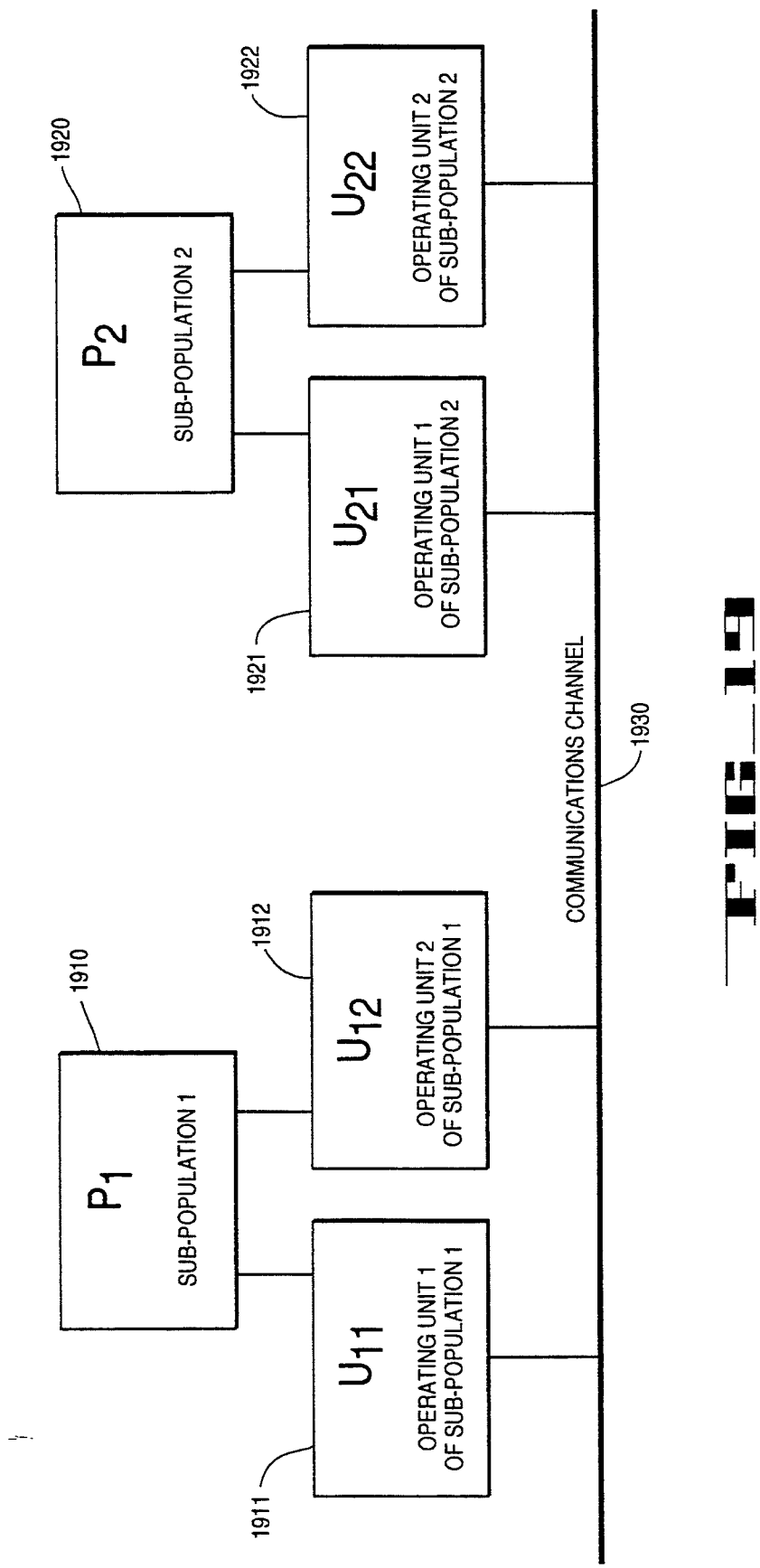
FIG. 19 is a block diagram of the parallel processing embodiment of the present invention.

ACTION—Actions are the primitive operations in an entity. Actions are often parameterized. If the entities are in the preferred computer embodiment, then an action may be a function, such as "+" or "IF", or a terminal such as "MOVE-LEFT". If the embodiment were to be in the domain of robots, then an action might be an operation by such a robot that applies to something else. For example, an action might be "PICK-UP", where the thing being picked up is specified as an argument to the action. An example of a non-parameterized action might be "MOVE-LEFT". Actions may be invoked using the results of other actions as arguments.

MATERIAL—Material is that which is provided to actions for their execution. This material might consist of externally provided material (which is referred to as environmental material) or constants. In the computer embodiment, material is typically comprised of values, such as "TRUE", "FALSE" or 3.5. In an embodiment using robots in manufacturing, the material might be the contents of parts bins or the ingredients for the process. Thus, material encompasses both information and physical objects used in the problem solving process. Material can also encompass states (e.g., the "on" or "off" of a latch) which represent non-physical matter (e.g., the setting of the latch representing a bina one and the resetting of the latch representing a binary zero) and can be operated and manipulated by actions.

FUNCTION—A function is the computer embodiment of an action. We do not use the term in the strict mathematical sense of the word. For example, a function in a particular problem domain, which is called, for example, "MOVE-BLOCK" might be viewed as transforming one state space into another. "MOVE-BLOCK" might cause a block in a simulated world to be moved from one side of a table to the other. This can be viewed as transforming one state space in which the block is on one side of the table into a new state space in which the block is on the other side of the table. Programmers often view this as a process of side-effecting (i.e. changing the values of) state variables. Thus, the term "function" is defined as mean any construct that takes zero or more arguments, returns zero or more values, and transforms the arguments and/or side-effects some global or lexical state. Other examples of "function" using this definition could therefore be "+", which takes numbers as its arguments and returns the sum of the arguments, "PRINT" which takes an argument and prints it (to the global environment), "PROGN" which takes program segments as arguments and returns the result of evaluating its last argument after evaluating all of its other arguments in sequence, and so-called non-strict operators such as "IF" which takes program segments as arguments and returns the result of evaluating one of its arguments dependent upon the result of evaluating its "condition" argument. "MOVE-BLOCK" might be, therefore, a function that takes no arguments, returns no values and whose purpose consists of side-effecting the state space of the problem. One could also view "MOVE-BLOCK" as a function that takes an old state space as its argument and returns as its value a new and transformed state space. This definition of "function" therefore subsumes, among others, the programming terms function, operator, procedure, macro, NLAMBDA and Special Form.

TERMINAL—A terminal is the termination point of an entity (i.e., program in the preferred computer embodiment) when that program is represented as a tree. A terminal could be, but is not limited to, a constant (such as the number 1.5 or a structured constant value, such as a constant matrix), a variable (such as x, which might be a dummy variable (formal parameter) or an actual variable of the problem), a function of no arguments that performs side-effects on the environment of activation of the entity, a function of no arguments that causes data to be read from a table, database or from some sensor machinery.

DETAILED DESCRIPTION OF THE INVENTION

The present invention describes a process for problem solving. In the following description, numerous specific details are set forth in order to provide a thorough understanding of the present invention. It will be apparent, however, to one skilled in the art that the present invention may be practiced without using these specific details. In other instances, well-known methods and structures have not been described in detail so as not to unnecessarily obscure the present invention.

The present invention operates on a population of entities. The entities must possess an ability to produce an objectively observable result. To provide utility, the entities must direct their actions toward a constructive end, even if their results do not always serve those ends. The process of the present invention produces a population which tends to accomplish its constructive ends better over time. Because of their extreme behavioral plasticity, computers offer an extremely flexible medium for performing the process; however, the same steps can be performed in other media.

Although the preferred embodiment uses computer programs as entities, using other types of entities remain within the scope and spirit of the present invention. For example, electrical circuits could provide a population for the iterative process of the present invention. The circuits could reproduce and recombine sub-circuits from two parental circuits until a circuit performing the desired behavior (function) is attained. Additionally, different automobile designs could comprise another population, with elements of the design or sub-processes of manufacture taken as different alleles for incorporation and rearrangement. Additionally, a population of mechanical nanomachines could comprise another population. Nanomachines are extremely small (and potentially extremely inexpensive) machines built up from individual atoms and molecules or groups of atoms and molecules that are very much smaller than ordinary mechanical devices. Nanomachines, just like more commonplace larger machines, perform specified actions on available material. For example, a nanomachine could perform a physical action on a quantity of physical material, just as an ordinary large machine performs an action on material.

The precise result of the action of a machine depends on both its provided actions and on the precise material provided to that machine. For example, if a machine performs the action of crushing, the result of the action of that machine when supplied with glass material is crushed glass, whereas the result of the action of that machine when supplied with plastic material is crushed plastic. If the machine performs the action of heating, shaking, squeezing, or pressing, the machine performs those actions on the particular material supplied to it.

The material supplied to a physical machine (whether of ordinary size or very small size) corresponds to the arguments supplied to a computational structure including the actual variables of the problem. The action of the machine is the same (i.e., heating) regardless of the nature of the particular material on which it is acting (e.g., glass, plastic).

The actions performed by a machine on its material need not be a physical action. For example, if the entity is an electrical machine whose action consists of the action of a primitive electrical component (e.g., a resistor, amplifier, inductor, capacitor, etc.), or in an electrical component performing a primitive logical operation (e.g., AND, OR, NOT, IF, NAND, NOR, etc.) then that machine performs its action on whatever signal (i.e., material) is supplied to it. An amplifier that increases the amplitude of an electrical signal by a factor of three can perform its amplifying action on a weak sine wave signal or a strong sawtooth wave signal. An additional example is a mechanical machine (perhaps of the very small nano-scale size) that performs a logical operation on numerical data (e.g., a binary memory).

Hierarchical compositions of machines, each performing a specified action on the particular material supplied to it, can perform certain overall tasks.

Thus, although the following description uses computer programs as entities, the description does not limit the present invention. Further, the use of sequential iteration is only a preferred embodiment. Methods for the use of parallel processing is also presented.

The Representation of the Population

The computer languages FORTRAN, COBOL, ALGOL, PL/1, FORTH, PASCAL, C, PROLOG, ADA, BASIC, etc. provide, in general, the ability to write complicated mathematical expressions, recursions, complex data structures, and symbolic expressions. Using any of these languages, one can write symbolic expressions that are executable as computational procedures (or programs) within the language itself. Also, any of these languages can generate symbolic expressions, although often this process is inconvenient and inefficient. In general, most computer languages do not allow arbitrarily complex expressions to be written. Also, most do not delay assigning actual computer memory (and types) in the computer for such expressions until just prior to actual execution of the expression. Such a memory management method is termed dynamic storage allocation.

One existing computer language, however, has all the features discussed above and is generally available in relatively efficient forms on a variety of computers. This language is LISP, and is the computer language of choice for many artificial intelligence applications. Many dialects of the LISP language have been created over the years. A dialect of LISP called "Common LISP" has started to emerge as a standard.

The LISP programming language's basic structure is a list of items (an ordered set of items contained within a pair of parentheses). An important source of LISP's simplicity, generality, and power arises from treating the first element in every list encountered as a function to be executed, termed "evaluated", and treating the remaining elements of the list as arguments to that function. Moreover, unless otherwise indicated, LISP reads, evaluates, and returns a value for each such function it encounters. Thus, in LISP, entire computer programs can appear as merely function invocations within function invocations within yet more function invocations (often called "compositions" of functions and terminals or more simply a "composition" of functions). Applying functions to arguments as encountered controls the flow of LISP programs. In other words, the control structures in LISP are based on the composition of functions.

Within the outermost pair of parentheses in LISP, there may be numerous functions and operators, including functions for performing arithmetic, functions for performing recursions, functions for modifying symbolic expressions, functions for conditionally varying the program flow, and other complex functions. A key feature of LISP is that LISP programs have the same form as the data they manipulate. As the above features indicate, LISP is a functional programming language. LISP is not the only existing functional programming language nor is it the only possible functional programming language. It is, however, the most widely used language in this category and well-suited for the requirements at hand.

In spite of the complex results obtained, LISP can be viewed as being very simple because it simply reads, evaluates, and returns a value for each such function it encounters. This seeming simplicity gives LISP enormous flexibility (including the flexibility to accommodate computational procedures which modify themselves and execute themselves). This enormous flexibility makes LISP the preferred computer language for the present invention.

For example, consider the simple mathematical expression ordinarily written as 5*4−3*2. To evaluate this expression, one must start by first evaluating 5*4. One evaluates 5*4 by performing the function of multiplication (*) on the two arguments (5 and 4). The basic structure in LISP is a list of items (that is, an ordered set of items contained within a set of parentheses). Moreover, unless otherwise indicated, LISP treats the first item in every list encountered as a function and the remaining items in the list as arguments to that function. Thus, LISP represents 5*4 as (* 5 4). Here a function (i.e. the multiplication function denoted by *) is the first item of the list and the two arguments to the function (i.e. the two numbers to be multiplied) follow. Similarly, LISP denotes 3*2 as (* 3 2). Once these two multiplications are executed (evaluated), the subtraction function then has the two arguments (i.e. 20 and 6). The two values obtained by evaluating these two multiplication functions are treated as arguments to the subtraction function which performs the operation of subtraction, which is (−(* 5 4) ( * 3 2)). Expressions such as (−(* 5 4) (* 3 2)) in LISP are called symbolic expressions (S-expressions). Here the function of subtraction (−) is performed on the results previously obtained for (* 5 4) and (* 3 2). When a simple number or variable is used as the argument of a function (such as the 3 or 2 in the multiplication 3*2), it is called an "atomic" argument. The contrasting situation occurs with a composition of functions when the argument to one function is itself the result of carrying out an earlier (embedded) computation. Increasingly complex mathematical expressions can be represented by embedding previous results within new expressions in this manner.

It is helpful to graphically depict an expression in a programming language. Functional expressions can be viewed graphically as a tree with labels on the various points of the tree. In particular, any such expression can be viewed as a rooted point-labeled tree in which the internal points of the tree are labeled with functions and the endpoints of the lines radiating downwards from each such internal point is labeled with the arguments to that function. The term "downwards" in connection with rooted-point labeled trees means extending farther away from the root of the tree. The external points of the tree (sometimes called "leafs") are labeled with the terminals. The root of the tree is the particular internal point labeled with the function executed last. In a LISP S-expression, the first function is the outer-most LISP function (i.e. the function just inside the outermost left parenthesis of the LISP S-expression).

FIG. 1 illustrates this for LISP using the equation 5*4−3*2. In the ordinary notation of arithmetic shown as equation 100, the function 104 (multiplication) operates on the arguments 102 and 106 (i.e. 5 and 4 respectively) and the function 112 (multiplication) operates on the arguments 110 and 114 (i.e. 3 and 2 respectively). The function 108 (subtraction) then operates on the results of these two functions as its arguments. The function 108 is higher in the hierarchy than the functions 104 and 112.

In FIG. 1, the LISP S-expression 120, (−(* 5 4) (* 3 2)) is expressed as the function 124 (multiplication) operating on the arguments 26 (the number 5) and 128 (the number 4) and the function 130 (multiplication) operating on the arguments 132 (the number 3) and 134 (the number 2). The function 122 (subtraction) then operates on the results of these two evaluations.

When presented graphically in FIG. 1, the internal point 150 of the tree 130 with root 140 is labeled with the function of multiplication (*) and the external points 156 and 158 of the tree are labeled with the two arguments to the multiplication function (i.e. 5 and 4 respectively). The arguments to a given function (such as the multiplication function denoted by the internal point 150) are found by following the lines 152 and 154 radiating downwards from the internal point 150. Similarly, the internal point 160 of the tree is labeled with the function of multiplication and the external points of the tree 166 and 168 are labeled with the two arguments to the multiplication function (i.e., 3 and 2, respectively). The arguments to the function 160 are found by following the lines 162 and 164 radiating downwards from the internal point 160. The internal point of the tree 140 is labelled with the subtraction function. The arguments to the subtraction function are found by following the lines 142 and 144 radiating downwards from point 140. These arguments turn out to be the results of the previously performed multiplication operations. Arguments may be found at external points (if they are terminals) or at internal points (i.e. when the arguments to one function, such as subtraction here at 140, are the result of previous functions). The internal point 140 is the root of the tree and is labeled with the outermost function (subtraction). Internal point 140 is equivalent to point 122 in the LISP S-expression 120 (i.e., the function just inside the outermost left parenthesis of the LISP S-expression).

The advantage of a computer language such as LISP for performing work of this kind derives from the enormous flexibility arising from repeated applications of this very simple basic structure. The functions available in LISP can include functions other than the simple arithmetic operations of multiplication and subtraction. They include more complex mathematical functions such as square roots, exponentiation, etc; program control functions such as PROGN which allow a series of LISP expressions to be performed in succession; recursions (wherein a function refers to itself in the process of evaluating itself); iterative functions (such as DOTIMES) which cause certain functions to be performed repeatedly (typically with differing arguments); conditional functions [which cause specified alternative functions to be performed if some predicate function is (or is not) satisfied]; and symbolic functions which operate on symbols (instead of numbers).

By way of an example, suppose it is desired that a computer program begin by printing the symbolic string "HELLO"; then set the variable C to the sum of the variables A and B; and, then print the value of C only when C is greater than 4. In FIG. 2, the LISP S-expression (i.e. program) 700 performs these tasks. Referring to FIG. 3, the function 701 PROGN allows a series of 3 major steps to be combined together into one program. The first major step of the series involves the function 702 (PRINT) operating on the string terminal 704 ("HELLO"). The second major step involves the function 706 (SETQ) operating on a variable 708 (C) and the result obtained from the function 710 (addition) operating on the arguments 712 (the variable A) and 71 4 (the variable B). The SETQ function assigns a value (its second argument) to a variable (its first argument). Finally, the third major step involves the conditional function 716 (WHEN) operating on two arguments. The first argument is a predicate function involving the relationship 718 (greater than) operating on the arguments 720 (the variable C) and 722 (the number 4). The second argument is the function 724 (PRINT) operating on the terminal 726 (the variable C).

Graphically, this LISP program (S-expression) can be represented as a tree whose internal points are labeled with functions and where the endpoints of the lines radiating downwards from each such internal point is labeled with the arguments to that function. In this graphical representation, one of the internal points is the root of the tree and the root is labeled with the function that appears just inside the first left parenthesis of the LISP S-expression.

Here, the root of the tree 730 is labeled with the function PROGN. The function PROGN has 3 arguments. The 3 lines 732, 734, and 736 radiating downwards from the internal point 730 (the root) correspond to the 3 arguments of PROGN. The first argument of PROGN is function 738, the PRINT function. It is the endpoint of the first line 732 radiating downwards from internal point 730. The function PRINT has one argument 740. In the case of the PRINT function, it has one argument which it prints. In this case, the argument is the string 740 "HELLO". This string 740 "HELLO" is an atomic argument (terminal) and appears at an external point (leaf) of the tree.

The second argument of PROGN is function 742, the SETQ function. The function SETQ has two arguments 744 and 746. The second argument of SETQ is itself a function 746 (addition) operating on the two arguments 748 (the variable A) and 750 (the variable B). The two arguments 748 and 750 are the variables A and B (terminals). They appear at external points (leafs) of the tree. The first argument of SETQ is 744 (the variable C) which is set to the sum of the values of A and B.

The third argument of PROGN is function 752, the WHEN function. The function WHEN has two arguments, 754 and 756. The first argument of the WHEN function is a predicate function 754 (greater than). The predicate function 754> has two arguments 758 (the value of variable C) and 760 (the number 4). The predicate function 754 > returns a value of T (for "True") or NIL (for "False") depending on whether its first argument 758 (the value of the variable C) is greater than its second argument 760 (the number 4). The WHEN function executes its second argument 756 (the PRINT function) if its first argument 754 evaluates as true. The PRINT function 756 has one argument 762 (the numeric value of the variable C). Note that the PRINT function is flexible; it can accommodate a string argument (such as "HELLO" at 740) or a number (such as the value of variable C at 762).

Although LISP can be run on virtually any computer, it is preferable to use a computer especially designed for performing LISP functions. The Texas Instruments Explorer II+computer is particularly advantageous for these purposes because it contains an especially designed microprocessor chip (called the Mega Chip) which performs LISP functions directly. The Mega Chip contains basic microcode that corresponds directly to the basic operations of LISP. A conventional microprocessor chip (such as the Intel 0386 contained in the IBM AT computer) can be programmed to carry out the various LISP functions by applying its generic computer instructions to the requirements of LISP.

Moreover, it is especially advantageous to run LISP programs on computers with large amounts of internal memory because the complex structures that one develops using LISP in applications such as are described here often require large amounts of memory. To the extent that computer memory is not available as internal memory in a given computer, significant inefficiencies in operation result. Since the solution to problems often require complex structures, significant inefficiencies may make the difference between being able to solve the problem or not being able to solve the problem. The preferred embodiment of the present invention uses an Explorer II+ computer with 32,000,000 bytes of internal memory (32 megabytes).

A typical computer configuration is depicted in FIG. 3. It will be understood that while FIG. 3 is useful in providing an overall description of the computer system of the present invention, a number of details of the system are not shown. Referring to FIG. 3, the computer system of the currently preferred computer embodiment generally comprises a bus 300 for communicating information coupled to a processor 301. A random access memory (RAM) 302 (commonly referred to as main memory)is coupled to bus 300 for storing information and instructions for processor 301. A data storage device 303 is also coupled to bus 300 for storing data. Display device 304, such as a cathode ray tube, liquid crystal display, etc., is coupled to bus 300 for displaying information to the computer system user. A data input device 305, including alphanumeric and other key input devices, etc., is coupled to bus 300 for communicating information and command selection to processor 301 and for controlling cursor movement.

Using LISP representations on a computer having sufficient memory, the present invention can solve problems previously intractable under prior art methods. This disclosure presents a general method and specific examples of the present invention. First, the process itself is described in general. Second, the currently preferred computer embodiment is described. Finally, the ramifications and implementation specifics of parallel processing and its application to the present invention are described.

The Non-Linear Genetic Algorithm

A more detailed description of the use of the non-linear genetic algorithm, referred to as Genetic Programming, follows. The non-linear genetic algorithm comprises specifying (1) the nature of the structures that undergo adaptation in the process, (2) the search space of the structures, (3) the initial structures, (4) the environment, (5) the operations that are performed to modify the structures, (7) the procedure for using the information available at each step of the process to select the operations and structures to be modified, (8) the state (memory) of the algorithmic system at each point in time, and (9) the method for terminating the process and identifying its output.

The structures that undergo adaptation in the process are hierarchical entities whose size and shape dynamically change during the process. The structures of the present invention should be able to make copies of themselves which function in the same manner as the structure that created it. Furthermore, the structures of the present invention should be capable of producing other individuals which consist of a portion of themselves and a portion of another individual or other material in the population. In the computer embodiment, in the computer embodiment, the structures in the process are hierarchically structured computer programs whose size and shape can dynamically change during the process. This is in contrast to the one-dimensional linear strings (whether of fixed or variable length) of characters (or other objects) used in conventional genetic algorithms.

For the computer embodiment, various programming languages (e.g., FORTH) might be suitable for accomplishing the work described in this invention. However, the LISP programming language (first developed by John McCarthy in the 1950's) is especially well-suited for handling hierarchies, recursion, logical functions, compositions of functions, self-modifying computer programs, self-executing computer programs, iterations, and complex structures whose size and shape is dynamically determined (rather than predetermined in advance). The LISP programming language is especially appropriate when the structures to be manipulated are hierarchical structures. Moreover, both programs and data have the same form in LISP. Every LISP S-expression (program, entity) can be depicted graphically as a rooted point-labeled tree in a plane whose internal points are labeled with functions, whose external points (leaves) are labeled with terminals, and whose root is labeled with the function appearing just inside the outermost left parenthesis. The operation begins by randomly and independently.

The set of possible entities for a particular domain of interest depends on the parts and portions that make up the universe in which the entities operate. These parts and portions must have the attribute of being functional as a whole to produce the result, while being separable into parts of the whole. In the computer embodiment, the set of possible programs for a particular domain of interest depends on the functions and terminals that are available in the domain. The possible programs are those that can be composed recursively from the available set of n functions $F=\{f_1, f_2, \ldots, f_n\}$ and the available set of m terminals $T=\{t_1, t_2, \ldots, t_m\}$. Each particular function f in F takes a specified number $z(f)$ of arguments $b_1, b_2, \ldots, b_{z(f)}$.

Note that Polish form is used to represent the application of a function to its arguments in the LISP programming language. Thus, for example, (+1 2) evaluates to 3. In Common LISP, any argument can itself be an S-expression so that, for example, (+1 (* 2 3)) evaluates to 7. The S-expression (+1 2 (IF (>TIME 10) 3 4)) demonstrates the function > being applied to the variable terminal TIME and the constant terminal 10. The subexpression (>TIME 10) then evaluates to either T (True) or NIL, and this value becomes the first argument of the "function" IF. The function IF returns either its second argument (the constant terminal 3) or the third argument (the constant terminal 4) according to whether the first argument is T or NIL, respectively. The entire S-expression thus evaluates to either 6 or 7.

The search space for non-linear genetic algorithms is the space of valid entities which can be created by compositions of the parts and portions available for the problem. The search space in the computer embodiment is the space of valid programs that can be recursively created by compositions of the available functions and available terminals for the problem. This search space can, equivalently, be viewed as the hyperspace of rooted point-labeled trees in the plane having internal points labeled with the available functions and external points (leaves) labeled with the available terminals.

The process of generating the initial random population in the computer embodiment begins by selecting one of the functions from the set F at random to be the root of the tree. Whenever a point is labeled with a function (that takes k arguments), then k lines are created to radiate out from the point. Then for each line so created, an element is selected at random from the entire combined set C, where C is the set of functions and terminals for the problem, to be the label for the endpoint of that line. If a terminal is chosen to be the label for any point, the process is then complete for that portion of the tree. If a function is chosen to be the label for any such point, the process continues. The probability distribution over the terminals and functions in the combined set C and the number of arguments required for each function determines an average size for the trees generated by this process. In this invention, this distribution is typically a uniform random probability distribution over the entire set of functions and terminals (with the exception of the root of the tree where the selection is limited to just the functions in F); however, it is possible to bias the initial population for a particular problem with a non-uniform distribution or with entire seeded individuals that might be useful in solving the particular problem at hand.

The environment is a set of cases which provide a basis for evaluating particular entities (i.e., computer programs in the computer's embodiment). The set of cases is analogous to a set of conditions under which an entity is placed to produce a response or result. For example, an animal in the jungle may have other animals in the jungle, some of which pose a danger and some of which do not. This animal's "environment" may also contain a food supply. Depending on the specific conditions, or "cases", the animal reacts. Whether confronted with a dangerous or nondangerous animal, the animal must react. Furthermore, the animal must eat to survive. If the animal eats food, yet avoids the dangerous animal (e.g., by running away), it survives. However, if the animal is scared away from food due to the presence of a non-dangerous animal, it is likely to die. Of course, there are many such factors or conditions which make up an environment. Upon evaluation of all of the conditions or cases at a particular instant in time, an entity produces a result, i.e. exhibits some behavior. The utility of the result determines the survival of the entity.

Operations available to the entities allow an individual entity to become modified (i.e., modify itself) so that it may evolve. The two primary operations for modifying the structures undergoing adaptation are self-reproduction and self-improvement. Self-reproduction is an operation by which an entity alone, or in conjunction with another entity, produce an entity identical to itself. Self-improvement is an operation by which an entity partially reproduces itself. The remaining portion is acquired, much like a trait, from another entity in the population, yet could be acquired from the environment.

The state of the non-linear genetic algorithm system at any stage in the process (as with genetic algorithms in general) consists only of the current population of individuals in the population. There is no additional memory, centralized bookkeeping, or administration to guide the adaptive process.

The algorithm is controlled by various parameters, including one major parameter, namely the size of the population undergoing evolution. In general, population size is the parameter that must be adjusted to accommodate the complexity of the problem at hand. A larger population is, in the absence of any other consideration, better at producing a solution to the problem at hand than a smaller population. However, as the population size is increased, there may be decreasing benefits in relation to the increased amount of resources needed. For example, in the computer embodiment, a rapidly growing population could soon deplete the available computer resources. Therefore, controlling the population size allows for control of the computer resources and their usage.

The solution produced by this process at any given time can be viewed as the entire population of disjunctive alternatives, or more commonly, as the single best individual in the population during the run. The process can be terminated when either a specified total number of generations have been run or when some performance criterion is satisfied. For example, if a solution can be recognized if it is discovered, the algorithm can be terminated at that time and the single best individual can be considered as the output of the algorithm.

The six major steps necessary for using genetic programming are summarized as follows.

The first major step is to identify the appropriate set of variable and constant terminals for the problem. For some problems, this identification may be simple and straightforward. The difficulty in identifying an appropriate set of actual variables of the problem for a particular problem, if any, usually arises from the inherent difficulty (common to all science) of correctly identifying variables which have explanatory power for the problem at hand. For example, one would not be able to discover Kepler's Third Law if one were given only the color of the surface of the planets.

Constant terminals, if required at all, can enter a problem in two ways: One way is to use the constant creation procedure described herein. The second way for constant terminals to enter a problem is by explicitly including them. For example, one might include $\pi$ in a particular problem where there is a possibility that this particular constant would be useful.

The second major step is to identify the appropriate set of functions for the problem. For real-valued domains, the obvious function set might be $\{+, -, *, \%\}$ (where % is the protected division function that returns 0 when division by zero is attempted). In a Boolean function learning domain, for example, a set of functions such as {AND, OR, NOT, IF} might be the choice. This set is certainly sufficient for any Boolean function learning problem since it is computationally complete. Moreover, this set is convenient in that it tends to produce easily understood logical expressions. Of course, the function set might consist of NAND alone, and in some domains (e.g. design of semiconductor logic networks), this might be a natural choice.

Some functions may be added to the function set merely because they might possibly facilitate a solution (even though the same result could be obtained without them). For example, one might include a squaring function in certain problems even though the same result could be attained without this function (albeit at a certain cost in computational resources).

Sometimes, the consequence of failing to include a potentially useful function is that one gets a rough approximation to the missing function. For example, if the SIN, COS or EXP function were missing from a function set, one might get the first one or two terms of the Taylor power series expansion of those functions in a solution in lieu of the missing function.

In any case, the set of functions must be chosen and/or defined so that the value of any composition of the available functions or terminals that might be encountered as arguments to a function is valid. Thus, if division is to be used, the division function should be modified so that division by zero is well-defined. The result of a division by zero could be defined to be zero. If logical functions are to be mixed with numerical functions, then a real-valued logic should be used. For example, the greater-than function GT can be defined so as to assume the real value 1.0 if the comparison relation was satisfied and the real value 0.0 otherwise.

Note that the number of arguments must be specified for each function. In some cases, this specification is obvious or even mandatory (e.g. the Boolean NOT function, the square root function). However, in some cases (e.g. IF, multiplication), there is some latitude as to the number of arguments. One might, for example, include a particular function in the function set with differing numbers of arguments. The IF function with two arguments, for example, is the IF-THEN function, whereas the IF function with three arguments is the IF-THEN-ELSE function. It maybe useful to include the PROGN ("program") function of Common LISP with varying number of arguments in a function set to act as a connective between the unknown number of steps that may be needed to solve the problem.

The choice of the set of available functions, of course, directly affects the character of the solutions that can be attained. The set of available functions forms a basis for generating potential solutions.

The third major step is the construction of the environment for the problem. In some problems, the nature of the environment is obvious and straight-forward. For example, in Boolean function learning problems, the environment is simply the value(s) of the independent variable(s) associated with a certain sampling (or, perhaps, the entire set) of possible values of the dependent variable(s). In some problems, the environment is a set of "starting condition" cases. In some problems where the environment is large and not susceptible to simple random sampling, a representative sampling must be constructed. In some problems, such as solving pairs of linear equations and solving quadratic equations, the environment is a set of equations and their respective solution points.

The fourth major step is the construction of the fitness function, i.e. the function that, given an entity in the population, activates the entity and enables the entity to proceed to the next generation.

The fifth major step is the selection of the major and minor parameters of the algorithm and a decision on whether to use any of the secondary genetic operations. Often, the selection of the population size is the most important choice. In general, the larger the population the better. But, the improvement due to a larger population may not be proportional to the increased computational resources required.

Finally, the sixth major step is the selection of a termination criterion and solution identification procedure. The approach to termination depends on the problem. In many cases, the termination criterion may be implicitly selected by merely selecting a fixed number of generations for running the algorithm. For many problems, one can recognize a solution to the problem when one sees it. Examples are problems where the sum of differences becomes zero (or, acceptably close to zero, if the problem is in a real-valued domain). However, for some problems (such as problems where no exact mathematical solution is known), one cannot necessarily recognize a solution when one sees it (although one can recognize that the current result is better than any previous result or that the current solution is in the neighborhood of some estimate to the solution). The solution identification procedure is often simply a matter of identifying the best single individual of some generation where the termination criterion is satisfied as the solution to the problem.

Note the process described herein may be used to obtain useful approximations, in functional form, of the solution to difficult or intractable problems. The result may only be a good fit or good approximation to the solution of the problem.

Because the process described herein involves executing and modifying computer programs in non-standard ways and because these computer programs were either originally generated at random or created genetically, a number of practical computer implementation issues come to the forefront.

First, it should be noted that if the experimenter chooses to use the Common LISP function EVAL to activate individual LISP S-expressions while measuring their fitness, the evaluation will work correctly only if all of the actual variables of the problem appearing in the given S-expressions are proclaimed to be special (global) variables.

Secondly, because the process described herein involves executing randomly generated computer programs, the individuals in the initial random population as well as the individuals produced in later generations of the process often have sub-expressions which evaluate to astronomically large numbers or very small numbers. When the range is integral, the BIGNUM mode is automatically used in the Common LISP programming language. In this mode, integer numbers can grow arbitrarily large (limited only by the virtual address space of the machine). Thus, the potential growth in size of the integers produced by the randomly generated S-expressions presents no problem, as a practical matter.

Fitness is "implicit" in the sense that it is not measured by some explicit external process, but rather is simply a function of the ability of the entity in question to survive. Entities that are more likely to survive have more chance to breed and hence their genes have a higher probability of propagating through time. This form of fitness measure is what occurs in nature. Such an implicit fitness mechanism is accomplished within the present invention by allowing the entities to be self activating, that is, the entities are active.

One Embodiment of the Processing Logic of the Present Invention

FIGS. 4A and 4B is a flow chart of the processes of the present invention. The process 400 starts by the step Create Initial Population 401 which creates (randomly in the preferred embodiment) a population of entities. In the currently preferred embodiment, the entities are computer programs. It should be noted that although a program is the currently preferred computer embodiment of the entity, the term entity will be used throughout the discussion of FIGS. 4A and 4B.

After the population is created, the generation is marked as 0 (at processing block 423). The population is then test to determine if its generation (i.e., age) is greater than its maximum, MAXGEN (processing block 422). If it is, the process ends (410). If the population has not reached its maximum generation, the population index is reset to 0 (processing block 421) and the population size is tested (processing block 420) to determine if the index has reached the size of the population. If it has, all the entities beyond the allowed age are deleted (processing block 426), optional random culling is performed (processing.. block 425) and the age of the population is incremented by one generation (processing block 424). The process then loops back to processing block 422 for retesting of the age of the population.

If the index counter has not reached the population size, the process then begins to operate upon the population iteratively (at processing block 402). The first step in the iterative process involves activating an entity from the evolving population. Activation means having the entity attempt to accomplish its goal, producing an objective result. In the preferred embodiment, entities are computer programs, so activation involves executing the programs of the population. Each of the entities are capable of being active. When an entity is active, it is capable of controlling the addition of new entities into the population, wherein those entities are derived in part from the active entity itself.

The present invention activates (at processing block 402) each of the entities by presenting each of the entities with at least one combination of environmental conditions (i.e., values for its terminals that are environmental material). Each of these environmental conditions (or material) represent one of a set of different terminal values (material) which can be acted upon by the functions (actions) in the entities. If an entity has an incorporation function (action), processing block 402A, then that entity searches the population for a part of one of the entities and then incorporates the portion of the one entity associated with the part into itself 5 (at processing block 403). If the entity includes an emission function (action), processing block 402B, then the entity searches the population for a part and if the entity produces at least one emission (processing block 404) and if the entity responds effectively to a combination of environmental conditions (material), processing block 407, then any emissions made enter the population (processing block 408). However, if the entity fails to respond effectively then the emissions fail to enter the population. An entity is deemed to respond effectively (e.g., correctly) to a set of environmental conditions (or material) when it performs its designated function correctly, undertakes an effective action, transitions to the correct state or produces the correct result (or the most correct result for the type, amount and/or level of environmental sensors, material or terminals available).

The process terminates when an optional termination test is satisfied (processing block 409). The termination test can be the time when one of the entities responds effectively to a specified number of combinations of conditions (material). In another embodiment, the termination could occur when one of the entities responds effectively to all of the environmental conditions. The term "effective" applies either to exhibiting the correct behavior for the designated combination of conditions or some acceptable approximation. If the termination test for the process is satisfied (e.g., by achieving a known best solution to the problem among the population of individuals, etc.), the process terminates at End 410. Otherwise, the process continues to iterate (processing path 411) at processing block 427 for the next individual in the population. If no termination test is utilized, the process continues.

In one embodiment, each of the entities has a life consisting of a number of activations (e.g., time steps), after which the entity is removed from the population (i.e., the entity dies), processing block 426. In one embodiment, the length of an entity's lifetime can be fixed, such that after a specified number of activations, the entity is removed from the population. In another embodiment, the length of an entity's lifetime can have a mean and a variance, such that all of the entities in the population average a certain number of activations, yet an individual entity's lifetime may vary in the actual number of times it is activated. In the preferred embodiment, each entity has a lifetime of one activation (e.g., a lifetime of one time step).

The length of an entity's life, i.e. the number of activations an entity undergoes, is important in the process of the present invention because it determines the number of opportunities an entity has to emit something into the population or even produce a solution to the problem. Each time an entity is activated, it is subjected to the environmental conditions (material). An entity which is effective in grappling with the environmental conditions, has a better chance to have an emission enter the population or to be allowed to continue activation during the next generation. An entity which effectively grapples with its environmental conditions (material) obtains a differential advantage or opportunity. In one embodiment, the advantage gained is that an entity's emissions are allowed into the population. Even if the entities die (i.e., are removed from the population), the entity will be perpetuated into the next generation (i.e., the future). If an entity is a selfreplicator (as discussed later) and it effectively grapples with its environment, then it will emit a greater number of emissions into the population (and thus, have a better chance to survive in the population). In another embodiment, the opportunity gained could be an increase in an entity's lifetime (e.g., the entity receives the ability to continue activation and be subjected to the environment). For instance, each entity which effectively grapples with its environment could be allowed to continue activation one additional time.

The Computer Embodiment of the Present Invention

Referring back to FIGS. 4A and 4B, the process begins by creating the initial population of programs. To reiterate, in the currently preferred embodiment, the generation of the population is done randomly. As specified above, the structures of the currently preferred computer embodiment are computer programs which are written in LISP. The set of possible programs depends on the functions and terminals available for a particular domain of interest.

The set of basic computational operations is selected on the basis of the available computer resources. The basic operations utilized are not the most elementary, and they do not purport to accurately model the chemical, biological, or mechanical details of the actual organic molecules that carry out asexual reproduction, sexual reproduction, and evolutionary self-improving behavior. However, these basic computational operations perform functions that bear some resemblance to the functions performed by organic molecules in nature, and they perform these functions in a way that bears some resemblance to the way organic molecules perform in nature. In the present invention, a small set of basic computational operations provides sufficient complexity to permit the spontaneous emergence of self-replicability, sexual reproduction and evolutionary self-improving behavior.

One of the basic operations permits the incorporation of one entire computer program into another. In other words, larger entities can grow via an agglomeration of smaller entities.

A variation of this operation permits incorporation of a portion of one computer program into another. In other words, larger entities can grow by an agglomeration of parts of other entities. Furthermore, restrictions can be placed on the operations to ensure incorporating entities only incorporate other entities in whole or in part which are of a predetermined size or which cause a predetermined amount of growth. Both of these operations are done using templates. Each operation has at least one template associated with it which is used to locate a matching template in program (possibly even itself). The portion of the program associated with the matching template is then incorporated.

The computer embodiment of the present invention will be shown in conjunction with an example. The example chosen is from the domain of Boolean functions. The domain of Boolean functions provides a relatively simple domain in which learning and evolution can occur.

Each program in the population is an entity which must grapple with its environment. The determination of whether an individual in the population has learned its task is made by evaluating how well it performs the task for all possible situations that it may encounter in the environment. These situations are represented via combinations of the environmental sensors (i.e., inputs to the program). For instance, when there are three Boolean inputs, the environment consists of all $2^3 = 8$ possible combinations. Each program in the population is evaluated once for each of the eight possible combinations of the environmental sensors. If the program performs correctly (i.e., emulates the behavior of the target Boolean function to be learned) for a particular combination of environmental sensors, its emission, if any, will be admitted into a temporary storage area (e.g., OPEN-SPACE).

The emissions may later be subjected to a culling step in which a predetermined amount of the emissions are purged from the temporary storage. In one embodiment, the emissions which are culled are chosen randomly. If the emission then survives the random culling, it will become part of the population for the next generation. For example, if an entity emulates a particular target Boolean function for six of the eight possible combinations of the environmental sensors, it has six opportunities to emit items into the temporary storage area (and thence into the population). In contrast, if an entity emulates the target Boolean function for three of the eight possible combinations, it has only half as many opportunities to emit items into the temporary storage area. Since culling of the temporary storage area is conducted using a uniform random probability distribution and is not related to performance, the entity that performs better has a greater chance of having its emissions end up in the population for the next generation. If the individual entity happens to be a self-replicator, it emits a copy of itself into the temporary storage area (and into the population) if it successfully performs the unknown task for a particular combination of environmental conditions. A self-replicator that performs the unknown task for six combinations of environmental conditions has twice the chance of becoming part of the population for the next generation than a self-replicator that performs the task for only three combinations.

Note that there is no explicit numerical calculation of fitness in the present invention. Instead, the entities in the population are independently acting entities. Each entity is presented with the entire spectrum of possible combinations of environmental sensors. If an entity successfully performs the task for a combination of environmental conditions and the entity is also capable of self-reproduction or is capable of emitting something, it has a chance of being admitted into the next generation. Effectiveness of grappling with the unknown environment (i.e., correct performance of the unknown task) is required for an emission to have a chance to be admitted to the next generation. Generally, only if the entity emitted is replicative (e.g., exact, self-, mutual, quasi-, indirect) will the emission into the next generation be viable. Thus, in the context of these self-replicating entities in this population, natural selection operates on individuals in the population according to how successful they are in grappling with their environment.

If unlimited computer resources are available, all of the emissions would be allowed to move from the temporary storage area into the population for any combination of environmental sensors for which the program emulates the target function. However, since computer resources are typically limited and each computer program in the population is presented with all combinations of its environmental sensors, random culling of these emissions is performed. In one embodiment of the present invention, only 30% of the emissions coming from programs that correctly emulate the behavior of the target function to be learned for a particular combination of environmental sensors are actually admitted to the population from the temporary storage area.

As specified above, the computer programs are capable of incorporating an entire computer program into their structure or a portion of a computer program by means of an incorporation operation. The source of these programs is the population. The determination of which programs to incorporate is accomplished using a template. Each computer program has a template associated with it in one embodiment. The template can be a part of the program itself. In one embodiment, the part of the computer program comprising the template includes a predetermined number of functions and terminals. In the currently preferred computer embodiment, the template is part of the computer program. The template of the present invention is utilized by the incorporation operation such that if a part of another program (or entity) in the population matches the template, then some predetermined portion of that matching entity or portion is incorporated into the program having the template. Note that the matching can be done on a probablistic or partial basis (e.g., if 95 percent match, then a match results). In a similar manner, other operations use templates to select entities on which to act. For instance, in an emission operation, the computer program uses a template to select another entity for emission (e.g., copying) into the population. It should be noted that in the emission operation, the emissions created are not automatically entered into the population.

A variety of template searching schemes may be utilized in the present invention. One template searching scheme is the exact matching template scheme, where a match to the template is found when an identical template is located. Another template searching scheme is the complimentary matching template scheme, where a match to the template is found when a location is found which is complementary to the template is found. For example, in nature, the three-dimensional structure of an individual, e.g. an active site of a protein precisely fits into the receptor on the exterior of another protein (i.e., like a lock and key). Another template matching scheme is the corresponding matching template scheme, which uses a global set of correspondences between templates or a correspondence detecting predicate or function to determine which part of an entity a particular template matches. In this manner, a match to the template is located.

There are alternatives to the manner in which the population is searched for the template. One alternative is to search each entity in the population one at a time. When a match is located, the search ends. An alternative means of searching the population is through the use of a template listing. A template listing is a list of all possible templates for a particular problem domain (e.g., all possible combinations of functions and terminals) and their occurence in the population. In other words, the template listing lists all possible templates and all of the locations throughout the population where each particular template can be found. This list is created before the entities in the population are activated. When an entity is activated and performing a function (or action) that utilizes template searching, the template listing is searched for the template to find which entities in the population have the particular template being sought. Then one of the entities from the list of entities having the template being sought is selected to be acted upon by the entity which is searching. The selection of which of the entities in the list can be done randomly or non-randomly.

When the template size is specified to be 2, when the function set has five functions and when the terminal set has three terminals, for example, there are 40 (i.e., $5 \times (5+3)$) possible templates. Because the population is constantly changing, the neighbor of a given program changes as each combination of environmental sensor is presented to each program for testing. Since the neighbor of a given program changes as each different combination of environmental sensors is presented to a program, it is desirable that the population contain at least as many possible matches as there are combinations of its environmental sensors (i.e., eight) for the typical template, and preferably more. This suggests a population somewhat larger than 320. In fact, in the present example, a population size of 500 is used. If the population were to consist of about 500 individuals, each containing exactly one emission and if a randomly created computer program emulates the performance of a target three-argument Boolean function for about half of the eight possible combinations of the three environmental sensors, then there will be about 2,000 emissions as a result of testing 500 individuals as to their ability to grapple with their environment. If the programs in the population improve so that after a few generations the typical program emulates the performance of a target three-argument Boolean function for about six of the eight possible combinations of environmental sensors, then the number of emissions rises to about 3,000. These emissions are randomly culled so as to leave only 30% of their original number on each generation. Of course, the specific sizes and culling percentages utilized are all dependent on the characteristics of the problem domain.

In one embodiment, the entities are computer programs composed of functions from a function set $F_1$ and terminals from a terminal set T. One of the functions, referred to as the EMIT function, is relatively powerful. In other embodiments, the EMIT function is replaced with progressively less powerful and more primitive functions.

In the currently preferred computer embodiment, a large population (population) of these computer programs is created. The population is created in the manner described above, using the functions from the function set F1 and the terminals from the terminal set T. In one example, the terminal set for the present invention is:

$$T = \{D0, D1, D2\}.$$

The three terminals D0, D1, and D2 can be thought of as sensors of the environment and are variables that can evaluate to either NIL (i.e., false) or something other than NIL (e.g., T=true).

The function set for the example is:

$$F_1 = \{NOT, SOR, SAND, ADD, EMIT\},$$

where NOT, ADD and EMIT take one argument, and SOR and SAND take two arguments. In the computer embodiments of the present invention, a function which does not have the proper number of arguments does not function.

The functions NOT, SOR, and SAND have no side effects. The function NOT takes one argument and performs an ordinary Boolean negation. The function SOR ("Strict OR") takes two arguments and performs a Boolean disjunction in a way that combines the behavior of the OR macro from Common LISP and the PROGN special form from Common LISP. In particular, the SOR function begins by unconditionally evaluating both of its arguments in the style of a PROGN function (thereby executing the side effects, if any, of both arguments) and then continues by returning the result of evaluating the first of its two arguments that evaluates to something other than NIL. The function SOR returns NIL if both arguments evaluate to NIL. In contrast, OR in Common LISP does not necessarily execute the side effects of all of its arguments. The OR in Common LISP returns the result of evaluating the first of its arguments that evaluates to something other than NIL, but does not evaluate any remaining argument(s) once it finds an argument that evaluates to something other than NIL. The function SAND ("Strict AND") takes two arguments and performs a Boolean conjunction in a "strict" manner similar to SOR, such that the side affects of both arguments are executed and then a result is returned. The functions NOT, SOR, and SAND together constitute a computationally complete set of Boolean functions.

The return value of both the EMIT function and the ADD function is the result of evaluating their one argument (i.e., they act as identify functions); however, the real functionality of these two functions lies in their side effects.

As a program circulates in the population of computer programs, both the EMIT function and the ADD function search the ever-changing population of programs for a program having a part which matches the top part of the argument subtree of the EMIT or the ADD, much as a freely-moving biological macromolecule seeks other molecules with a receptor site that matches (in a complementary way) its own receptor site. In the currently preferred computer embodiment, the part which is searched for is the top part of the program (i.e., the root of the tree), such that a program searches for other programs whose top part matches the top part of the argument subtree of the EMIT or the ADD. If the search is successful, the EMIT function and the ADD function then perform their specified side effects. Alternatively, the search could be expanded to include any part of the whole tree.

It should be noted that in this embodiment of the present invention, only a part of the argument subtree of the EMIT function and the ADD function is utilized in the search; in the present invention, this is referred to as the template. In one embodiment, a control parameter specifies how many points from the argument subtree of the EMIT function and the ADD function are to be used (i.e., the size of the template) in the comparison with the other programs in the population. If two points are to be compared, the template consists of the top point of the argument subtree of the EMIT or ADD and the point immediately below the top point on the leftmost branch of the argument subtree. If the argument subtree of an EMIT or ADD contains only one point (i.e., is insufficient), the search fails and no side effect is produced. In this embodiment, if there is an EMIT or ADD function in the template of an EMIT or ADD, the EMIT or ADD in the template is not executed. Instead, the EMIT or ADD function being executed merely uses the EMIT or ADD symbolically in trying to make a match. The points in the argument subtree of an EMIT or ADD other than the two points constituting the template are not relevant to the template matching process in any way in this or other computer embodiments, although those points could be used. In particular, if there is another EMIT or ADD located farther down the argument subtree, they do not initiate any searching. It should be noted that the template size could be different for various members of the population. It should also be noted that a control parameter could be used which specifies the entire EMIT or ADD subtree be used as the template.

The population of computer programs is turbulent in the sense that the immediate neighbors of a given program are constantly changing. In one embodiment, the search of the population initiated by an EMIT or ADD begins with the program itself and then proceeds to the neighboring programs in the population. In one embodiment, a template is never allowed to match to itself (e.g., to the argument subtree of the very EMIT or ADD currently being executed). In one embodiment, the search of the population continues until 100% of the programs in the population have been searched; however, it should be noted that the search could be limited, if desired, to a specified percentage of the population.

If the template of the ADD function of the program being executed successfully matches a part of a program in the population, the ADD function has the side effect of substituting a portion corresponding to the matching part into the program being executed. In one embodiment, if the template of the ADD function of the program being executed successfully matches the top part of a program in the population, the ADD function has the side effect of substituting the entire matching program into the program being executed. The entire matching program is inserted in place of the ADD being executed and the entire argument subtree of the ADD (i.e., not just the template part of the argument subtree of the ADD). Similarly, this is the case for the other computer embodiments using a similar operation. In other words, in this and the other computer embodiments, the entire matching program is permanently incorporated into the physical structure of the program being executed, so the physical size of the program being executed usually increases as a consequence of the ADD function.

In one computer embodiment, the inserted program is not executed at the time of incorporation; however, since it has now become part of a larger program, it will be activated on the next occasion when the program as a whole is executed. Thus, if an ADD function inserts a program (or portion thereof) containing multiple occurrences of the ADD function, each of those occurrences of the ADD function will be executed on the next occasion when the program as a whole is executed, thereby causing additional dramatic growth in the physical size of the program.

The ADD function is the basic tool for creating structures capable of more complex behavior. The ADD function operates by agglomerating (incorporating) free-floating material from the population. In the initial generation of the process, this assembly process involves combining programs that were initially in the population; however, in later generations, this agglomerative process involves combining programs that are themselves the products of earlier combinations. This agglomerative process thereby creates, over time, large structures that contain a hierarchy of smaller structures. Analogously in nature, when the active receptor sites of two freely moving biological molecules match (in a complementary way), a chemical reaction takes place to which both entities contribute. The specific reaction generally would not have taken place had they not come together. Thus, there is some resemblance between the operation of the ADD function here and biological reactions that occur in nature. This physical growth in the present invention via agglomeration yields a growth in functionality from generation to generation. The execution of the ADD function is finished as soon as a single match and substitution occurs. If an ADD function cannot find a match, the search fails and the ADD has no side effect.

The number of EMIT and ADD functions in the program being executed generally increases as execution of ADD functions incorporate programs into the program being executed. For purposes of this discussion, these new occurrences of the EMIT or ADD functions are referred to as acquired functions.

With respect to the EMIT function, if the EMIT function of the program successfully matches a part of a program in the population, the EMIT function has the side effect of emitting a copy of the portion (subtree) corresponding to the matching part into the medium in which the population resides. In one embodiment, if the template of the EMIT function of the program being executed successfully matches the top part of a program in the population, the EMIT function has the side effect of emitting a copy of the entire matching program into the medium. The execution of the EMIT function is finished as soon as a single match and emission occurs. If an EMIT function cannot find a match, the search fails and the function has no side effect. In one embodiment, the EMIT function refers to its argument subtree only once. Thus, if there is any occurrence of the EMIT function or the ADD function in the argument subtree of an EMIT, it is not used to initiate a search.

If unlimited computer resources are available, the emission from the EMIT function would be unconditionally inserted directly into the population of programs, thereby increasing the size of the population. In one embodiment, this emission is made into a temporary storage area. In one embodiment, this temporary storage area is subsequently randomly culled (decimated), so the number of programs in the population can be kept to a manageable size. The programs that survive the culling are placed into the population and become the next generation.

Consider the following illustrative S-expression containing 22 points:

(SOR (NOT (SOR D2
    (ADD (SAND D0 (SAND D1 D2)))))
(SAND (SAND D1 D2)
(SOR (EMIT (SOR (NOT D2) (NOT D1)))
    D2)))

The underlined subtree is an EMIT function and its argument subtree. The subtree in italics consists of an ADD function and its argument subtree. FIG. 5 graphically depicts the S-expression as a rooted, point-labeled tree with ordered branches. Referring to FIG. 5, the subtree rooted by the ADD function 505 consists of SAND 506 having arguments D0 507 and SAND 508 as branches. SAND 508 has arguments D1 509 and D2 510 as branches. Referring to FIG. 5, the subtree rooted by the EMIT function 516 is shown having argument SOR 518 as a branch. SOR 518 has arguments NOT 519 and NOT 520 as its branches. Arguments NOT 519 and NOT 520 have arguments D2 521 and D1 522 as their branches respectively.

Suppose that the S-expression above is evaluated for all eight combinations of its three Boolean arguments D2, D1, and D0. TABLE 1 is a truth table showing the return values obtained after evaluating the S-expression for all eight combinations of its three Boolean arguments. Note that both the EMIT function and the ADD function act as identity functions when they are encountered.

TABLE 1

| | Truth Table | | | Illustrative S-expression |
|---|---|---|---|---|
| | D2 | D1 | D0 | |
| 0 | NIL | NIL | NIL | T |
| 1 | NIL | NIL | T | T |

TABLE 1-continued

| | Truth Table | | | Illustrative S-expression |
|---|---|---|---|---|
| | D2 | D1 | D0 | |
| 2 | NIL | T | NIL | T |
| 3 | NIL | T | T | T |
| 4 | T | NIL | NIL | NIL |
| 5 | T | NIL | T | NIL |
| 6 | T | T | NIL | T |
| 7 | T | T | T | T |

Consider now the side effects caused by the evaluation of the above S-expression. The function EMIT in the S-expression in FIG. 5 has an argument subtree consisting of five points. (i.e., SOR 518, NOT 519, NOT 520, D2 521 and D1 522) The top point of this argument subtree (i.e., the function SOR 518) and the point immediately below SOR on the leftmost branch (i.e., the function NOT 519) constitute the template for this EMIT function. Each time this S-expression is evaluated, the EMIT searches the population for a program with a SOR at its root and a NOT as the point immediately below the root in the leftmost branch. As previously mentioned, the search of the population starts with the program itself. For this particular EMIT function with this particular template (i.e., SOR 518 and NOT 519), a match is found at its own root (namely SOR 501 and NOT 502). In this case, the side effect of the EMIT function for each evaluation of any S-expression is the emission of the entire matching program into the temporary storage area. In this example, the matching program is the whole program, so the evaluation of the EMIT in boldface in this program causes a copy of this entire program to be emitted into the temporary storage area.

If unlimited computer resources are available, the program itself would not be included in the search. Instead, the random process that initially produced the program would be relied on to have also produced a second occurrence of the same program (or a functionally equivalent program). The probability of the creation of two occurrences of a particular program and their discovery of one another is such that a much larger initial population would be required than is the case in this example.

If the EMIT function had not found a match within itself, it might have found a match somewhere else in the population; thus, the side effect of the EMIT function would be the emission of some other entire program (or portion thereof) into the temporary storage area. It is possible for two programs to belong to a group such that an EMIT function in one program causes another program (or portion thereof) in the group to be copied into the temporary storage area while an EMIT function in the other program causes the first program (or portion thereof) to be so copied.

There are many variations on replication. When an active entity causes an exact copy of itself to be emitted into the medium, it is referred to as a "self replicator". When a pair (or larger group) of active entities in the population cause an exact copy of each to be emitted in the medium, they are referred to as "mutual self-replicators." When an active entity in the population causes a nearly exact copy of itself to be emitted into the medium (the nearly exact copy typically having the same templates for all ADD, SST, EMIT, DUMET and DWT operations [some of which are described later] and the same top part, but differing in some other way), it is referred to as a "quasi-self-replicator." When an active entity in the population causes some intermediate entity (or entities) to be emitted into the medium and such intermediate entity (entities) eventually produce a copy of the entity to be emitted into the medium, it is referred to as an "indirect replicator." Indirect replicators can be exact, mutual, or quasi. In conjunction with the present invention, the terms "replicator", "self-replicator", "replicative", "selfreplicative" or "self-reproducing" refer to but is not limited to all of the above variations on replication (i.e., exact, self-, mutual, quasi-, and indirect).

The function ADD in the first S-expression (FIG. 5) has an argument consisting of five points of which the function SAND 506 and the terminal D0 507 constitute the template. Each time the S-expression is evaluated, the ADD function searches the population for a program with the function SAND at its root and the terminal D0 as the point below the root in the leftmost branch. The only match found within this S-expression is with the template of the argument of the very ADD function being executed. Since this kind of match is disallowed, the result is that no match is found within this S-expression. The search therefore continues to the neighbor of this S-expression in the population.

Suppose that the following S-expression containing 11 points is the immediate neighbor of the first S-expression:

(SAND D0 (SOR (ADD (SAND D1 D1 )) (EMIT (SAND D0 D2)))).

FIG. 6 illustrates this second S-expression as a rooted, point-labeled tree with ordered branches. Referring to FIG. 6, SAND 601 is the root of the tree having the arguments D0 602 and SOR 603 as its branches. Function SOR 603 has the arguments ADD 604 and EMIT 605 as its branches. Function ADD 604 has the argument SAND 606 as its branch. Function SAND 606 has the arguments D1 607 and D1 608 as its branches. Function EMIT 605 has the argument SAND 609 as its branch. Function SAND 609 has the arguments D0 610 and D2 611 as its arguments.

When the function ADD 505 (FIG. 5) in the first S-expression is executed, a match occurs between its template consisting of SAND 506 and D0 507 (of FIG. 5) and this second S-expression. In other words, the SAND 601 at the root of the second S-expression and the D0 602 immediately below the root of the second S-expression (of FIG. 6) match the template (i.e., SAND 506 and D0 507) of the ADD 505 of the first S-expression. The ADD function 505 in the first S-expression therefore performs the side effect of substituting the second S-expression into the first S-expression. The subtree rooted by ADD 505 in the first S-expression consisting of the ADD function 505 and its argument subtree (SAND 506, D0 507, SAND 508, D1 509 and D2 510 in FIG. 5) are replaced by the second program. The resulting program is shown with the inserted subtree underlined:

(SOR (NOT (SOR D2
<u>(SANDD0 (SOR (ADD (SAND D1 D1))</u>
<u>(EMIT</u>
<u>(SAND D0 D2))))))</u>
(SAND (SAND D1 D2)
(SOR (EMIT (SOR (NOT D2) (NOT D1)))
D2))).

FIG. 7 illustrates the S-expression resulting after the ADD function 505 in the first S-expression from FIG. 5 finds a match at the root of the second S-expression from FIG. 6.

Initially, the process is started by randomly creating a population of computer programs consisting of compositions of the five functions from the function set $F_1$ and the three terminals from the terminal set T described above, using the random generative process for creating an initial random population described earlier. Many random initial individuals created in this way will prove to be capable of asexual reproduction contained multiple occurrences of the EMIT function and the ADD function. Many occurrences of the ADD function in a program cause the permanent incorporation of the matching program (or portion thereof) into the program being executed, thereby increasing the size of the program being executed. Multiple occurrences of the ADD function in a program greatly accelerate the rate of this exponential growth process. Moreover, multiple occurrences of the ADD function generally accelerate the rate of acquisition of occurrences of the EMIT function by the program being executed. The combined effect of multiple occurrences of both the ADD and EMIT functions in the initial generation is that the available computer memory is almost immediately exhausted.

To preserve available computer memory, the self-replicators can be screened so that only less prolific individuals are included in the population of programs. If unlimited computer resources are available, the screening does not have to be performed. In one embodiment, the population is screened so that a program capable of asexual reproduction contains exactly one executable occurrence of the EMIT function and exactly one executable occurrence of the ADD function. For purposes of this screening, a function is considered executable provided it is not in the argument subtree of an EMIT function or an ADD function. It also may be necessary to require that the one executable occurrence of the ADD function appear to the left of the one executable occurrence of the EMIT function so that the ADD function is always executed prior to the EMIT function. Otherwise, if there are only one EMIT function in a program and if it were executed before execution of the ADD function, the emission produced by the EMIT would necessarily always occur before the substitution caused by the ADD. Consequently, the substitution would never be permanently incorporated into the program that proceeds to the temporary storage area and hence into the population, and it would be impossible to evolve an improvement requiring more than one generation to evolve.

The following three additional criteria make a self-replicator involving $F_1$ even more suitable for our purposes of this embodiment of the present invention. First, in this embodiment, there is exactly one executable ADD function. Second, in this embodiment, the template of the one executable ADD function must not refer to a program that would never be present in a population of self-replicators (e.g., a program with ADD at its root). Third, in this embodiment, there is exactly one executable EMIT function.

In addition, programs generally acquire additional occurrences of the EMIT function when an ADD function makes a substitution, thereby causing the number of occurrences of acquired EMIT functions to increase rapidly and exceed the number of EMIT functions responsible for self-replication. The templates of these acquired EMIT functions are rarely helpful or relevant to self-replication. If unlimited computer resources are available, all of these acquired EMIT functions can be retained. In the present invention, the emissions produced by these acquired EMIT functions are heavily culled so that only 0.01% of the emissions from programs that correctly emulate the behavior of the target function are admitted to the population from the temporary storage area.

In the present invention, the population is monitored with the goal of maintaining it at 500. The culling percentages selected for the present invention are intended to initially yield somewhat more than 500 emissions. If the number of emissions after this culling is still above 500, the remaining emissions are randomly culled again so that no more than 500 emissions are placed into the population. Occasionally, the population contains fewer than 500 programs. If adequate computer resources were available, there would be no need to carefully control the size of the population in this way.

The programs that are in the population in one generation of the population do not automatically get into the next generation. The only way to get into the new generation is via an EMIT function. Self-replicators, of course, have at least one EMIT function that is capable of copying the program into the temporary storage area. In addition, getting into the next generation requires correctly emulating the performance of a target three-argument Boolean function for one or more combinations of the environmental sensors. Fitter programs successfully emulate the target function for more combinations of the environmental sensors and, therefore, are more likely to appear in the next generation.

The ADD function bears some resemblance to the crossover (recombination) operation of genetic programming. The two operations are similar in that they permanently incorporate a program tree from one program into another program. However, the two operations differ in three ways. First, the ADD function here produces only one offspring. Second, there is no external random selection of a crossover point within the program; the entire matching program is always inserted into the program being executed. Third and most importantly, the incorporation of genetic material into the program is initiated from inside the program itself. The program being executed is active, and its code causes the incorporation of genetic material into itself and causes the reproduction of the program into the next generation. In addition, in the preferred embodiment, the population changes order, i.e. the neighbors of the entity in question change, as each new combination of environmental sensors is considered, so the matching program is generally not constant between combinations of environmental conditions (i.e., environmental material). Note that in order to achieve the effect of reordering the population so as to change the neighbors of the entity, a matching entity need only be picked for any template using action at random from the corresponding entity in the template listing described above. Note that sometimes the accessible neighbors in the population are limited, i.e. in some embodiments, only a subset of the population is searched by a template using action.

In implementing the ADD function, the COPY-TREE function is used to make a copy of both the matching program and the program being executed. Only a copy of the matching program is permanently incorporated into a copy of the program being executed, thus permitting the unchanged original program to be exposed to all possible combinations of its environmental sensors within the current generation and permitting the matching program to interact more than once with the program being executed on the current generation. If unlimited computer resources are available, the population can be sufficiently large to permit a matching program to be devoured by the program into which it is incorporated. In that event, essentially the same process would occur progressively over many generations, thereby producing some extraordinarily large programs.

The result of creating the population and executing the active ADD and EMIT functions in the population is to produce another generation of entities which as a whole may respond better to the environmental conditions, such that a solution to the problem can be achieved or generated.

An Alternative Computer Embodiment

In this embodiment, the EMIT function is unbundled and replaced with two more primitive functions: a one-argument SST ("Search Sea for Template") function and a one-argument DUMET ("Do Until MATCHED-TREE Equals<<TRAILING-TEMPLATE>>>) function. Therefore, the function set for this embodiment contains six functions:

$$F_2=\{NOT, SOR, SAND, ADD, SST, DUMET\}$$

The functions ADD, NOT, SOR, and SAND operate in the same manner as discussed previously.

The real significance of the two new functions, SST and DUMET, lies in their side effects; however, they each have return values. The SST and DUMET function each return the result of evaluating the one argument (i.e., each acts as an identity function).

Two global variables are used in conjunction with the new SST and DUMET functions for each program: MATCHED-TREE and OPEN-SPACE. Each is initially NIL when evaluation of a given program begins.

As a program circulates in the ever-changing population of computer programs, the SST function ("Search Sea for Template") searches the population of programs for a program whose top part matches the top part of the argument subtree of the SST function (i.e., a template consisting of two points). When an SST function finds a match, the global variable MATCHED-TREE is bound to the entire matching program. In other words, the global variable MATCHED-TREE is instantiated with the entire matching program.

The one-argument iterative operator DUMET ("Do Until MATCHED-TREE Equals <<TRAILING-TEMPLATE>>) iteratively traverses MATCHED-TREE and copies it, to OPEN-SPACE until the <<-TRAILING-TEMPLATE>> argument of the DUMET matches the current part of MATCHED-TREE. If DUMET fails to find a subtree that matches its <<TRAILING-TEMPLATE>> while it is traversing MATCHED-TREE, the contents of OPEN-SPACE are discarded. In one embodiment, the copying occurs one point at a time (i.e., one function or terminal at a time). If the tree placed into the OPEN-SPACE is not syntactically valid, the contents of OPEN-SPACE are discarded. Upon completion of the DUMET, the contents of OPEN-SPACE are transferred to the temporary storage area (and hence into the population).

If there is an occurrence of an SST or ADD function in the argument subtree of an SST or ADD, the inner function is never used to perform a search; the outer function merely uses it in trying to make a match. Finding a self-replicator via random search is considerably more difficult with function set $F_2$ than with function set $F_1$.

If restrictions that the initial screening criteria that the self-replicator have at least one executable ADD function (i.e., one with a non-trivial template), that at least one of the executable ADD functions appears before (i.e., to the left of) at least one of the executable DUMET functions, that the self-replicator have at least one executable SST function, and that at least one of the executable SST functions appears before at least one of the executable ADD functions are imposed, then the probability of finding a screened self-replicator with function set $F_2$ is measured to be about one in 38,339.

The following two additional criteria make a self-replicator involving $F_2$ even more suitable for use. In one embodiment, there is exactly one executable ADD, SST, and DUMET function in each program. Also, in one embodiment, the template of the one executable ADD and SST functions must not refer to a program that would never be present in a population of self-replicators. If these additional two screening criteria involving $F_2$ are imposed, then the probability of finding a fully screened self-replicator with function set $F_2$ is measured to be about one in 350,000.

The one fully screened self-replicator that was actually discovered in a random search of 350,000 for the second embodiment is:

(SOR (SOR (SAND (ADD (SOR D2 D1))

(NOT (SST D2)))

(SST (SOR (SOR D1 D1) (NOT D1))))

(DUMET (SAND (DUMET (NOT D0))

(NOT (SOR D1 D1)))))

The italicized portion of this S-expression contains an executable ADD function with a template consisting of SOR and D2. Note that the SST function on the second line is not executable since its template is too small. The underlined and italicized portion of this S-expression contains an SST function that searches the population with a template of SOR and SOR. The DUMET function and its argument are in the following portion (DUMET (SAND (DUMET (NOT D0)) (NOT (SOR D1 D1 )))) of the above S-expression. Since this DUMET function appears at the far right of the S-expression, its argument matches the <<TRAILING-TEMPLATE>> precisely when the copying of the S-expression is complete. Note that a second DUMET function is embedded in the first DUMET function and is as follows: (DUMET (NOT D0)); however, it is not executable since it is part of the argument subtree of the main DUMET function. FIG. 8 shows this fully screened 26-point self-replicator.

Using Boolean function 235 as the environment for the programs in the population and a pool of 3,000 synthesized programs patterned after the actually discovered fully screened self-replicators. In one run, one of the individuals in generation 0 of our population of programs was the following 27-point S-expression which always produces a true result:

(SOR (NOT (SAND (NOT D0) (ADD (NOT (SOR (NOT D0) D2)))))

(SAND (SST (SOR (NOT (NOT D2)) (ADD D2)))

(DUMET (SOR (SOR D0 D1)

(SAND D1 D2))))).

The ADD function and its entire argument subtree are underlined in the S-expression above, and the ADD has a template of NOT and SOR. The SST function has a template of SOR and NOT; its argument subtree is shown in italics. The DUMET function and its <<-TRAILING-TEMPLATE,>> argument consisting of (SOR (SOR D0 D1) (SAND D1 D2))is shown as (DUMET (SOR (SOR D0 D1) (SAND D1 D2))). This 27-point S-expression is a self-replicator, because its SST function has a template consisting of SOR and NOT, thereby matching its own root and causing MATCHED-TREE to be bound to itself. The <<-TRAILING-TEMPLATE,>> of the DUMET function matches itself, thereby causing the copying of the entire S-expression into the temporary storage area and thence into the population for the next generation where it is subjected to combinations of environmental sensors. FIG. 9 illustrates this 27-point S-expression.

The first neighbor in the population in generation 0 that matched the template of NOT and SOR of the ADD function is the following 24-point S-expression:

(NOT (SOR (SAND (SOR D1 D0) (SOR (ADD (SOR (SAND D1 D1) D2))

D2)) (SOR (SST (NOT (SOR D2 D1))) (DUMET (SAND D1 D0))))).

This 24-point S-expression is also a self-replicator whose root is NOT and whose point immediately below and to the left of the root is SOR, as shown underlined above. FIG. 10 illustrates this 24-point S-expression.

The side effect of the execution of the ADD function in the 27-point individual is that the following individual containing 45 points, is created and placed into the temporary storage area:

(SOR (NOT (SAND (NOT D0) <u>(NOT (SOR (SAND (SOR D1 D0) (SOR (ADD (SOR (SAND D1 D1) D2)) D2)) (SOR (SST (NOT (SOR D2 D1))) (DUMET-

ACQ (SAND D1 D0))))))</u> (SAND (SST (SOR (NOT (NOT D2)) (ADD D2)))

(DUMET (SOR (SOR D0 D1) (SAND D1 D2)))))

The 24-point subtree underlined above (with a NOT at its root and with SOR immediately below and to the left of the root) is inserted by the ADD function. The 27-point individual lost 6 points and gained 24 points, thus producing the 45-point individual. Note that this new 45-point individual has an acquired DUMET-ACQ function that came from the 24-point individual. In this run, this 45-point individual eventually enters the population and becomes part of generation 1. FIG. 11 graphically depicts this 45-point S-expression.

Another of the individuals in generation 0 of our population of programs was the following 33-point S-expression:

(SOR (SAND <u>(ADD (SOR D2 (SAND D2 D0)))</u> (SAND (NOT (NOT (SOR (SAND D1 D0) D0))) (SST (SOR (SAND D0 D2) D2)))) (SOR D2 (DUMET (SOR (SAND (NOT D0) D2) (SAND D2 D2))))).

The ADD function in this S-expression is shown underlined above. Its template consists of SOR and D2. As it happens, there is no program in the population that matches this template. However, because this individual is a self-replicator that produces the correct results for some combinations of the environmental sensors, this 33-point individual is copied into the temporary storage area and hence into the population for generation 1.

The above 45-point individual contains an ADD function with a template of SOR and SAND. When it was evaluated during generation 1, it encountered the 33-point individual (which has SOR at its root and SAND immediately below and to the left of the root) as a neighbor. Therefore, the ADD template of the above 45-point S-expression matched the 33-point neighbor. The side effect of the match is the creation of a 72-point individual (i.e., 45 points+33 points−6 points for the subtree argument of the ADD function being executed). This 72-point S-expression is as follows:

(SOR (NOT (SAND (NOT D0) (NOT (SOR (SAND (SOR D1 D0) (SOR <u>(SOR (SAND (ADD (SOR D2 (SAND D2 D0))) (SAND (NOT (NOT (SOR (SAND

D1 D0) D0))) (SST (SOR (SAND D0 D2) D2)))) (SOR D2 (DUMET-ACQ (SOR (SAND (NOT D0) D2) (SAND D2 D2))))) D2</u>)) (SOR (SST (NOT (SOR

D2 D1))) (DUMET-ACQ (SAND D1 D0))))))) (SAND (SST (SOR (NOT (NOT

D2)) (ADD D2))) (DUMET (SOR (SOR D0 D1) (SAND D1 D2)))))

The 33-point subtree inserted by the ADD function is shown underlined in the above S-expression. This 72-point individual eventually enters the population for generation 2. FIGS. 12A and 12B graphically depict this 72-point S-expression. Thus, the result of creating the population and executing the active ADD and DUMET functions in the population is to produce another generation of entities which as a whole may respond better to the environmental conditions, such that a solution to the problem can be achieved or generated.

Another Computer Embodiment of the Present Invention

In this embodiment, the one-argument iterative function DUMET is further unbundled and replaced with a two-argument iterative function DWT ("Do <<-WORK>> until <<TRAILING-TEMPLATE>> matches"). The new DWT is considerably less powerful than the DUMET function. In addition, the function set is enlarged to include a LR ("Load REGISTER") function and a SR ("Store REGISTER") function. Thus, the function set for this embodiment contains eight functions and is $F_3 = \{$NOT, SOR, SAND, ADD, SST, DWT, LR, SR$\}$, where NOT, ADD, SST, DWT, LR and SR take one argument, and SOR and SAND take two arguments. The functions NOT, SOR, SAND, ADD, and SST ("Search Sea for Template") function in the same manner as before. The terminal set is the same as before for the example with this embodiment.

The real functionality of these three new functions lies in their side effects; however, they each have return values. The return value of the new LR function is T and the return value of the new SR function is NIL. The new DWT function returns the result of evaluating its second argument (i.e., it acts as an identity function on its second argument); its return value does not depend at all on its first argument.

In addition to the global variables MATCHED-TREE and OPEN-SPACE introduced in the previous embodiment, this embodiment uses a new global variable, called REGISTER. It is used in conjunction with the new LR and SR functions and is initially NIL when evaluation of a given program begins.

The new two-argument iterative operator DWT ("Do <<WORK>> until <<TRAILING-TEMPLATE>> matches")iteratively evaluates its first argument, <<WORK>>, until its second argument, <<TRAILING-TEMPLATE>>, matches the current MATCHED-TREE. This new DWT operator is similar to the iterative looping operator found in many programming languages in that it performs certain work until its termination predicate is satisfied. The DWT operator is terminated by means of a biologically-motivated template-matching scheme identical to that used by the DUMET operator of experiment 2. The new two-argument DWT operator is considerably less powerful than the one-argument DUMET operator, because the DUMET operator automatically traversed MATCHED-TREE and copied it, one point at a time, to OPEN-SPACE and into the temporary storage area. This traversing and copying must now be accomplished within the ,,WORK,, argument of the new DWT operator.

The new function LR ("Load REGISTER") works in conjunction with the global variables MATCHED-TREE and REGISTER. This function views the LISP S-expression in MATCHED-TREE as an unparenthesized sequence of symbols. For example, the following S-expression:

(AND (OR (NOT D1) D0))

is viewed as the following sequence:

{AND OR NOT D1 D0 }

When each LISP function has a specific number of arguments (as is the case here with the function set $F_3$), an unparenthesized sequence of symbols is unambiguously equivalent to the original S-expression. This view is similar to that employed in the FORTH programming language, where functions are applied to a specified number of arguments, but where parentheses are not used or needed.

The function LR takes the current first element (i.e., function or terminal) of MATCHED-TREE (viewed as an unparenthesized sequence of symbols) and moves it into the REGISTER. The function LR has the side effect of removing this current first element from MATCHED-TREE and has the side effect of placing this element in the REGISTER. For example, if LR were to act once on the above S-expression, the unparenthesized sequence associated with MATCHED-TREE would be reduced to the following:

{OR NOT D1 D0 } and the REGISTER would contain AND.

The new function SR ("Store REGISTER") works in conjunction with the global variables REGISTER and OPEN-SPACE. The function SR takes the current contents of REGISTER (which is the name of a single function or terminal) and places it in OPEN-SPACE. REGISTER is not changed by the SR. When the DWT operator terminates, necessary parentheses are inserted into the OPEN-SPACE in an attempt to create a syntactically valid S-expression. For example, if OPEN-SPACE contains AND, OR, NOT, D1, and D0, then (AND (OR (NOT D1) D0)) will be transferred to the temporary storage area.

If MATCHED-TREE contains a program because of the action of a previous SST ("Search Sea for Template"), a DWT ("Do <<WORK>> until <<TRAILING-TEMPLATE>> matches") that contains a LR ("Load REGISTER") and a SR ("Store REGISTER") in that order in its first argument subtree will iteratively load the REGISTER with the elements of the program in MATCHED-TREE and successively store them into OPEN-SPACE. This iterative process continues until the <<TRAILING-TEMPLATE>> of the DWT matches the current part of MATCHED-TREE.

If DWT fails to find a subtree that matches <<TRAILING-TEMPLATE>> while it is traversing MATCHED-TREE, the contents of OPEN-SPACE are discarded. If the tree placed into the OPEN-SPACE is not syntactically valid, the contents of OPEN-SPACE are discarded.

If there is an occurrence of a DWT, SST, or ADD function in the argument subtree of a DWT, SST, or ADD, the inner function is never used to perform a search; the outer function merely uses it in trying to make a match. Finding a self-replicator via random search is considerably more difficult with function set $F_3$ than with either function sets $F_2$ or $F_1$.

In one embodiment, requirements are imposed that the self-replicator have at least one executable ADD function (i.e., one with a non-trivial template) and that at least one of the executable ADD functions appears before (i.e., to the left of) at least one of the executable DWT function is imposed.

In one embodiment, the following five additional criteria make a selfreplicator involving $F_3$ even more suitable for our purposes here. In one embodiment, there is exactly one executable ADD, SST, and DWT function. Also in one embodiment, the template of the one executable ADD and SST functions must not refer to a program that would never be present in a population of self-replicators. Furthermore, the ADD, SST, and DWT functions must appear in that order when the S-expression is evaluated in the usual way. Yet further, the executable ADD and SST functions must not be part of the first argument to the DWT function. Lastly, the first argument to the DWT function must have an executable LR and SR function.

One of the two fully screened self-replicators that was actually discovered in the random search of 12,500,000 for this embodiment was (SAND (SOR (SOR (NOT (ADD D2)) <u>(ADD (ADD (SR))))</u>

(ADD (NOT (SAND (SR) D2))))

(SAND <u>(SST (SAND (SOR (SR) D1) (DWT D1 (LR))))</u>

(DWT (SAND (SAND (LR) D2) (NOT (SR)))

(SOR (SST D1) (DWT D1 D1))))).

The italicized portion of this S-expression contains an executable ADD function with a template consisting of NOT and SAND. The SR function within the subtree argument to this ADD is not executable. Note the second two ADDs in the underlined portion of the S-expression is not executable because its template is too small. Note also that the first ADD will never find a match because it would require finding a program whose root was ADD. Such a program can be ignored in practice because it would immediately replace its entire self with another program. The underlined and italicized portion of this S-expression contains an SST function that searches the population with a template of SAND and SOR. Note that the SR and DWT functions within the subtree argument to this SST are not executable.

The first argument to the two-argument DWT function is (SAND (SAND (LR) D2) (NOT (SR))), while the second argument is (SOR (SST D1) (DWT D1 D1 )). The first argument to this DWT executes both the LR ("Load REGISTER") and the SR ("Store REGISTER") function, thereby causing the copying, one piece at a time, of the contents of MATCHING-TREE to the REGISTER. The second argument to this DWT is the <<TRAILING-TEMPLATE>>. Since this DWT function appears at the far right of the S-expression, this match occurs precisely when the copying is complete. FIG. 13 illustrates this fully screened 36-point self-replicator for this embodiment.

above. FIG. 15 graphically depicts this 31-point S-expression.

The side effect of the execution of the ADD function in the 28-point individual is that the following 54-point individuals is created and placed into the temporary storage area:

(SOR (NOT (SAND (NOT D0) <u>(NOT (SOR (SAND (SOR D0 D2) (SOR (ADD (SOR (SAND D0 D1) D2)) D0))(SOR (SST (NOT (SOR D2 D1))) (DWT-ACQ (SAND (NOT (LR)) (SR)) (SAND (SAND D2 D1) (SST D0))))))</u> (SAND (SST (SOR (NOT D2) (ADD D2))) (DWT (SOR (LR) (SR)) (SOR (SAND D0 D2) (SAND D0 D0)))))

In one run, one of the individuals in generation 0 of our population of programs was the following 28-point S-expression:

(SOR (NOT (SAND (NOT D0) <u>(ADD (NOT (SOR D0 D2)))))</u>

(SAND (SST (SOR (NOT D2) (ADD D2)))

*(DWT (SOR (LR) (SR))*

*(SOR (SAND D0 D2) (SAND D0 D0)))))*

The ADD function and its entire argument subtree are underlined in the S-expression above; the ADD has a template of NOT and SOR. The SST function has a template of SOR and NOT; its argument subtree is shown in italics. The DWT function, its first argument (SOR (LR) (SR)), and its second TRAILING-TEMPLATE,, argument consisting of (SOR (SAND D0 D2) (SAND D0 D0)) is shown in italics and underlined.

This 28-point S-expression is a self-replicator, because its SST function has a template consisting of SOR and NOT, thereby matching its own root and causing MATCHED-TREE to be bound to itself. The <<TRAILING-TEMPLATE>> of the DWT function matches itself, thereby causing the copying of the entire S-expression into the temporary storage area and hence into the population for the next generation for the combinations of environmental sensors. FIG. 14 depicts this 28-point S-expression.

The first neighbor in the population in generation 0 that matched the template of NOT and SOR of the ADD function was the following 31-point S-expression:

The 31-point subtree underlined above (with a NOT at its root and with SOR immediately below and to the left of the root) is inserted by the ADD function from the 28-point individual. The 28-point individual lost 5 points and gained 31 points, thus producing the 54-point individual. Note that this new 54-point individual has an acquired DWT-ACQ function that came from the 31-point individual. In this run, this 54-point individual eventually enters the population and becomes part of generation 1. FIG. 16 graphically depicts this 54-point S-expression.

Another of the individuals in generation 0 of the population of programs was the following 41-point S-expression:

(SOR (SAND (NOT <u>(ADD (SOR D0 (SAND D2 D0))))</u> (SAND (NOT (SOR (SAND D0 D1) D2)) (SST (SOR (SAND D1 D2) D0)))) (SOR D1 (DWT (SOR (SAND (NOT D0) (NOT (LR))) (SAND D0 (SR))) (SOR (SOR D0 D1) (SAND D2 D0)))))

The ADD function and its argument subtree in this S-expression is shown underlined above. Its template consists of SOR and D0. As it happens, there is no program in the population that matches this template. However, because this individual is a self-replicator which produces the correct results for some combinations of the environmental sensors, this 41-point individual is copied into the temporary storage area and into the population for generation 1. FIG. 17 illustrates this 41-point S-expression.

The above 54-point individual contains an ADD function with a template of SOR and SAND. When it is evaluated during generation 1, it encountered the 41-point individual (which has SOR at its root and SAND immediately below and to the left of the root) as a neighbor. Therefore, the ADD template of the above 54-point S-expression matched the 41-point neighbor. The side effect of the match is the creation of a 72-point <u>(NOT (SOR</u> (SAND (SOR D0 D2) (SOR (ADD (SOR (SAND D0 D1) D2))

D0)) (SOR (SST (NOT (SOR D2 D1))) (DWT (SAND (NOT (LR)) (SR))

(SAND (SAND D2 D1) (SST D0))))))

This 31-point S-expression is also a self-replicator whose root is NOT and whose point immediately below and to the left of the root is SOR, as shown underlined individual (i.e., 54 points+41 points−6 points for the subtree argument of the ADD function being executed). This 89-point S-expression is as follows:

(SOR (NOT (SAND (NOT D0) (NOT (SOR (SAND (SOR D0 D2) (SOR <u>(SOR</u>

<u>(SAND (NOT (ADD (SOR D0 (SAND D2 D0)))) (SAND (NOT (SOR (SAND</u>

<u>D0 D1) D2)) (SST (SOR (SAND D1 D2) D0)))) (SOR D1 (DWT (SOR (SAND</u>

<u>(NOT D0) (NOT (LR))) (SAND D0 (SR))) (SOR (SOR D0 D1) (SAND D2</u>

<u>D0)))) D0</u>)) (SOR (SST (NOT (SOR D2 D1))) (DWT (SAND (NOT (LR)) (SR))

(SAND (SAND D2 D1) (SST D0))))))) (SAND (SST (SOR (NOT D2) (ADD

D2))) (DWT (SOR (LR) (SR)) (SOR (SAND D0 D2) (SAND D0 D0))))).

The 41-point subtree that is inserted by the ADD function is shown underlined in the above S-expression. This 89-point individual eventually enters the population for generation 2. FIGS. 18A and 18B illustrate this 89-point S-expression.

In summary, in spite of a number of simplifications and compromises necessitated by the limited available computer resources, the spontaneous emergence of self-replicating computer programs, sexual reproduction, and evolutionary self-improving behavior among randomly created computer programs using a computationally complete set of logical functions has been shown.

Parallel Processing

The process of the present invention can benefit greatly from parallel operation. By using parallel processing, the overall rate of activity rises in almost direct proportion to the number of activities performed simultaneously. This is beneficial since it can reduce the overall run time of the genetic programming system and thereby make the solution of hard problems tractable.

The present invention can benefit from parallel operation in several ways that apply equally to conventional genetic algorithms involving fixed length character strings and non-linear genetic processes involving hierarchical structures that can vary in size and shape.

TABLE 3

| Function set | Embodiment 1<br>$F_1$ | Embodiment 2<br>$F_2$ | Embodiment 3<br>$F_3$ |
|---|---|---|---|
| Function set | EMIT<br>ADD<br>SAND<br>SOR<br>NOT | DUMET<br>SST<br>ADD<br>SAND<br>SOR<br>NOT | LR<br>SR<br>DWT<br>SST<br>ADD<br>SAND<br>SOR<br>NOT |
| Global variables | None | MATCHED-TREE<br>OPEN-SPACE | MATCHED-TREE<br>OPEN-SPACE<br>REGISTER |
| Probability of a program performing the example Boolean function | 1:18,461 | 1:25,818 | 1:33,177 |
| Number of individuals that must be processed to find an S-expression performing the example Boolean function with 99% probability | 86,562 | 122,151 | 158,251 |
| Probability of a self-replicator | 1:281 | 1:1,129 | 1:20,695 |
| Probability of a screened self-replicator | 1:575 | 1:38,339 | 1:1,562,500 |
| Probability of a fully screened self-replicator | 1:5,000 | 1:350,000 | 1:6,250,000 |
| 500 times probability of a fully screened self-replicator | 2,500,000 | 175,000,000 | $3.125 \times 10^9$ |
| Number of self-replicators that must be processed to evolve a self-replicator performing the example Boolean function with 99% probability | 16,500 | 119,000 | 148,500 |

First, for example, each of the genetic operations can be simultaneously performed in parallel on different entities in the population. If the entities are computer programs, parallel processing is accomplished by a computing machine having multiple operating units (control and arithmetic) capable of simultaneously working on entities from the population. In this case, the overall rate of activity rises in almost direct proportion to the number of activities (i.e. genetic operations) performed simultaneously in parallel.

Secondly, the entire process can be performed simultaneously in parallel. Since the process has random steps, it is possible that different solutions can emerge from different runs. These different solutions can be compared and the best one adopted as the solution to the problem. In this case, the overall rate of activity rises in almost direct proportion to the number of activities (i.e. entire runs) performed simultaneously in parallel.

In addition, pipeline parallelism can be used. That is, each of the major steps of the process can be performed by different processors. A given individual can be passed down the pipeline so that each step of the process is performed by a different processor for that particular individual.

The process of the present invention can benefit greatly from parallel operation. By using parallel processing, the overall rate of activity rises in almost direct proportion to the number of activities performed simultaneously. FIG. 19 is a block diagram depicting parallel processing of the present invention using two sub-populations each having two operating units. Sub-population $P_1$ 1910 is coupled to operating units $U_{11}$ 1911 and $U_{12}$ 1912. Sub-population $P_2$ 1920 is coupled to operating units $U_{21}$ 1921 and $U_{22}$ 1922. Communications channel 1930 couples all four operating units. FIG. 19 illustrates two sub-populations each with two operating units; however, in general, there can be an arbitrary number of sub-populations and arbitrary number of operating units involved.

Two types of parallel activity can occur. In the first type, each of the operations (, etc.) are performed simultaneously in parallel on different entities from a given population of individuals. If the entities are computer programs, parallel processing is accomplished by a computing machine having multiple operating units (control and arithmetic) capable of simultaneously working on entities selected from the computer's memory.

To show this first type of parallel processing, consider operating units $U_{11}$ 1911 and $U_{12}$ 1912 which are coupled to sub-population $P_1$ 1910. Each operating unit can access the sub-population to select entities for the operations, followed by performing the operation, adding new programs, and the rest of the iterative process simultaneously.

The second type of parallel processing involves simultaneously occurring activity in two or more different sub-populations. To show this type of parallel processing, consider sub-population $P_1$ 1910 and sub-population $P_2$ 1920. While $P_1$'s two operating units operate on $P_1$, $P_2$'s two operating units operate on $P_2$. Both types of parallelism are highly efficient because very little information need be communicated along the communication channel 1930. In addition, each operating unit need perform only a few very simple activities in response to the information received from the communications channel 1930.

Communication and coordination is performed by communications channel 1930, which couples all the operating units associated with the various sub-populations. in a computer, the communication channel may be a communication bus.

This simple computation can be performed by each operating unit whenever it receives information via the communications channel 1930 about any insertion or removal of an individual in the population. Similarly, each operating unit must transmit information along the communications channel 1930 to all other operating units whenever it inserts or removes any individual from the sub-population which it accesses.

In the case of computer programs, the benefits of parallel activity (using parallel operating units accessing parallel sub-populations) is manifested in terms of a rate of overall computer processing activity, rising almost in direct proportion to the number of parallel activities. That is, the amount of computation performed per unit of time rises almost in direct proportion to the number of parallel activities.

From time to time, the communications channel is also used to exchange large groups of individuals between the sub-populations so that each sub-population receives new genetic material. These occasional transmissions of information add to the administrative overhead of a parallel system; however, because they occur only occasionally (i.e. after many generations of activity confined to the sub-populations), they have only a minor effect on the overall efficiency of the parallel configuration.

Parallelism at the run level is comparatively easy to implement. Each processor is assigned one or more full runs for the maximum number of generations G to be run. The overall result is the best result of all the runs from all the independent processors. If the choice of the maximum number of generations to be run on each independent run is done reasonably well, only one or two processors will solve the problem within the allowed number of generations G. The overall result is then simply the result produced by the one successful processor or the better of the two results from the two successful processors. If the process of determining the overall result were automated, it would involve an extremely small amount of bandwidth for communication between the processors (i.e., one message from each processor containing the result of each independent run). In fact, determination of the overall result may be done manually on the back of an envelope. Before expending massive efforts on parallelization of genetic methods at levels lower than the run level, the user is well advised to recall the advisability of making multiple independent runs (rather than one long run) and to consider the possibility that the best use of the capabilities of a coarse- or medium-grained parallel computer is to simply make multiple independent runs on the various processors.

The specific arrangements and methods herein are merely illustrative of the principles of this invention. Numerous modifications in form and detail may be made by those skilled in the art without departing from the true spirit and scope of the invention.

Although this invention has been shown in relation to a particular embodiment, it should not be considered so limited. Rather it is limited only by the appended claims.

Thus, a process for solving problems by generating self-replicating and self-improving entities has been described.

We claim:

1. A process for solving a problem using a population of programs, wherein each of said programs is an arrangement of functions and terminals that include at least either an incorporation function or an emission function, said process comprising the steps of:

activating each program by presenting each of said programs with at least one combination of environmental conditions, if said each program includes an incorporation function then said program searching said population for a part of one of said programs and then incorporating the portion of said one program associated with said part into said each program, if said program includes an emission function then said program searching said population for a part and then said each program producing at least one emission, and if said each program responds effectively to said at least one combination then said at least one emission the population and if said each program fails to respond effectively then said at least one emission not entering the population;

generating a solution to the problem by continuing the step of activating until one of said programs responds effectively to a specified number of combinations of environmental conditions.

2. The process as in claim 1 further comprising the step of removing said each program from the population if said each program fails to respond effectively.

3. The process as in claim 1 further comprising the step of:

said each program searching for said part using a template.

4. The process as in claim 3 further comprising the step of:

said each program searching for said part using a template by searching for an exact match of said template.

5. The process as defined in claim 4, 6, or 7 wherein the match is a partial match.

6. The process as in claim 3 further comprising the step of:

said each program searching for said part using a template by searching for a complimentary match of said template.

7. The process as in claim 3 further comprising the step of:

said each program for said part using a template by searching for a corresponding match of said template.

8. The process as defined in claim 3 wherein said step of said each program searching comprises said each program searching only at a designated location of each of said programs for said template if said each program has an incorporation function.

9. The process as defined in claim 3 wherein said step of said each program searching comprises said each program searching only at a designated location of each of said programs for said template if said each program is performing an emission function.

10. The process as defined in claim 3 further comprising the step of:

said each entity searching using a template listing.

11. The process as defined in claim 10 further comprising the step of reordering the population by choosing from said template listing.

12. The process as defined in claim 1 wherein said step of incorporating includes incorporating the entirety of said one program if said each program is performing an incorporation function.

13. The process as defined in claim 1 wherein said step of producing an emission includes producing an emission having copy of the portion of said one program associated with said part into said each program.

14. The process as defined in claim 13 wherein said portion comprises the entirety of said one program.

15. The process as defined in claim 1 further comprising the step of continually activating each of said programs for a specified time, and removing said program from said population after said specified time.

16. The process as defined in claim 15 wherein said specified time is one program lifetime, wherein said step Of removing includes removing said entity after said each program has been activated a number of times compatible with that lifetime.

17. The process as defined in claim 1 wherein said step of searching includes;

each program searching itself first and then searching the other of said programs in said population.

18. A process for solving a problem using functions and terminals, said process comprising the steps of:

creating a population of programs of various sizes and shapes, wherein each program is a hierarchical arrangement of functions and terminals;

activating each program by presenting each of said programs with at least one combination of environmental conditions, if said each program includes an incorporation function then said program searching said population for a part of one of said programs and then incorporating the portion of said one program associated with said part into said each program, if said program includes an emission function then said program searching said population for a part and then said each program producing at least one emission, and if said each program responds effectively to said at least one combination then said at least one emission entering the population and if said each program fails to respond effectively then said at least one emission not entering the population;

generating a solution to the problem by continuing the step of activating until one of said programs responds effectively to a specified number of combinations of environmental conditions.

19. The process as in claim 18 further comprising the step of:

said program searching itself first and then searching the other programs in said population.

20. The process as in claim 18 further comprising the step of:

said program searching only the top of the hierarchical arrangement of the programs in the population.

21. The process as in claim 18 further comprising the step of:

said program only searching a predetermined number of said programs in the population.

22. The process as in claim 18 further comprising the step of maintaining the population at a predetermined size.

23. The process as in claim 22 wherein the step of maintaining comprises culling the population.

24. The process as in claim 23 wherein said step of culling the population includes culling the population using a uniform random probability distribution.

25. The process as in claim 18 further comprising the step of:
said each entity searching using a template.

26. The process as in claim 25 further comprising the step of:
said each entity searching using a template listing.

27. A computing system for solving a problem comprising at least one processor and a memory means coupled to said processor for storing a population of computer programs, wherein each of said programs is comprised of functions and terminals, said computing system further including:
means for activating each of said programs, wherein said means for activating presents each of said programs with at least one combination of environmental conditions, wherein if said each program includes an incorporation function then said at least one processor searches said population for a part of one of said programs and then incorporates the portion of said one program associated with said part into said each program, and wherein if said at least one processor includes an emission function then said program searches said population for a part and then said each program produces at least one emission, such that if said each program responds effectively to said at least one combination then said at least one emission enters the population and if said each program fails to respond effectively then said at least one emission fails to enter the population; and
means for continually invoking said means for activating, said means for continually invoking coupled to said means for activating and said memory means, wherein said means for continually invoking invokes said means for activating until one of said programs responds effectively to a specified number of combinations of environmental conditions, wherein a solution to the problem is generated.

28. The computing system as in claim 27 wherein said means for activating searches using a template.

29. The computing system as in claim 28 further comprising means for creating and storing a template listing.

* * * * *